US009462882B2

(12) United States Patent
Epstein et al.

(10) Patent No.: US 9,462,882 B2
(45) Date of Patent: *Oct. 11, 2016

(54) PERSONAL CONTROL APPARATUS AND METHOD FOR SHARING INFORMATION IN A COLLABORATIVE WORKSPACE

(71) Applicant: Steelcase Inc., Grand Rapids, MI (US)

(72) Inventors: Lewis Epstein, San Mateo, CA (US); Brett Kincaid, Lowell, MI (US); Hyun Yoo, Grand Rapids, MI (US); Suzanne Stage, San Francisco, CA (US); Lukas Scherrer, San Francisco, CA (US); Larry Cheng, Palo Alto, CA (US)

(73) Assignee: Steelcase Inc., Grand Rapids, MI (US)

( * ) Notice: Subject to any disclaimer, the term of this patent is extended or adjusted under 35 U.S.C. 154(b) by 77 days.

This patent is subject to a terminal disclaimer.

(21) Appl. No.: 14/293,138

(22) Filed: Jun. 2, 2014

(65) Prior Publication Data

US 2015/0042885 A1  Feb. 12, 2015

Related U.S. Application Data

(63) Continuation of application No. 12/474,670, filed on May 29, 2009, now Pat. No. 8,896,656, which is a continuation of application No. 12/250,192, filed on Oct. 13, 2008, now Pat. No. 8,074,581.

(60) Provisional application No. 60/979,668, filed on Oct. 12, 2007.

(51) Int. Cl.
*H04N 7/14* (2006.01)
*A47B 21/06* (2006.01)
(Continued)

(52) U.S. Cl.
CPC ............. *A47B 21/06* (2013.01); *A47B 13/08* (2013.01); *A47B 21/00* (2013.01); *A47B 83/001* (2013.01);
(Continued)

(58) Field of Classification Search
CPC ...... H04N 7/183; H04N 5/268; A47B 21/00; A47B 2021/066
See application file for complete search history.

(56) References Cited

U.S. PATENT DOCUMENTS

| 892,954 A | 7/1908 | Hanson |
| 1,189,799 A | 7/1916 | Erickson |

(Continued)

FOREIGN PATENT DOCUMENTS

| DE | 3100660 A1 | 7/1982 |
| DE | 8533571 U1 | 1/1986 |

(Continued)

OTHER PUBLICATIONS

ISA—The Instrumentation, Systems and Automation Society, Microsoft Opens Productivity Research Center, Sep. 26, 2002, 1 page, http://www.isa.org/InTechTemplate.cfm?Section=InTech&template=/ContentManagement/ContentDisplay.cfm&ContentID=18830.

(Continued)

Primary Examiner — Asghar Bilgrami
(74) Attorney, Agent, or Firm — Quarles & Brady LLP

(57) ABSTRACT

A method and apparatus for selecting information from a video source to be displayed on at least a first common display screen in a collaborative workspace having a switching device, the method comprising the steps of providing a selectable control interface that includes at least one indicator that can indicate at least first and second different states, associating a video source with the switching device so that video information from the video source is presented to the switching device, when the video source is associated with the switching device, causing the at least one indicator to indicate a first state and when the selectable control interface is selected, causing the at least one indicator to indicate the second state and providing the video information from the video source to the common display screen via the switching device.

38 Claims, 48 Drawing Sheets

(51) Int. Cl.
  *H04N 5/268*   (2006.01)
  *H04N 7/18*    (2006.01)
  *G06F 3/0481*  (2013.01)
  *A47B 13/08*   (2006.01)
  *H04N 7/15*    (2006.01)
  *A47B 21/00*   (2006.01)
  *H04N 5/66*    (2006.01)
  *G06F 1/16*    (2006.01)
  *G06F 3/14*    (2006.01)
  *A47B 83/00*   (2006.01)
  *G06F 3/147*   (2006.01)

(52) U.S. Cl.
  CPC .......... *G06F 1/1632* (2013.01); *G06F 1/1647* (2013.01); *G06F 3/0481* (2013.01); *G06F 3/147* (2013.01); *G06F 3/1423* (2013.01); *H04N 5/268* (2013.01); *H04N 5/66* (2013.01); *H04N 7/142* (2013.01); *H04N 7/147* (2013.01); *H04N 7/15* (2013.01); *H04N 7/183* (2013.01); *A47B 2021/066* (2013.01); *A47B 2083/006* (2013.01)

(56) References Cited

U.S. PATENT DOCUMENTS

| | | |
|---|---|---|
| 1,428,629 A | 9/1922 | Gunn |
| D100,987 S | 8/1936 | Colen |
| D142,121 S | 8/1945 | Ristenpart |
| 2,480,393 A | 8/1949 | Bossert et al. |
| 2,489,933 A | 11/1949 | Schwarz, Jr. |
| D158,160 S | 4/1950 | Viola |
| D158,522 S | 5/1950 | Smith et al. |
| 2,712,972 A | 7/1955 | Manson et al. |
| 3,053,598 A | 9/1962 | Cheslow |
| 3,128,344 A | 4/1964 | Goold |
| 3,177,594 A | 4/1965 | Demo |
| 3,342,147 A | 9/1967 | Shettles |
| D209,841 S | 1/1968 | Bue et al. |
| D209,911 S | 1/1968 | Cooper |
| 3,549,200 A | 12/1970 | Cooper |
| 3,636,892 A | 1/1972 | Linton |
| 3,637,268 A | 1/1972 | Walter |
| 3,741,852 A | 6/1973 | Keener |
| D245,465 S | 8/1977 | Hindle |
| 4,050,165 A | 9/1977 | Yamauchi et al. |
| 4,155,609 A | 5/1979 | Skafte et al. |
| 4,323,291 A | 4/1982 | Ball |
| 4,382,642 A | 5/1983 | Burdick |
| 4,382,643 A | 5/1983 | Heinrich |
| 4,409,906 A | 10/1983 | Alneng |
| 4,516,156 A | 5/1985 | Fabris et al. |
| 4,562,482 A | 12/1985 | Brown |
| 4,612,863 A | 9/1986 | Vonhausen et al. |
| 4,619,427 A | 10/1986 | Leymann |
| 4,659,048 A | 4/1987 | Fahrion |
| D293,403 S | 12/1987 | Umanoff et al. |
| 4,725,106 A | 2/1988 | Shields et al. |
| 4,732,088 A | 3/1988 | Koechlin et al. |
| 4,735,467 A | 4/1988 | Wolters |
| D295,630 S | 5/1988 | Wells-Papanek et al. |
| 4,758,887 A | 7/1988 | Engel et al. |
| 4,785,472 A | 11/1988 | Shapiro |
| 4,817,903 A | 4/1989 | Braehler et al. |
| 4,836,478 A | 6/1989 | Sweere |
| 4,838,177 A | 6/1989 | Vander Park |
| 4,852,500 A | 8/1989 | Ryburg et al. |
| 4,876,657 A | 10/1989 | Saito et al. |
| 4,922,835 A | 5/1990 | Van Vliet et al. |
| 4,974,173 A | 11/1990 | Stefik et al. |
| 4,974,913 A | 12/1990 | Vogt et al. |
| 4,996,110 A | 2/1991 | Tanuma et al. |
| 5,035,392 A | 7/1991 | Gross et al. |
| 5,065,832 A | 11/1991 | Mark |
| D322,857 S | 12/1991 | Bacus |
| 5,104,087 A | 4/1992 | Wentzloff et al. |
| 5,121,698 A | 6/1992 | Kelley |
| 5,122,941 A | 6/1992 | Gross et al. |
| 5,131,849 A | 7/1992 | Perrero |
| D331,060 S | 11/1992 | Emmons et al. |
| D335,281 S | 5/1993 | Thummel |
| 5,239,373 A | 8/1993 | Tang et al. |
| 5,261,735 A | 11/1993 | Cohen et al. |
| 5,321,579 A | 6/1994 | Brown et al. |
| 5,328,145 A | 7/1994 | Charapich |
| 5,351,241 A | 9/1994 | Yehonatan |
| 5,352,033 A | 10/1994 | Gresham et al. |
| 5,382,972 A | 1/1995 | Kannes |
| 5,392,400 A | 2/1995 | Berkowitz et al. |
| D359,405 S | 6/1995 | Ball |
| 5,438,937 A | 8/1995 | Ball et al. |
| 5,442,788 A | 8/1995 | Bier |
| 5,465,370 A | 11/1995 | Ito et al. |
| D367,857 S | 3/1996 | Emmerik |
| 5,500,671 A | 3/1996 | Andersson et al. |
| D368,721 S | 4/1996 | Howell et al. |
| 5,503,891 A | 4/1996 | Marshall et al. |
| 5,522,324 A | 6/1996 | van Gelder et al. |
| 5,549,267 A | 8/1996 | Armbruster et al. |
| 5,557,725 A | 9/1996 | Ansberry et al. |
| D375,909 S | 11/1996 | Dziersk et al. |
| D376,790 S | 12/1996 | Goulet et al. |
| 5,595,126 A | 1/1997 | Yeh |
| 5,634,018 A | 5/1997 | Tanikoshi et al. |
| 5,638,758 A | 6/1997 | Carr |
| D381,662 S | 7/1997 | Weissberg et al. |
| D382,307 S | 8/1997 | Sharpe, III et al. |
| 5,655,822 A | 8/1997 | Roberts et al. |
| 5,687,499 A | 11/1997 | Brnjac |
| 5,701,981 A | 12/1997 | Marshall et al. |
| D388,639 S | 1/1998 | Dormon et al. |
| D390,381 S | 2/1998 | Dormon et al. |
| D392,361 S | 3/1998 | Cooper |
| 5,724,778 A | 3/1998 | Cornell et al. |
| D393,382 S | 4/1998 | Rutter et al. |
| 5,735,220 A | 4/1998 | Wang |
| 5,738,316 A | 4/1998 | Sweere et al. |
| 5,765,315 A | 6/1998 | Nagamitsu et al. |
| 5,767,897 A | 6/1998 | Howell |
| 5,797,666 A | 8/1998 | Park |
| D399,501 S | 10/1998 | Arora et al. |
| 5,831,211 A | 11/1998 | Gartung et al. |
| 5,918,841 A | 7/1999 | Sweere et al. |
| D413,212 S | 8/1999 | Dame et al. |
| 5,943,966 A | 8/1999 | Machado et al. |
| 5,967,058 A | 10/1999 | Ambrose et al. |
| 5,988,076 A | 11/1999 | Vander Park |
| 5,999,208 A | 12/1999 | McNerney et al. |
| D418,837 S | 1/2000 | Ishii |
| 6,012,398 A | 1/2000 | Boyce |
| 6,057,835 A | 5/2000 | Sato et al. |
| 6,060,993 A | 5/2000 | Cohen |
| 6,072,522 A | 6/2000 | Ippolito et al. |
| 6,076,903 A | 6/2000 | Vander Park |
| D427,993 S | 7/2000 | Seal |
| 6,091,408 A | 7/2000 | Treibitz et al. |
| D435,361 S | 12/2000 | Goza |
| 6,158,358 A | 12/2000 | Prendergast |
| 6,160,573 A | 12/2000 | Allen et al. |
| 6,161,487 A | 12/2000 | Chang |
| D435,835 S | 1/2001 | Steck |
| 6,168,127 B1 | 1/2001 | Saylor et al. |
| 6,170,200 B1 | 1/2001 | Cornell et al. |
| 6,170,926 B1 | 1/2001 | Roberts et al. |
| 6,182,580 B1 | 2/2001 | Barrett et al. |
| 6,182,581 B1 | 2/2001 | Boyce |
| 6,189,268 B1 | 2/2001 | Carr et al. |
| 6,199,101 B1 | 3/2001 | Pfaff |
| 6,201,859 B1 | 3/2001 | Memhard et al. |
| 6,203,053 B1 | 3/2001 | Sohrt et al. |
| 6,216,606 B1 | 4/2001 | Kathardekar et al. |
| 6,249,281 B1 | 6/2001 | Chen et al. |
| 6,254,206 B1 | 7/2001 | Petrick et al. |

(56) References Cited

U.S. PATENT DOCUMENTS

| | | |
|---|---|---|
| 6,266,691 B1 | 7/2001 | Watanabe et al. |
| 6,267,064 B1 | 7/2001 | Ostertag et al. |
| D448,018 S | 9/2001 | Arjomand et al. |
| 6,283,043 B1 | 9/2001 | Stern et al. |
| 6,286,794 B1 | 9/2001 | Harbin |
| 6,288,753 B1 | 9/2001 | DeNicola et al. |
| 6,298,794 B1 | 10/2001 | Brown et al. |
| D452,692 S | 1/2002 | Fukuda |
| 6,359,711 B1 | 3/2002 | Cole et al. |
| D456,155 S | 4/2002 | DeVriendt |
| 6,363,866 B1 | 4/2002 | Schwartz |
| 6,374,547 B1 | 4/2002 | Baloga et al. |
| 6,382,109 B1 | 5/2002 | Novikoff |
| 6,394,402 B2 | 5/2002 | Coonan et al. |
| 6,415,723 B1 | 7/2002 | Kopish et al. |
| D461,822 S | 8/2002 | Okuley |
| 6,427,389 B1 | 8/2002 | Branc et al. |
| 6,435,106 B2 | 8/2002 | Funk et al. |
| D463,439 S | 9/2002 | Olivo |
| 6,443,073 B1 | 9/2002 | Tsang et al. |
| 6,443,415 B1 | 9/2002 | Sundblad |
| 6,453,826 B1 | 9/2002 | Fookes et al. |
| 6,497,184 B1 | 12/2002 | Whitesitt |
| 6,554,433 B1 | 4/2003 | Holler |
| 6,574,674 B1 | 6/2003 | Mairs et al. |
| 6,588,346 B1 | 7/2003 | Bockheim et al. |
| 6,598,542 B2 | 7/2003 | Goldberg et al. |
| 6,609,691 B2 | 8/2003 | Oddsen, Jr. |
| 6,614,451 B1 | 9/2003 | Hudson et al. |
| 6,629,505 B1 | 10/2003 | Cronk et al. |
| 6,662,210 B1 | 12/2003 | Carleton et al. |
| 6,662,734 B2 | 12/2003 | Chang |
| D484,886 S | 1/2004 | Matsuoka |
| 6,681,529 B1 | 1/2004 | Baloga et al. |
| 6,695,270 B1 | 2/2004 | Smed |
| D487,469 S | 3/2004 | Glaser et al. |
| 6,714,172 B2 | 3/2004 | Matsuzaki et al. |
| 6,725,784 B2 | 4/2004 | Crinion |
| 6,728,753 B1 | 4/2004 | Parasnis et al. |
| D492,311 S | 6/2004 | Suzuki |
| 6,751,914 B2 | 6/2004 | Zeh et al. |
| D493,177 S | 7/2004 | Retuta et al. |
| 6,774,460 B1 | 8/2004 | Herbert et al. |
| 6,780,047 B1 | 8/2004 | Laity et al. |
| 6,791,575 B2 | 9/2004 | Abboud |
| 6,816,129 B1 | 11/2004 | Zimmerman |
| 6,831,676 B2 | 12/2004 | Monroe |
| D500,766 S | 1/2005 | Hanisch et al. |
| 6,848,741 B2 | 2/2005 | Ford et al. |
| D505,135 S | 5/2005 | Sapp et al. |
| 6,892,650 B2 | 5/2005 | Baloga et al. |
| D507,002 S | 7/2005 | Retuta et al. |
| 6,931,795 B1 | 8/2005 | Baloga et al. |
| D509,221 S | 9/2005 | Suber et al. |
| D512,064 S | 11/2005 | Li |
| 6,990,909 B2 | 1/2006 | Gosling et al. |
| 7,016,935 B2 | 3/2006 | Lee et al. |
| 7,032,523 B2 | 4/2006 | Forslund, III et al. |
| 7,058,891 B2 | 6/2006 | O'Neal et al. |
| D524,291 S | 7/2006 | Tsang |
| D526,973 S | 8/2006 | Gates et al. |
| 7,092,002 B2 | 8/2006 | Ferren et al. |
| D528,545 S | 9/2006 | Crews |
| 7,113,201 B1 | 9/2006 | Taylor et al. |
| 7,119,829 B2 | 10/2006 | Leonard et al. |
| 7,121,670 B2 | 10/2006 | Salvatori et al. |
| 7,125,088 B2 | 10/2006 | Haberman |
| 7,131,068 B2 | 10/2006 | O'Neal et al. |
| D531,998 S | 11/2006 | El Sayed et al. |
| 7,134,079 B2 | 11/2006 | Brown et al. |
| 7,148,906 B2 | 12/2006 | Sakashita et al. |
| 7,207,278 B2 | 4/2007 | Latino et al. |
| D542,280 S | 5/2007 | Taylor |
| 7,233,318 B1 | 6/2007 | Farag et al. |
| 7,240,287 B2 | 7/2007 | Qureshi et al. |
| 7,278,360 B2 | 10/2007 | Griepentrog |
| D558,767 S | 1/2008 | Solland |
| 7,317,446 B1 | 1/2008 | Murphy |
| 7,373,605 B2 | 5/2008 | Schaper |
| 7,428,000 B2 | 9/2008 | Cutler et al. |
| D580,413 S | 11/2008 | Tsao |
| 7,454,708 B2 | 11/2008 | O'Neal et al. |
| D581,927 S | 12/2008 | Sumii |
| 7,493,565 B2 | 2/2009 | Parupudi et al. |
| D589,046 S | 3/2009 | Pascucci |
| D589,497 S | 3/2009 | Andre et al. |
| 7,500,795 B2 | 3/2009 | Sandhu |
| D590,391 S | 4/2009 | Sumii |
| D596,622 S | 7/2009 | Lee |
| 7,558,823 B2 | 7/2009 | Beers et al. |
| D598,008 S | 8/2009 | Shimizu |
| D598,018 S | 8/2009 | Sumii |
| D599,323 S | 9/2009 | Petersen |
| D600,694 S | 9/2009 | Sumii |
| D601,564 S | 10/2009 | Maeno |
| D602,915 S | 10/2009 | Song et al. |
| D602,916 S | 10/2009 | Won et al. |
| D603,457 S | 11/2009 | Julskjer et al. |
| D606,519 S | 12/2009 | Painter |
| D606,979 S | 12/2009 | Henry |
| 7,679,638 B2 | 3/2010 | Eshkoli et al. |
| D617,847 S | 6/2010 | Royer, II et al. |
| 7,734,802 B1 | 6/2010 | Gay et al. |
| 7,761,505 B2 | 7/2010 | Krzyzanowski et al. |
| D624,518 S | 9/2010 | Li |
| D625,295 S | 10/2010 | Nogueira et al. |
| 7,830,409 B2 | 11/2010 | Hwang et al. |
| 7,876,287 B2 | 1/2011 | McLarty et al. |
| D632,265 S | 2/2011 | Choi et al. |
| 7,922,267 B2 | 4/2011 | Gevaert |
| 7,926,430 B2 | 4/2011 | Bakker et al. |
| D639,784 S | 6/2011 | Murayama et al. |
| D644,242 S | 8/2011 | Matas |
| D644,243 S | 8/2011 | Matas |
| D651,215 S | 12/2011 | Anzures et al. |
| 8,074,581 B2 | 12/2011 | Epstein et al. |
| D653,262 S | 1/2012 | O'Donnell et al. |
| 8,117,547 B2 | 2/2012 | Parupudi et al. |
| 8,138,942 B2 | 3/2012 | Otsuka et al. |
| 8,212,779 B2 | 7/2012 | Chiang |
| D666,175 S | 8/2012 | Yamada |
| D666,176 S | 8/2012 | Yamada |
| 8,395,713 B2 | 3/2013 | Kondo et al. |
| D685,790 S | 7/2013 | Tang |
| D697,475 S | 1/2014 | Regole |
| D700,904 S | 3/2014 | Miller et al. |
| 8,896,656 B2 | 11/2014 | Epstein et al. |
| D726,161 S | 4/2015 | Howard et al. |
| D729,773 S | 5/2015 | Salojarvi et al. |
| D736,166 S | 8/2015 | Kuh et al. |
| D747,229 S | 1/2016 | Perez |
| D748,078 S | 1/2016 | Nardin et al. |
| 2001/0005201 A1 | 6/2001 | Digiorgio et al. |
| 2002/0011197 A1 | 1/2002 | Akyuz |
| 2002/0037668 A1 | 3/2002 | Tseng et al. |
| 2002/0083137 A1 | 6/2002 | Rogers et al. |
| 2002/0132216 A1 | 9/2002 | Dohrmann |
| 2002/0149566 A1 | 10/2002 | Sarkissian |
| 2002/0186236 A1 | 12/2002 | Brown et al. |
| 2002/0194792 A1 | 12/2002 | Feldpausch et al. |
| 2003/0011467 A1 | 1/2003 | Suomela |
| 2003/0098370 A1 | 5/2003 | Sukthankar et al. |
| 2004/0150752 A1* | 8/2004 | Iwase ................ H04N 9/76 348/584 |
| 2004/0201628 A1 | 10/2004 | Johanson et al. |
| 2004/0227692 A1 | 11/2004 | Yoon |
| 2005/0126446 A1 | 6/2005 | Nobles et al. |
| 2006/0000955 A1 | 1/2006 | Cvek |
| 2006/0044148 A1 | 3/2006 | Daniels et al. |
| 2006/0244817 A1 | 11/2006 | Harville et al. |
| 2006/0267726 A1 | 11/2006 | Arai et al. |
| 2007/0040900 A1 | 2/2007 | Castles |
| 2007/0054735 A1 | 3/2007 | Palermo |
| 2007/0080818 A1 | 4/2007 | Yun et al. |

(56) References Cited

U.S. PATENT DOCUMENTS

| | | |
|---|---|---|
| 2007/0106950 A1 | 5/2007 | Hutchinson et al. |
| 2007/0165193 A1 | 7/2007 | Kubo et al. |
| 2007/0242129 A1 | 10/2007 | Ferren et al. |
| 2007/0266266 A1* | 11/2007 | Dubinsky ............ G06F 1/3203 713/300 |
| 2008/0074343 A1* | 3/2008 | Sasser .................... G06F 3/14 345/1.1 |
| 2008/0172695 A1 | 7/2008 | Migos et al. |
| 2008/0194942 A1 | 8/2008 | Cumpson et al. |
| 2008/0266380 A1 | 10/2008 | Gorzynski et al. |
| 2008/0307324 A1 | 12/2008 | Westen et al. |
| 2009/0037821 A1 | 2/2009 | O'Neal et al. |
| 2009/0044116 A1 | 2/2009 | Kitabayashi |
| 2009/0055760 A1 | 2/2009 | Whatcott et al. |
| 2009/0121905 A1 | 5/2009 | Griffin, Jr. et al. |
| 2009/0184924 A1 | 7/2009 | Uchida |
| 2010/0073454 A1 | 3/2010 | Lovhaugen et al. |
| 2010/0302130 A1 | 12/2010 | Kikuchi et al. |
| 2010/0312366 A1 | 12/2010 | Madonna et al. |
| 2011/0025819 A1 | 2/2011 | Gorzynski et al. |
| 2012/0081277 A1 | 4/2012 | de Paz |
| 2012/0209935 A1 | 8/2012 | Harter et al. |
| 2012/0324047 A1 | 12/2012 | Diner et al. |
| 2015/0022342 A1 | 1/2015 | Will et al. |
| 2015/0144034 A1 | 5/2015 | Epstein et al. |
| 2015/0296061 A1 | 10/2015 | Geiger et al. |
| 2016/0028993 A1 | 1/2016 | Epstein et al. |

FOREIGN PATENT DOCUMENTS

| | | |
|---|---|---|
| DE | 19652108 A1 | 6/1998 |
| DE | 29910262 U1 | 8/1999 |
| EP | 0223091 A2 | 5/1987 |
| EP | 0230236 A1 | 7/1987 |
| EP | 0264589 A2 | 4/1988 |
| EP | 0992921 A2 | 4/2000 |
| EP | 0801342 B1 | 1/2003 |
| GB | 2365662 A | 2/2002 |
| JP | 11332674 A | 12/1999 |
| JP | 2000236329 A | 8/2000 |
| JP | 2006122645 A | 5/2006 |
| WO | 0017737 A1 | 3/2000 |
| WO | 0131397 A1 | 5/2001 |
| WO | 0212992 A2 | 2/2002 |

OTHER PUBLICATIONS

Stone, Office Space: Designing Your Next Office—A Workplace That Will Know Who You Are, Where You Are and What You're Doing, Newsweek, Apr. 19, 2003, 2 pages, http://msnbc.msn.com/id/3068812/.

Microsoft Corporation, Enhanced Microsoft Exhibit Offers Sneak Peek at Office of the Future, Mar. 22, 2004, 6 pages, http://www.microsoft.com/presspass/features/2004/mar04/03-22CIW.asp.

Coursey, Microsoft's Vision of Tomorrow Sparks Wonder, Fear, eWEEK.com, Jul. 12, 2004, 3 pages, http://www.eweek.com/print_article/0,1761,a=131281,00.asp.

Polycom, Polycom RealPresence Experience (RPX) User Guide, Feb. 2007 Edition, Version 1.0, 3 pages.

Elecom, DTS-TS8 (Japanese), 2 pages.

Coeno-Storyboard: An Augmented Surface for Storyboard Presentations, c 2005, Medientechnik und—design, 14 pages.

Brunswick, The Frameworx Line: Center Design and Functionality that Works for Everyone, http://www.brunswickbowling.com/frameworx_line, Jul. 2, 2007, 4 pages.

Polycom, Administrator's Guide for the VSX Series, Feb. 2007 Edition, Version 8.5.3, 3 pages.

European Patent Office, Extended European Search Report, Application No. 08252300.2, Oct. 4, 2011.

European Patent Office, Communication, Application No. 08252300.2, May 7, 2014.

* cited by examiner

US 9,462,882 B2

PERSONAL CONTROL APPARATUS AND METHOD FOR SHARING INFORMATION IN A COLLABORATIVE WORKSPACE

CROSS-REFERENCE TO RELATED APPLICATIONS

This application is a continuation of U.S. application Ser. No. 12/474,670 which was filed on May 29, 2009 and which is titled "Control Apparatus And Method For Sharing Information In A Collaborative Workspace" which is a continuation of U.S. Pat. No. 8,074,581 that was filed on Oct. 13, 2008, that issued on Dec. 12, 2011 and which is titled "Conference Display Configuration" which claimed priority to U.S. provisional patent application No. 60/979,668 that was filed on Oct. 12, 2007.

STATEMENT REGARDING FEDERALLY SPONSORED RESEARCH OR DEVELOPMENT

Not applicable.

BACKGROUND OF THE INVENTION

The present invention relates to the presentation of audio-visual information via one or more large format common displays in a collaborative workspace and more specifically to a fast and intuitive controller allowing a meeting participant with a laptop computer to quickly and easily control the presentation of laptop information on common displays.

Small group conference tables usable as collaborative workspaces have been designed with one or more large video displays such as a LCD flat-panel monitor or a wall suitable for having images projected thereon, connected to or adjacent the conference table. The basic intent behind such workspace designs is to provide information at or near a table edge for attendees to refer to during discussions and presentations. In many cases, the video display is connected to and driven by a dedicated computer.

Oftentimes, more than one attendee needs to be able to control the information presented on the video display at different times during a conference. One way to allow several attendees to present information on a video display screen is to have each presenter sequentially connect their laptop computer directly to the display or projector with a dedicated audio/video cable. Though straightforward and simple, having to repeatedly disconnect and connect the cable from one laptop computer to another takes time and is disruptive.

Another way of enabling several attendees to share audio-visual information from their own laptop computers via a common large video display screen is to provide separate audio/video cables for each presenter and connect each of the laptops to an audiovisual switching device that enables the attendees to take control of the common display screen via selection of a button associated with each of the audio/video cables.

While such an arrangement provide a relatively quick transition between presenters, such arrangements typically require a separate controller or control program and a number of less-than-intuitive steps that must be followed to transition from one presenter to another. Further, known such arrangements do not provide a quick and intuitive indication as to which presenter is sharing their information via the video display screen. As a result, meeting presenters and participants may experience confusion and delay between transitions. Such user experiences may result in a loss of productivity and in general, can be significant impediments to the successful collaboration between conference participants and willingness of participants to use the system.

Thus, while solutions for managing and controlling the flow of information from interconnected computing devices have been developed, known solutions do not provide simple and intuitive steps for selecting which information is shared via the video display and for indicating which of several video/audio resources currently control presented information.

BRIEF SUMMARY OF THE INVENTION

It has been recognized that a simple control interface may be provided where the interface provides feedback to configuration users indicating which of several different conference attendees is presenting information via one or more common display screens or presentation spaces. To this end, a separate control interface is provided for each of a plurality of attendees where each interface includes control buttons or the like and indicators that can indicate visually distinguished states. For instance, when a laptop or other video/audio source is linked to one of the control interfaces, the interface may visually indicate that the laptop is in a state wherein the laptop may be used to present information via one or more common displays but that the laptop is not currently presenting. When a user selects one of the buttons on the interface to present information on the common display, the indicator may change appearance to visually indicate to attendees that the laptop linked to the interface is presenting.

It has also been recognized that where a configuration includes more than one common display, it would be useful to provide an indication to each configuration user as to common display options which can be selected and which common displays are currently being driven via a user's laptop or other source. To this end, in at least some cases each control interface is configured to include a separate selectable buttons for each common display where, when a button is selected so that a source associated with the interface is to drive an associated display, the appearance of the button or an indicator associated therewith is modified to indicate to the user which of the common displays is currently being driven. In particularly advantageous embodiments the indicators include illumination devices wherein different illumination colors indicate different states or conditions.

Consistent with the above, at least some inventive embodiments include a method of selecting information from a video source to be displayed on at least a first common display screen in a collaborative workspace having a switching device, the method comprising the steps of providing a selectable control interface that includes at least one indicator that can indicate at least first and second different states, associating a video source with the switching device so that video information from the video source is presented to the switching device, when the video source is associated with the switching device, causing the at least one indicator to indicate a first state and, when the selectable control interface is selected, causing the at least one indicator to indicate the second state and providing the video information from the video source to the common display screen via the switching device.

In at least some cases the step of providing a selectable control interface includes providing a mechanical interface that includes at least one selectable button. In at least some cases the mechanical interface includes a first cable linkable to the video source and a second cable which links to the switching device and wherein the step of associating a video source with the switching device includes linking the first cable to the video source. In at least some cases the indicator includes at least a first illumination device wherein the steps of causing the at least one indicator to indicate the first and second states includes causing the illumination device to light up first and second different colors, respectively.

In at least some cases the control interface forms a substantially flat upper surface and wherein the at least a first illumination device transmits light around a periphery of the flat upper surface. In at least some embodiments the method further includes the step of, while the video information from the video source is provided to the shared display screen via the switching device, when the selectable control interface is selected a second time, causing the at least one indicator to indicate the first state and blocking the video information from the video source to the shared display screen via the switching device.

In at least some cases the method is for use with a system that includes a plurality of common display screens wherein the selectable control interface includes a separate selectable control for each of the plurality of display screens and wherein the at least one indicator includes a separate illumination device for each of the separate selectable controls, the step of causing the at least one indicator to indicate the first state including causing each illumination device associated with a common display screen to generate light of a first color indicating the first state and wherein, when any one of the control interfaces is selected, the method further includes the steps of causing the illumination device associated with the selected control to indicate the second state and providing the video information from the video source to the common display screen associated with the selected control.

In at least some embodiments the method further includes the steps of providing a second selectable control interface that includes at least one indicator that can indicate at least first and second different states, associating a second video source with the switching device so that video information from the second video source is presented to the switching device, when the second video source is associated with the switching device, causing the at least one indicator on the second control interface to indicate the first state and when the second selectable control interface is selected, causing the at least one indicator on the second control interface to indicate the second state and providing the video information from the second video source to the common display screen via the switching device irrespective of which source was providing video information to the common display screen prior to selection of the second selectable control interface device.

In some embodiments the video source is a computer including a display screen and wherein the control interface appears on the computer display screen for selection. In some embodiments communication between the computer and the switching device is wireless.

Other embodiments include a method of selecting information from a video source to be displayed on a subset of M common display screens in a collaborative workspace having a switching device, the method comprising the steps of providing a control interface that includes N selectable controls wherein N is at least as great as M and wherein each control is associated with a separate indicator and each indicator may assume at least first and second visually distinguishable states, associating a video source with the switching device so that video information from the video source is presented to the switching device and when the video source is associated with the switching device, causing a separate indicator for each of the M common display screens to assume the second visual state while the other N–M indicators remain in the first visual state.

In some embodiments each control includes a separate illumination device which may be illuminated to indicate at least one of the first and second states. In some embodiments each control indicates the second state by exciting an associated illumination device and indicates the first state by cutting off power to the illumination device. In some embodiments each of the indicators may assume a third visually distinguishable state, the method further including the steps of, when any of the selectable controls is selected, causing the indicator associated with the selected control to indicate the third state and providing the video information from the video source to the common display screen via the switching device.

In some embodiments the control interface is provided via a representation on a computer display screen. In some embodiments the step of providing a control interface includes providing a mechanical interface that includes a cable and wherein the step of associating a video source with the switching device includes linking the video source to the mechanical interface via a cable.

Still other embodiments include an apparatus for selecting information from a video source to be displayed on at least a first common display screen in a collaborative workspace having a switching device, the apparatus comprising a control interface that includes at least a first indicator that can visually indicate at least first, second and third visually distinguished states wherein the control interface indicates the first state when a video source is disassociated with the switching device, the second state when the video source is associated with the switching device and video information from the video source is not presented via the common display and the third state when the video source is associated with the switching device and video information from the video source is presented via the common display.

In some embodiments the at least a first indicator includes an illumination device and wherein the first state is indicated by cutting power to the illumination device, the second state is indicated via illumination of a first color and the second state is indicated via illumination of a second color. In some embodiments the control interface includes at least a first selectable control which, when selected, causes the video information from the video source to be presented via the common display and causes the indicator to change from the first state to the second state.

Other embodiments include an apparatus for selecting information from a video source to be displayed on a subset of M common display screens in a collaborative workspace having a switching device, the apparatus comprising a control interface that includes N selectable controls wherein N is at least as great as M and wherein each control is associated with a separate indicator and each indicator may assume at least first and second visually distinguishable states, wherein, when a video source is not associated with the switching device, each indicator indicates the first state and, when a video source is associated with the switching device, a separate indicator for each of the M common display screens assumes the second state while the other N–M indicators remain in the first state.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
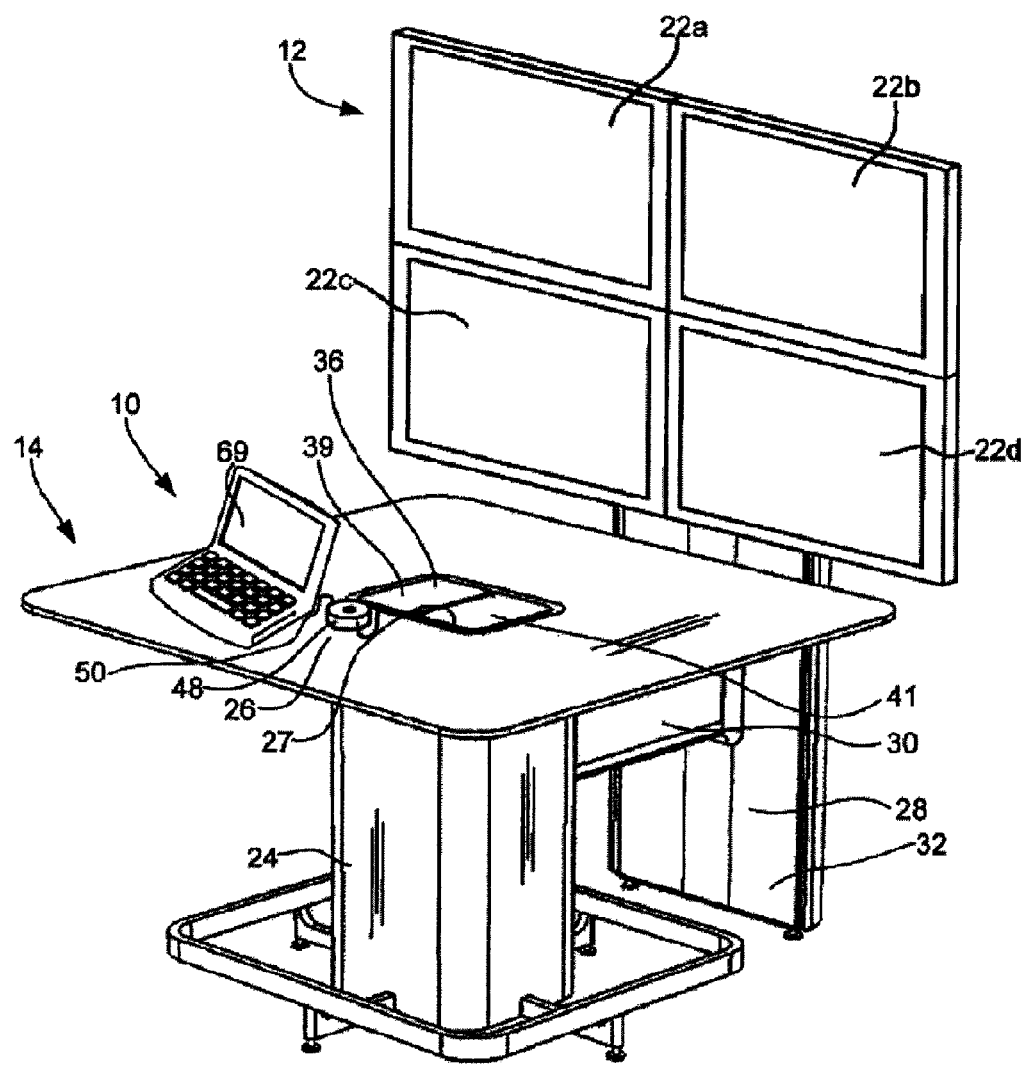
FIG. 1 is a perspective view of a collaborative conference table configuration having four display screens in accordance with at least some aspects of the present invention.

Referring now to the figures wherein like reference numerals correspond to similar elements throughout the several views and more specifically, referring to FIGS. 1 through 4, one embodiment of a collaborative workspace configuration 10 that is consistent with at least some aspects of the present invention is illustrated. Workspace configuration 10 includes a display system 12 and a conference table assembly 14. Various mechanical aspects of configuration 10 are described in co-pending U.S. patent application Ser. No. 12/250,192 that was filed on Oct. 13, 2008 and is titled "Conference Table Assembly" and which is incorporated herein by reference. U.S. patent application Ser. No. 12/250, 192 has issued as U.S. Pat. No. 8,074,581.

Hereafter, general mechanical features of the configuration 10 are described that are useful in understanding operation of the current invention. The prior application referenced above should be referred to for more detail regarding the mechanical aspects of configuration 10.

Display system 12 includes a totem or stand support structure 28 and four relatively large flat panel displays 22 a, 22 b, 22 c and 22 d. Totem 28 is vertically oriented and includes a front facing surface 32 to which displays 22 a through 22 d are mounted. Displays 22 a through 22 d are arranged so that viewing or presentation surfaces face in the same direction and generally away from totem 28. Displays 22 a through 22 d are arranged in a two row and two column arrangement. Although not illustrated, totem 28 includes a housing that forms a cavity in which power and data cables can be received to provide power/data to display 22 a through 22 d.

Conference table assembly 14 includes a support structure 24, a table top member 26 and a bridge assembly 30. Support structure 24 generally forms a vertical leg to support top member 26 in a horizontal orientation. Structure 24 also forms an internal cavity for receiving various power, data and communication components as well as other mechanical components such as cable take up subassemblies described in the co-pending patent application referenced above.

Bridge assembly 30 secures totem 28 to support structure 24 to stabilize totem in a vertical orientation. In addition, although not illustrated, bridge assembly 30 forms an internal channel or cavity for passing power and/or data cables between structure 24 and totem 28.

Top member 26 is generally a rigid square flat member that forms a top work surface and a central rectilinear opening. A dual door assembly 36 is mounted within the central opening that includes two door members 39, 41 that have top surfaces that are flush with the top surface of member 26 when the doors are closed. Each door in hinged to open to allow access to table components there below. Together the doors are dimensioned so that when closed as best seen in FIG. 4, each door 39 and 41 forms a gap (see 43 and 45) with the opening around a peripheral edge for passing cables.

Figure 4:
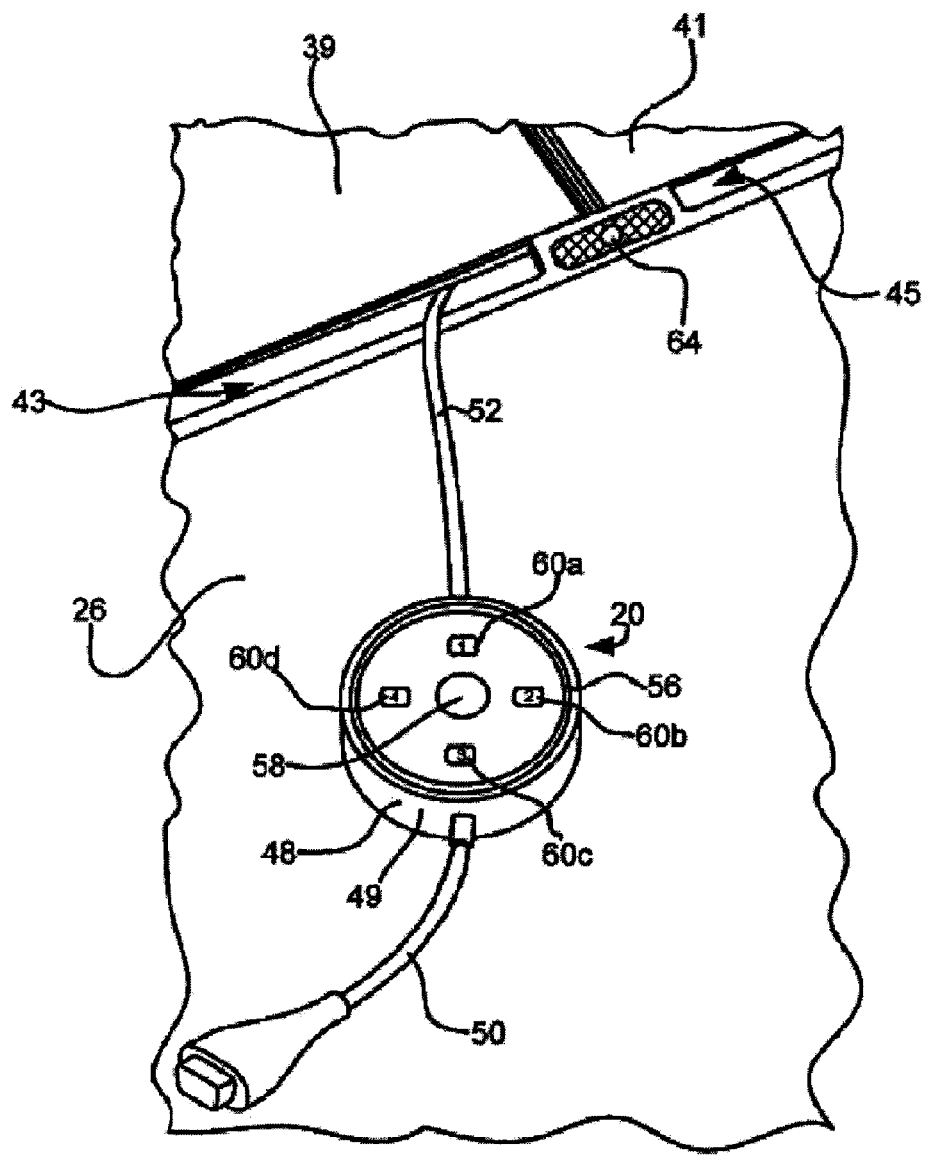
FIG. 4 is an enlarged perspective view showing one of the puck control assemblies that comprises a portion of the configurations shown in FIG. 1.

Referring still to FIG. 4, adjacent the doors 39 and 41 at the edge of the central opening an illuminated button 64 is provided. Although not illustrated, button 64 is linked to a power source. Button 64 is a dual state push button and, in at lease some embodiments, is illuminated all the time. In some embodiments, button 64 may include a universal power indicator symbol indicating to users that the table is powered. By illuminating button 64 even when the table configuration 10 is not being used, the button invites users to start up a conferencing session and is an indicator that the configuration 10 is operable and ready to use. When not in use button 64 will have a first illuminated color (e.g., white) and when button 64 is selected, the button will be illuminated in a second color (e.g., green) confirming for the user that the button has been selected.

Figure 2:
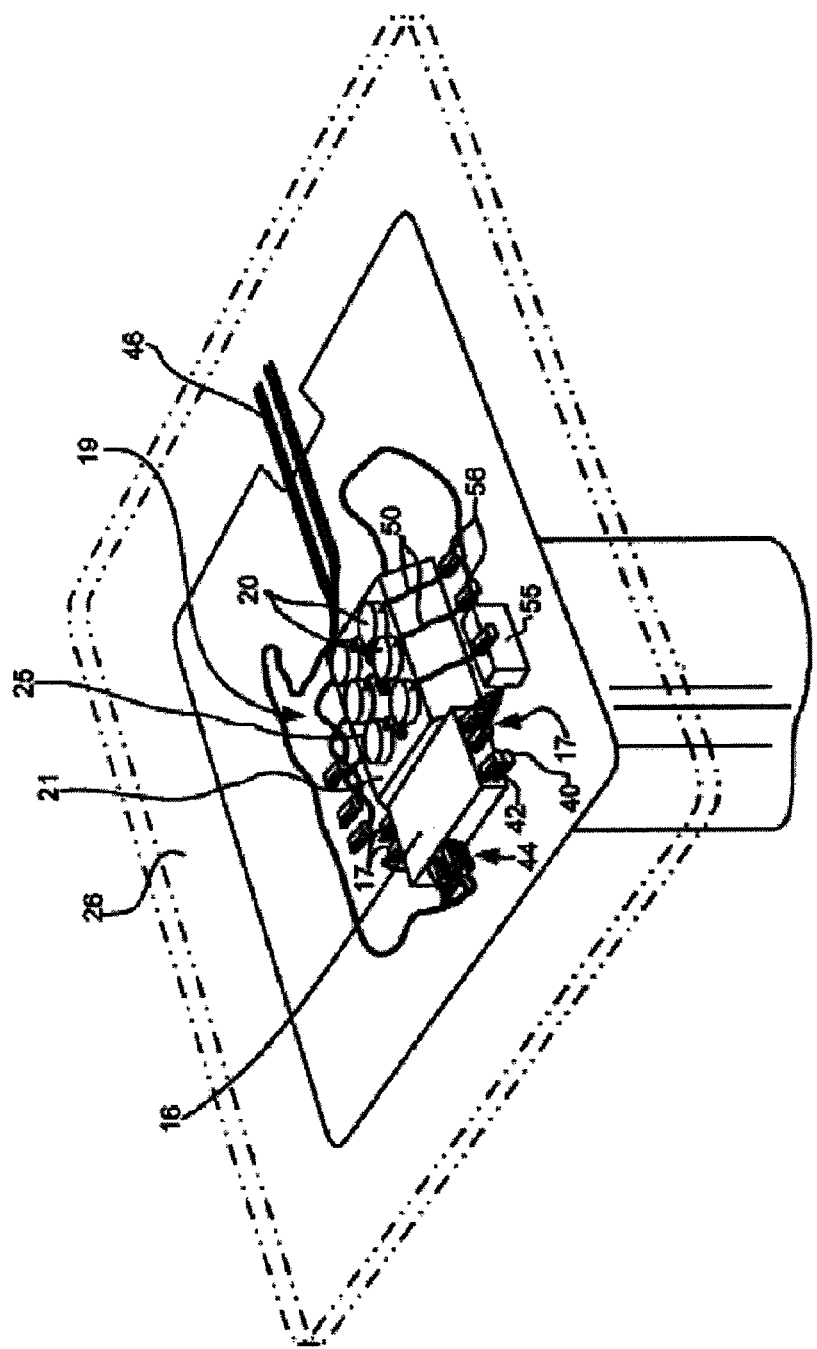
FIG. 2 is a view of a portion of the configuration shown in FIG. 1, albeit where a switcher and other components and cables that are typically hidden under the top surface of FIG. 1 are shown in perspective views.
Figure 3:
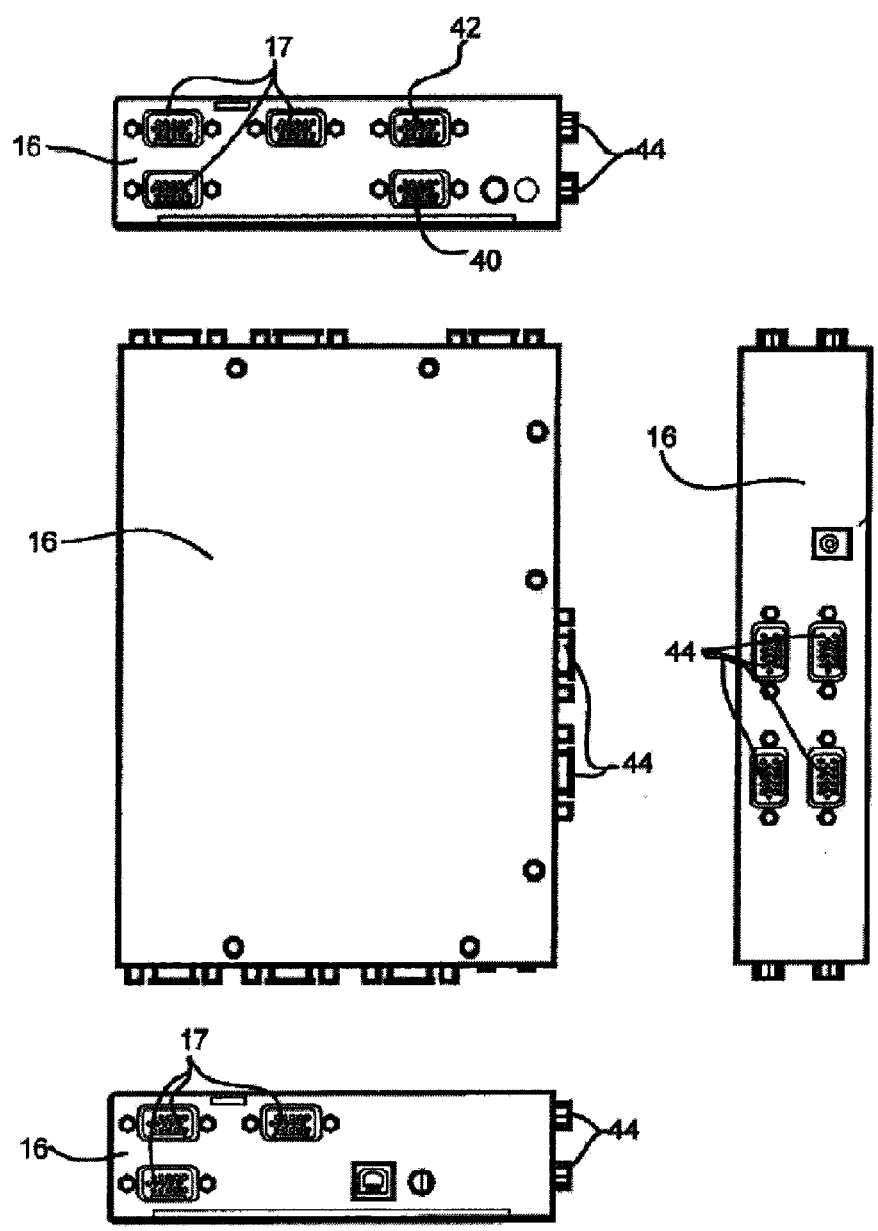
FIG. 3 includes a top plan view, end views and a side view of the switcher shown in FIG. 2.

Referring specifically to FIG. 2, components mounted within structure 24 below top member 26 include a switching device 16, a user interface assembly 19 and a power source 55. Referring also to FIG. 3, where switching device 16 is shown in four different views, switching device 16, as the label implies, can be used to switch different input video/audio sources at different input ports to change which input is feeding video/audio output ports. To this end, exemplary switching device 16 includes six input ports collectively identified by numeral 17 (three on either end of device 16), a video conference input port 42, and a PC input port 40. Device 16 includes four video/audio output ports collectively labeled 44. In operation, switching device 16 can be controlled to output video/audio from any one of the input ports 17, 40 or 42 to any one or more of output ports 44. In addition, switching device 16 is controllable so that input from two, three or four of the different inputs 17, 40 or 42 can be output simultaneously to different ones of the output ports 44.

Referring again to FIG. 2, interface assembly 19 includes a deck member 21 and six selectable control interfaces referred to as "puck" assemblies, two of which are labeled 20. Deck member 21 forms a top surface 25 for receiving and supporting the puck assemblies 20 when the puck assemblies are in stored positions below covers 39 and 41 (see again FIG. 1). Each puck assembly 20 is similarly constructed and operated in a similar fashion and therefore, in the interest of simplifying this explanation, only one puck assembly 20 will be described here in detail.

Referring also to FIG. 4, exemplary puck assembly 20 includes a puck 48 and first and second video/audio cables 50 and 52, respectively. Cable 50 is used to link puck 48 to a computer/laptop audio/video output port or other video source while cable 52 links puck 48 through a circuitous path to one of the six input ports 17 shown in FIGS. 2 and 3. In at least some embodiments, each cable 52 can be taken up by a take up assembly (not shown) below deck member 21 as an associated puck 48 is moved from a use position on top of top member 26 (see FIG. 4) to a storage position as shown in FIG. 2. For more detail regarding one possible take up assembly, see U.S. patent application Ser. No. 12/250,192 referenced above. As seen in FIG. 4, when a puck 48 is pulled into a use position on top of member 26, cable 52 can pass through gap 43 when door 39 is closed.

Figure 5:
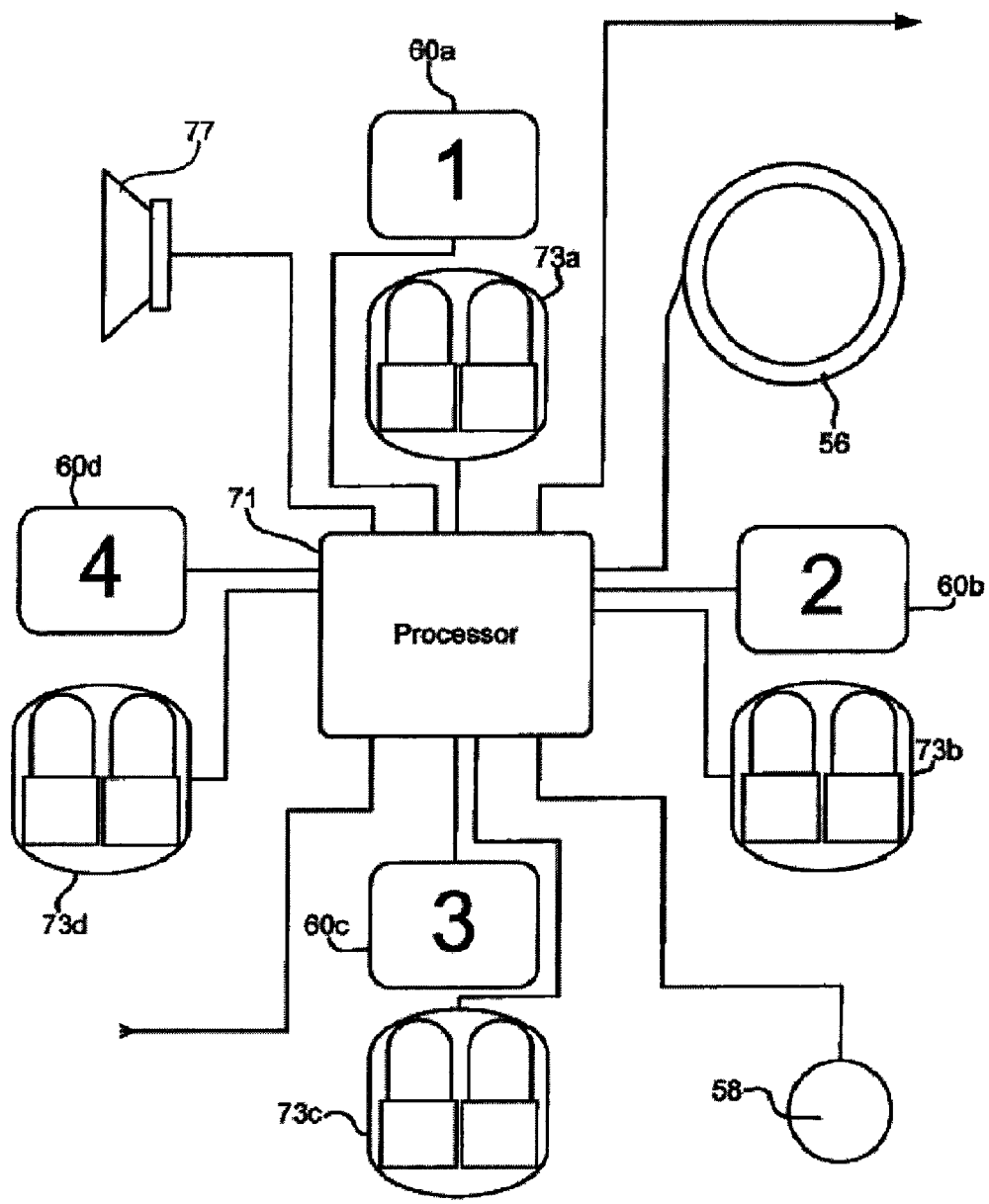
FIG. 5 is a schematic illustrating components of an exemplary control interface/puck.

Referring still to FIG. 4 and also to FIG. 5, exemplary puck 48 includes a disc or puck shaped housing 49 that supports a plurality of components including a processor 71, an on/off button 58, first through fourth selectable controls or control buttons 60 a-60 d, four illumination devices 73 a through 73 d and an illumination ring 56. Processor 71 may be a programmable microprocessor or may be configured via digital components. Processor 71 is linked to each of cables 50 and 52 and can sense when cabled 50 is linked to a video/audio source. Processor 50 is also linked to each of buttons 56 and 60 a-60 d to sense when any of those buttons are selected. Processor 50 is further linked to each of illumination devices 73 a through 73 d and ring 56 for providing power to and cutting power from each of those devices.

In at least some embodiments each of illumination devices 73 a-73 d and ring 56 can be controlled to generate light in two different colors such as white and green or can be dark so that at least two or three different states can be indicated in visually distinguished ways.

As seen in FIG. 4, each button 60 a-60 d has a different number 1, 2, 3 or 4 indicated thereon. Here, each number 1, 2, 3 or 4 corresponds to a different one of the display screens 22 a through 22 d in FIG. 1. For instance, button 60 a labeled "1" may correspond to screen 22 a, button 60 b labeled "2" may correspond to screen 22 b, and so on.

Referring again to FIGS. 4 and 5, processor 71 is programmed or configured to determine when a video source is linked to cable 50 as well as when any of buttons 58 or 60 a-60 d is selected and to indicate a current state of the puck and associated video source via the illumination devices 73 a-73 d and ring 56 for the benefit of both the puck user and others gathered around configuration 10. In addition, processor 71 provides an indication of the display configuration 12 to the puck user. In this regard, in a system including four displays (e.g., the number of common displays is M) as in FIG. 1, all four screen selection buttons 60 a-60 d (where N is the number of selection buttons) may be illuminated prior to selection to indicate four options that can be selected by the puck user. Where another configuration includes less than four displays, only a subset of buttons 60 a-60 d would be illuminated prior to selection. For instance, in FIG. 2, where the configuration only includes two displays and hence there are only two display options, only buttons 60 a and 60 b would be illuminated prior to selection to indicate only two options to select from. Here, switching device 16 may be configured to sense the number of output ports 44 to which display screens 22 a-22 d or other output devices (e.g., projectors) are linked and provide a feedback signal via cable 52 to processor 71 to indicate the number of buttons 60 a-60 d to illuminate.

In at least some embodiments the top surface of puck 48 may be formed of a black plastic where, when a button 60 a-60 d is not illuminated, the number 1, 2, 3 or 4 appears dark and blends in with the top puck surface so that the number 1, 2, 3 or 4 is essentially unnoticeable.

By providing a puck 48 that includes four screen selection buttons 60 a-60 d, a single puck type may be manufactured that can be used with any conferencing configuration including one, two, three or four common displays which reduces design and manufacturing costs appreciably.

Referring again to FIG. 4, ring 56 is a ring shaped member disposed generally along a circumferential edge of the top surface of the puck 48. because puck 48 has a generally low profile, light from ring 56 is relatively easily viewable from all directions above top member 26. Thus, from any vantage point above top member 26 conference participants can see the visual state of ring 56.

While controls 60 a-60 d are described here as buttons, it should be appreciated that controls 60 a-60 d may take any of several different forms. For instance, controls 60 a-60 d may be provided via a touch sensitive interface surface including a separately selectable location or area associated with each button 60 a through 60 d.

In at least some embodiments ring 56 is not illuminated until a video/audio source (e.g., a laptop) is linked to cable 50. Once a source is linked to cable 50, if the linked source is supplying video/audio to one or more of displays 22 a-22 d (see FIG. 1), ring 56 is illuminated in one color (e.g., white) and if the linked source is not currently driving any of displays 22 a-22 d, ring 56 is illuminated in a second color (e.g., green). Thus, ring 56 is useful as an indicator to conference participants around table top 26 that identifies the person or persons that are currently displaying information on one or more of the common displays 22 a-22 d.

Referring again to FIGS. 1 and 4, after a laptop or other video/audio source is linked to cable 50 to provide video via cable 50 to display 22 a, button 60 a is selected, to provide video to display 22 b, button 60 b is selected, and so on. Prior to each of buttons 60 a-60 d being selected, in at least some embodiments, the buttons 60 a-60 d are not illuminated. In other embodiments, prior to selection, each button 60 a-60 d may be illuminated, like ring 56, in one color and after selections, each selected button may change to a second illuminated color to distinguish selected from unselected buttons 60 a-60 d.

Referring again to FIGS. 4 and 5, central button 58 is provided as an on/off button which may be selected by a puck user to effectively cut off the user's linked laptop or other source from driving displays 22 a-22 d. Thus, where a laptop is linked to cable 50 but a user does not want to inadvertently present laptop information via the common displays, the user can simply press button 58 to render puck 48 ineffective at passing on video/audio to the displays. Here, when button 58 is selected to "turn off" the puck 48, ring 56 and buttons 60 a-60 d, in at lease some cases, are no longer illuminated.

Figure 6:
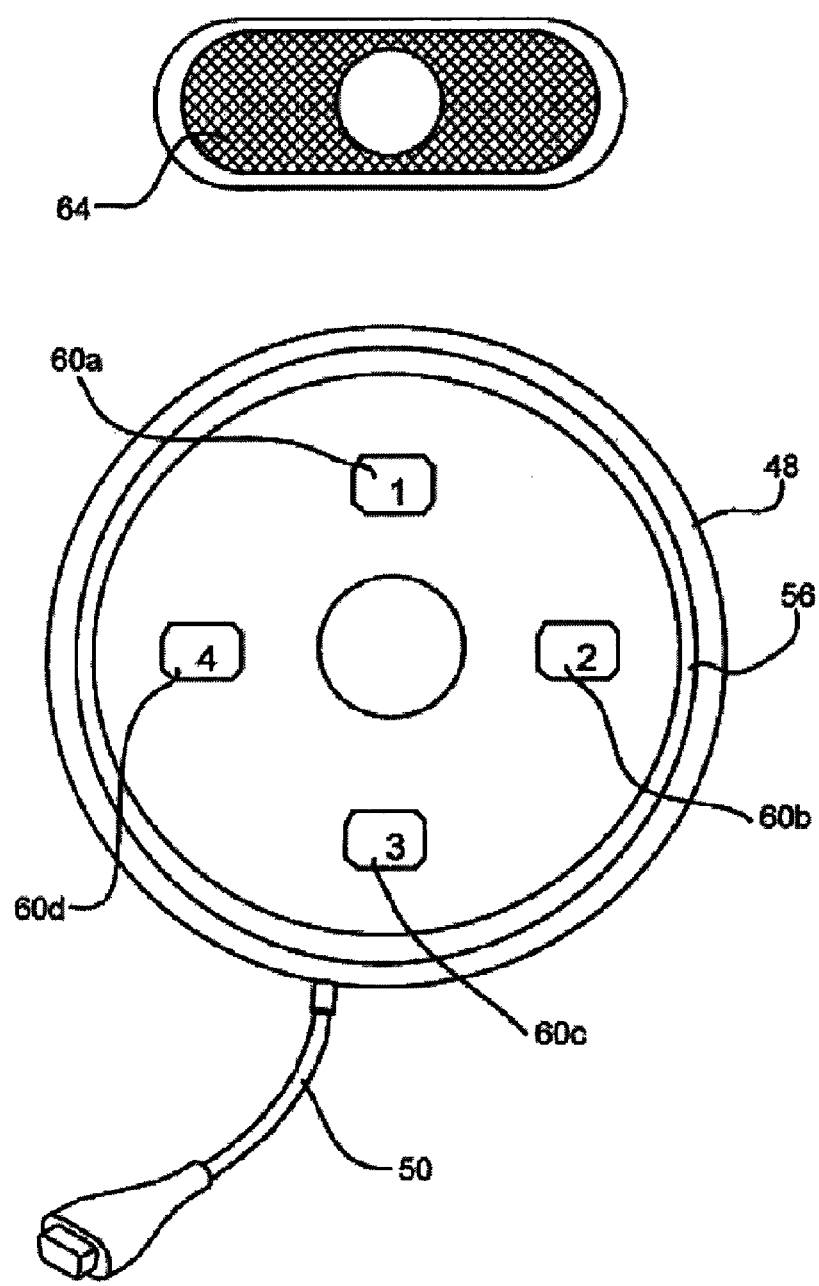
FIG. 6 is a schematic illustrating the puck control assembly of FIG. 4 and a power on button in the first state after the power on button has been selected to cause the system to begin operation.

Referring now to FIGS. 1 and 4, prior to any laptop or other source being linked to configuration 10 to drive displays 22 a-22 d, indicator button 64 may be illuminated with a white color to indicate to persons in the vicinity that configuration 10 is powered and ready for use. Hereinafter, a white light will be indicated in the figures via a double hatch (see 64 in FIG. 4) and a green light will be indicated via a single hatch (see 64 in FIG. 6). When a person wants to use configuration 10, the person presses button 64 which causes button 64 to change from white to green as shown in FIG. 6 to signal to the person that the system is powering up.

Figure 7:
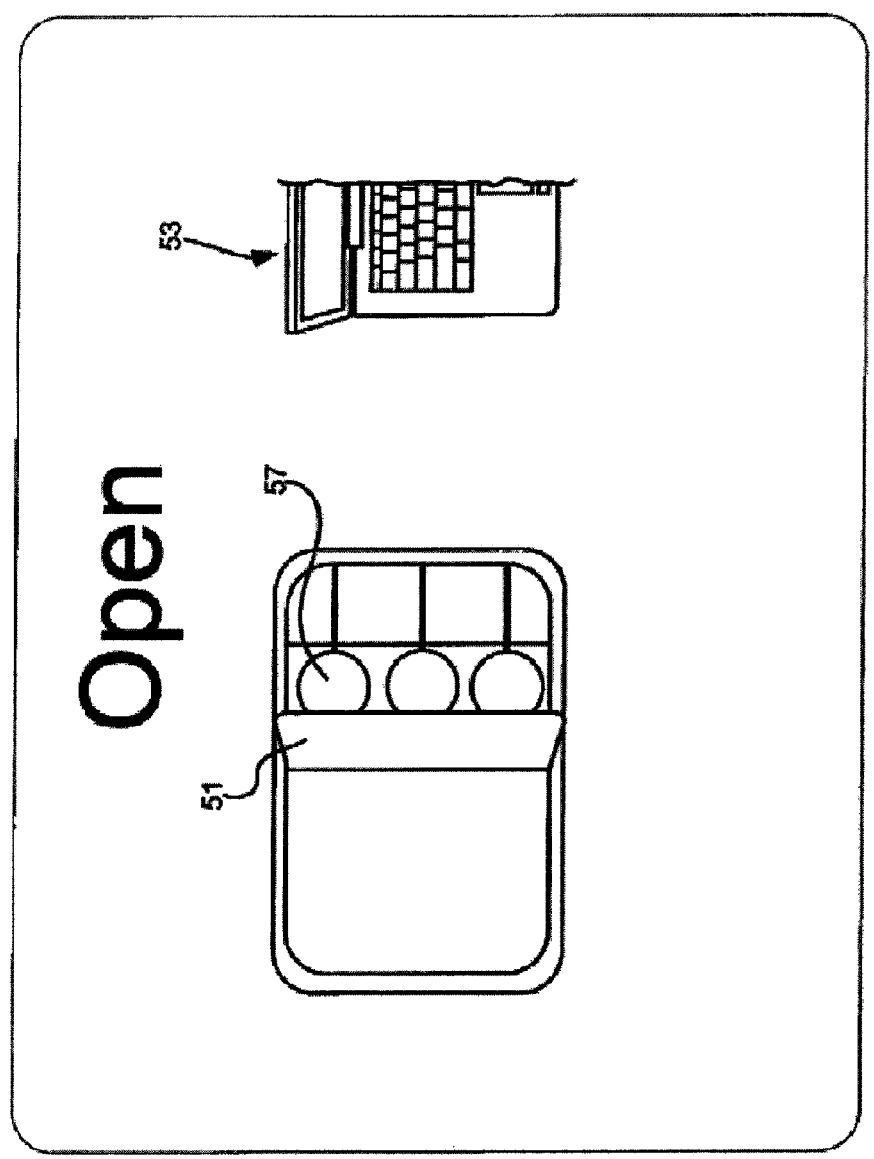
FIG. 7 is a schematic illustrating an exemplary screen shot corresponding to a portion of an instructional video that may be presented via one or more of the displays shown in FIG. 1 after the power on button is selected.
Figure 8:
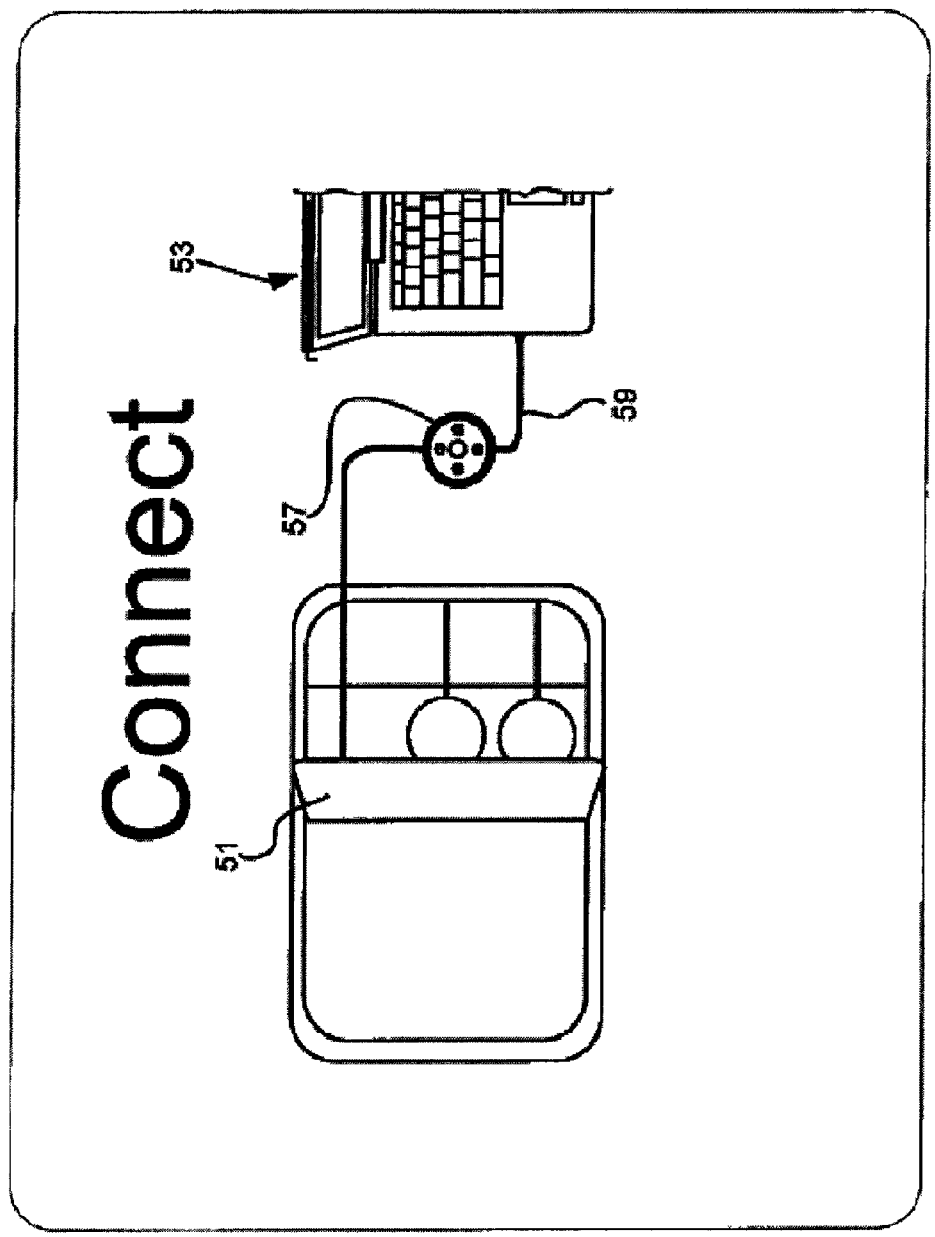
FIG. 8 is similar to FIG. 7, albeit illustrating a different portion of the instructional video.
Figure 9:
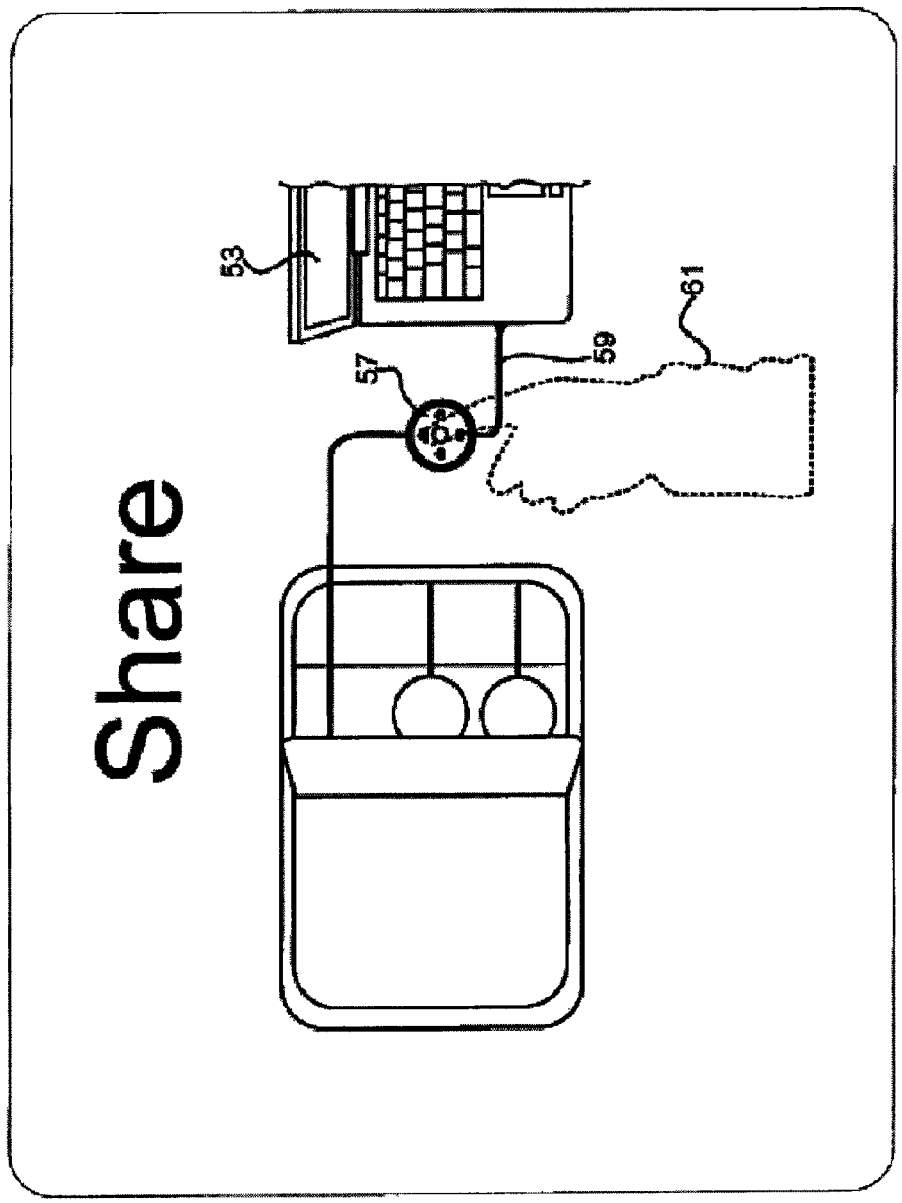
FIG. 9 is similar to FIG. 7, albeit illustrating yet a different portion of the instructional video.

In addition, when button 64 is pressed, in at least some embodiments, a short video clip is presented via one or more of displays 22 a-22 d providing simple instructions to the person who pressed button 64 regarding how to use configuration 10. Referring to FIGS. 7-9, exemplary screen shots showing images consistent with a simple instruction video are illustrated. In FIG. 7, a graphic of the utility bay door 39 opening 51 adjacent a laptop image 53 (i.e., a source image) is shown to indicate that one of the doors 37 or 41 (see FIG. 1) should be opened. In FIG. 8 a puck 57 is shown moving out of the cavity under the door 51 and onto the work surface where the cable 59 associated with the puck is linked to the laptop 53. In FIG. 9 a phantom user's hand image 61 is shown moving toward and over the puck image 57 to select one of the buttons provided thereby. Here, the instructional video clip is intentionally extremely simplified and includes only three steps "open", "connect" and "share." In at least some embodiments the instructions are only provided once and the duration is extremely short (e.g., approximately 15 seconds) which gives a user a sense that configuration 10 is particularly easy to use.

Figure 10:
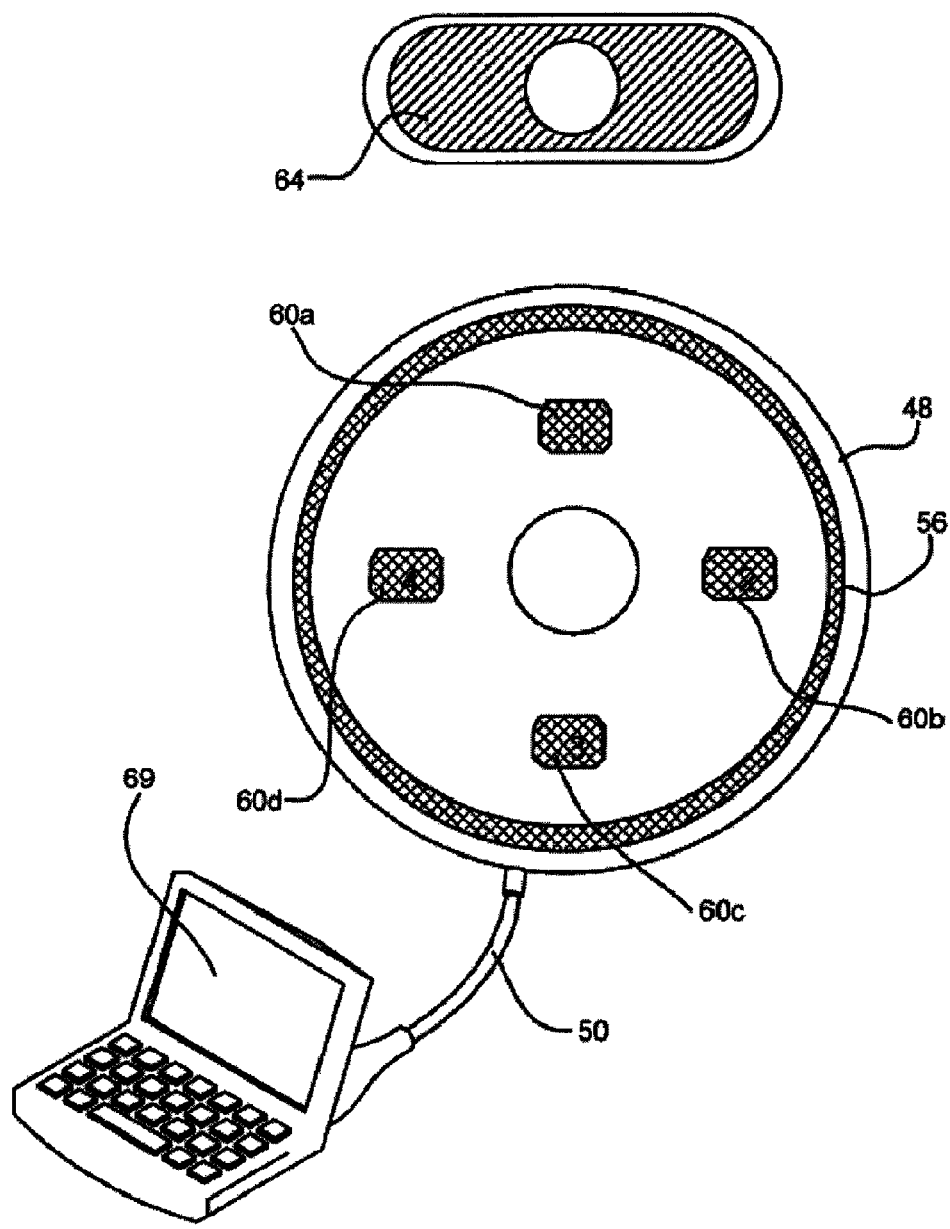
FIG. 10 is similar to FIG. 6, albeit illustrating the state of the puck when a laptop is initially connected thereto.

Following the instructions, as shown in FIG. 10, a user pulls one of the pucks 48 from the cavity below a door 39 or 41 and links a laptop 69 to the puck 48 via cable 50 (see also FIG. 1). Once a laptop 69 is linked to cable 50, ring 59 as well as selectable buttons 60 a-60 d are illuminated white (see double crosshatch in FIG. 9) to indicate to the laptop user that the user is linked and can opt to present information from the user's laptop screen via any one or combination of displays 22 a-22 d corresponding to illuminated buttons 60 a-60 d, respectively. Here, the white light ring 56 also indicates that currently the user of puck 48 is not presenting via any of displays 22 a-22 d.

Figure 11:
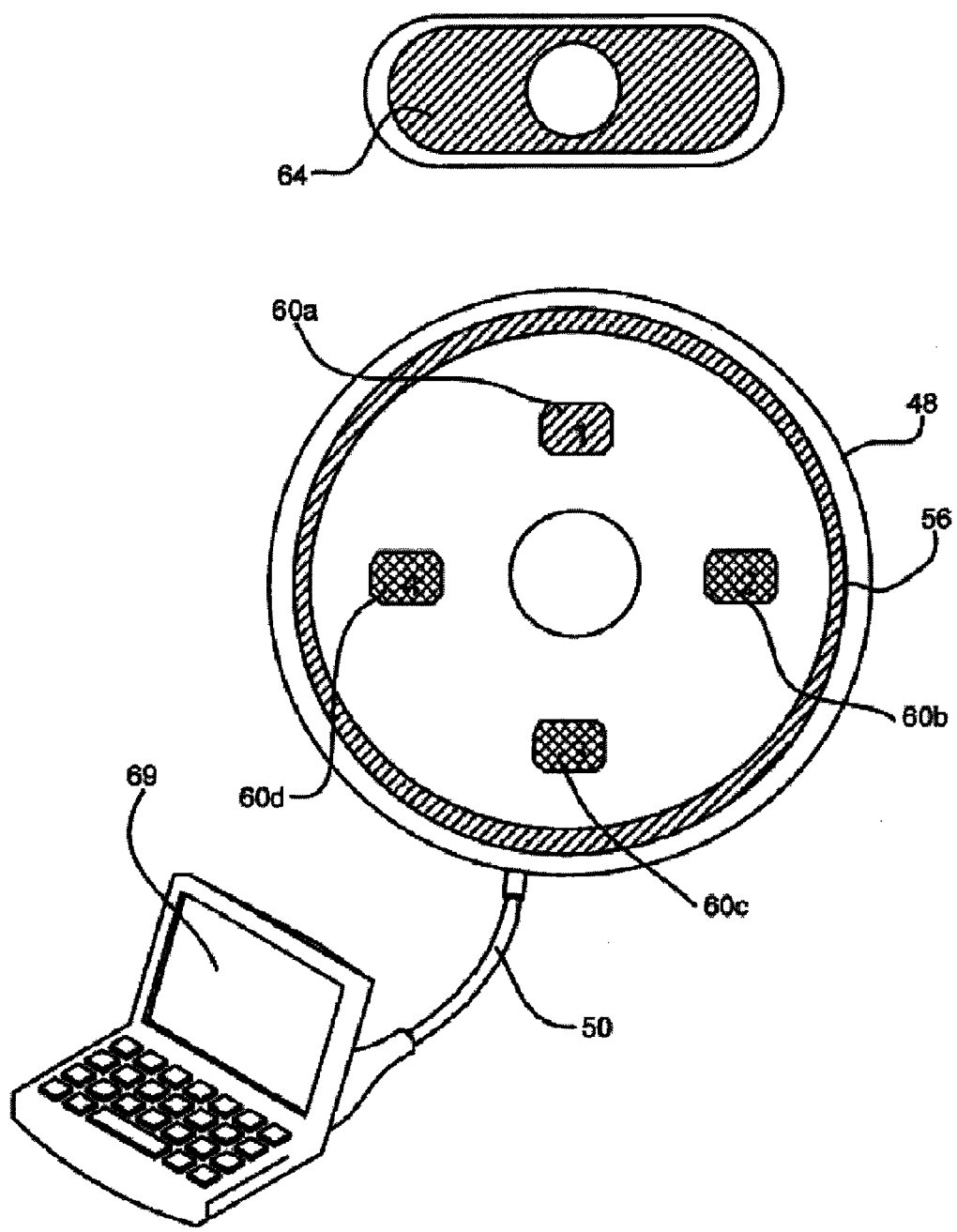
FIG. 11 is similar to FIG. 10, albeit illustrating the state of the puck after a selection button corresponding to one of the display screens of FIG. 1 has been selected.

Referring to FIG. 11, when a puck user wants to present information from her laptop 69 display via display screen 22 a, the user presses button 60 a to indicate intention to drive display 22 a. Once button 60 a is selected, four things happen. First, information currently displayed via display 22 a is replaced by the information from the user's laptop 69 display. Second, if a different laptop was previously presenting information via display 22 *a* when button 60 *a* is selected, the other user's puck illumination may change. For instance, if the other user was only displaying via display 22 *a* when displaced, the other user's puck's ring 56 will change from green back to white illumination indicating the user is no longer driving any of displays 22 *a*-22 *d*. As another instance, where another user was driving each of displays 22 *a* and 22 *c* when button 60 *a* is selected, the other user's puck ring will remain green after displacement from screen 22 *a* to indicate that the other user is still driving display 22 *c* despite being displaced from display 22 *a*. In addition, in this case, the other user's puck button 60 *a* will be illuminated white after displacement from screen 22 *a* while button 60 *c* will remain green indicating that the other user is still driving display 22 *c*.

Third, to indicate that the user of puck 48 in FIG. 10 is now driving at least one of displays 22 *a*-22 *d*, ring 56 on puck 48 changes from white to green (see single cross hatch ring in FIG. 10). Fourth, to let the puck user know which displays 22 *a*-22 *d* she is currently driving, button 60 *a* illumination changes from white to green. Here, other buttons 60 *b*-60 *d* that were not selected remain white (i.e., they are shown as double cross hatched).

Figure 12:
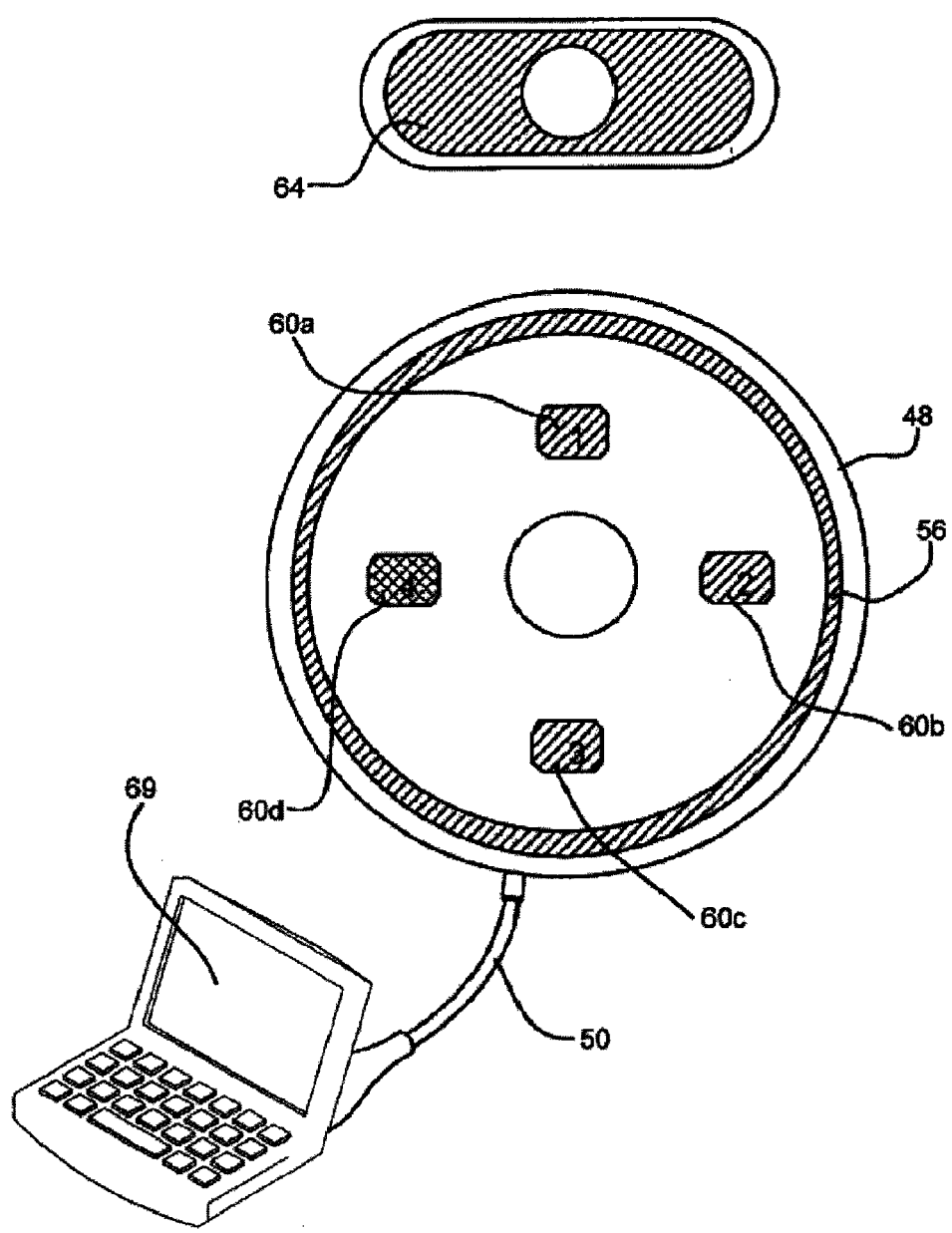
FIG. 12 is similar to FIG. 11, albeit illustrating the puck condition after three buttons corresponding to three of the display screens shown in FIG. 1 have been selected.

If the user next wants to display her laptop information via displays 22 *a*-22 *c*, referring to FIG. 12, the user selects button 60 *b* and 60 *c* which cause information from the user's laptop screen to replace any existing information on displays 22 *b* and 22 *c*, causes other puck illumination to change accordingly and causes buttons 60 *b* and 60 *c* to change from white to green illumination. At this point, as shown in FIG. 12, each of buttons 60 *a*-60 *c* and ring 56 are illuminated green while button 60 *d* remains white.

To relinquish control of a display 22 *a*-22 *d* currently controlled, in at least some embodiments, the button 22 *a*-22 *d* corresponding to a display 22 *a*-22 *d* can be selected a second time. In the iterative, to relinquish control of displays 22 *a*-22 *d*, on/off button 58 may be selected. Once display control is relinquished, puck 48 illumination is updated accordingly.

After a configuration session is over and all sources have been disconnected from cables 50, the system will eventually time out (e.g., approximately 15 minutes) and will power down so that button 64 returns to its white illuminated state (see again FIG. 4).

Figure 13:
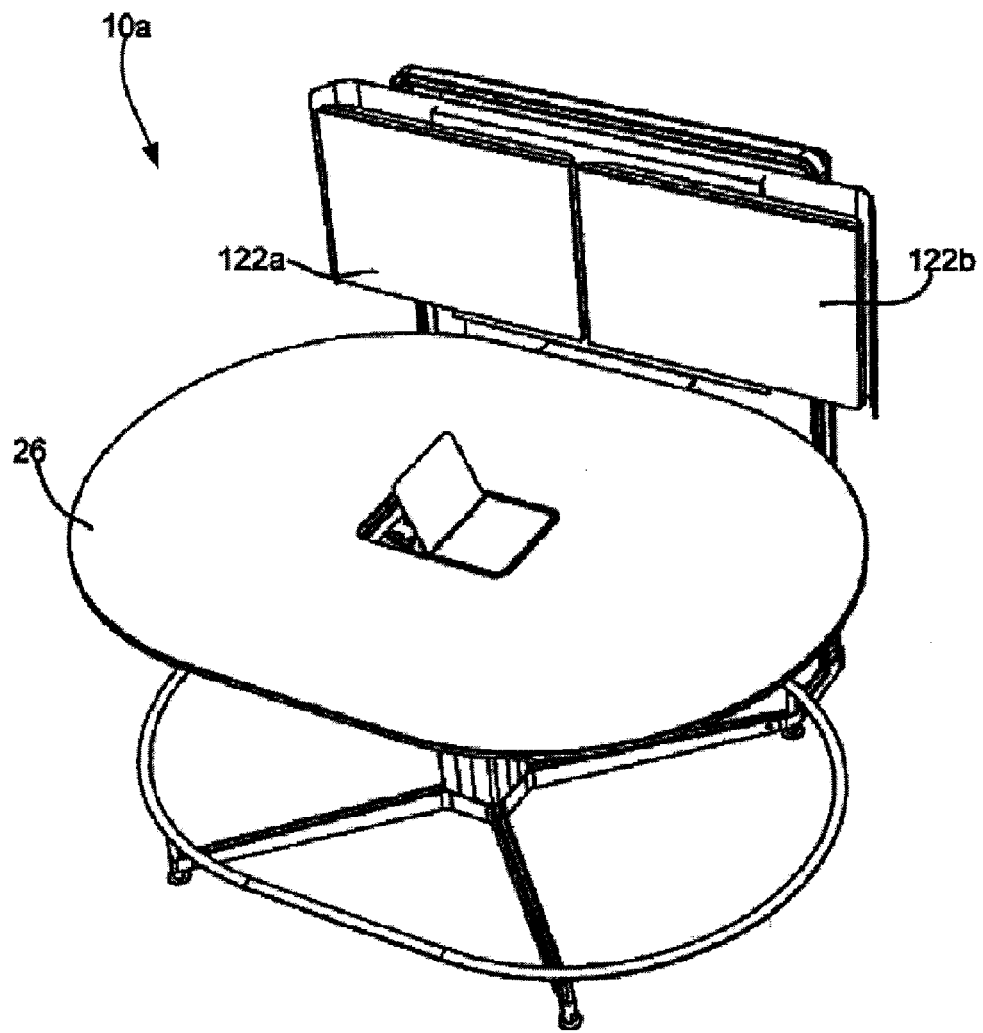
FIG. 13 is similar to FIG. 1, albeit illustrating another configuration embodiment as consistent with at least some aspects of the present invention.
Figure 14:
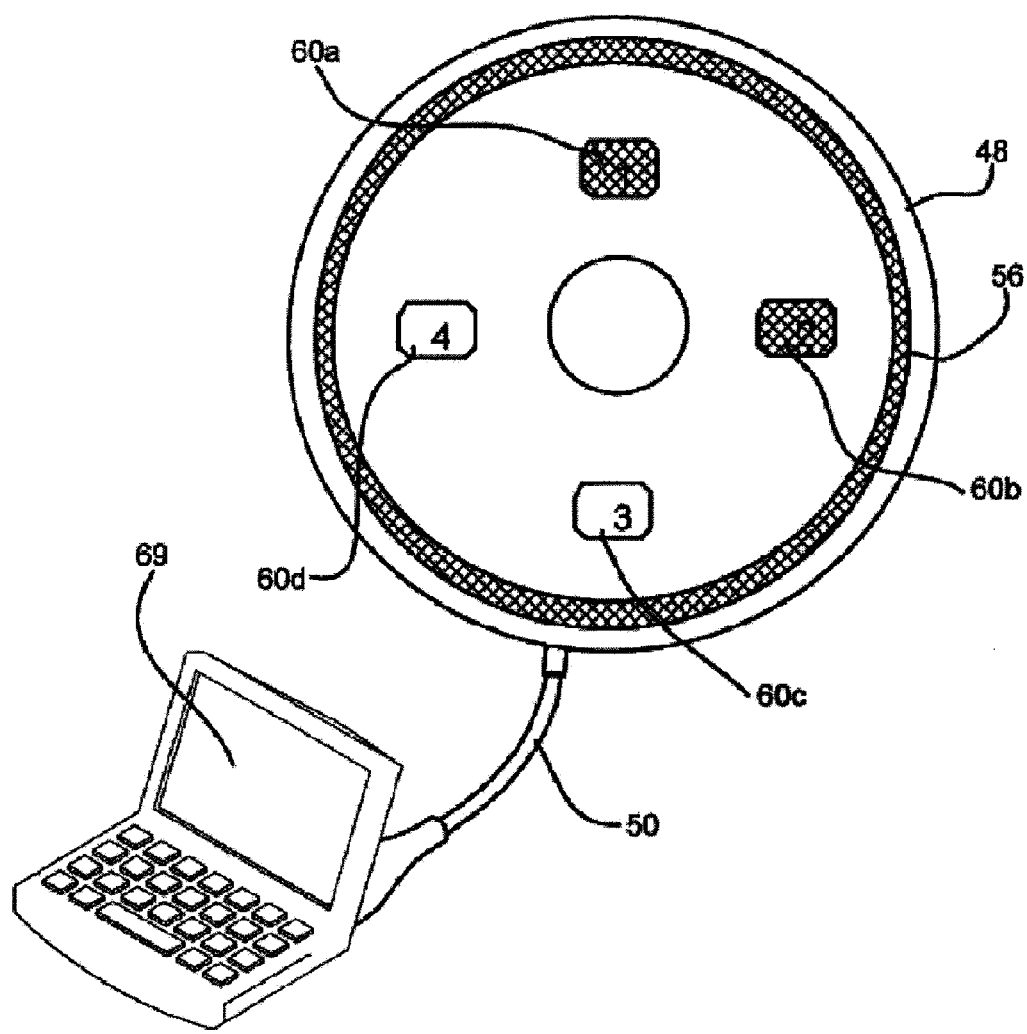
FIG. 14 is similar to FIG. 10, albeit illustrating the puck condition for the system of FIG. 12 where the system only includes two displays.

Referring now to FIG. 13, a second configuration 10 *a* that is consistent with at least some aspects of the present invention is illustrated. Configuration 10 *a* is different than configuration 10 in two general ways. First, configuration 10 has an oval table shape top member 260 as opposed to rectangular. Second, configuration 10 includes only two displays 122 *a* and 122 *d* instead of four. Here, referring also to FIG. 14, in at least some embodiments, it is contemplated that when a laptop 69 is linked to a puck 48 initially so ring 56 is illuminated white, only buttons 60 *a* and 60 *b* would illuminate white thereby indicating to a user that there are only two display choices 122 *a* and 122 *b* instead of four. Other operation of configuration 10 *a* is similar to that described above.

Figure 15:
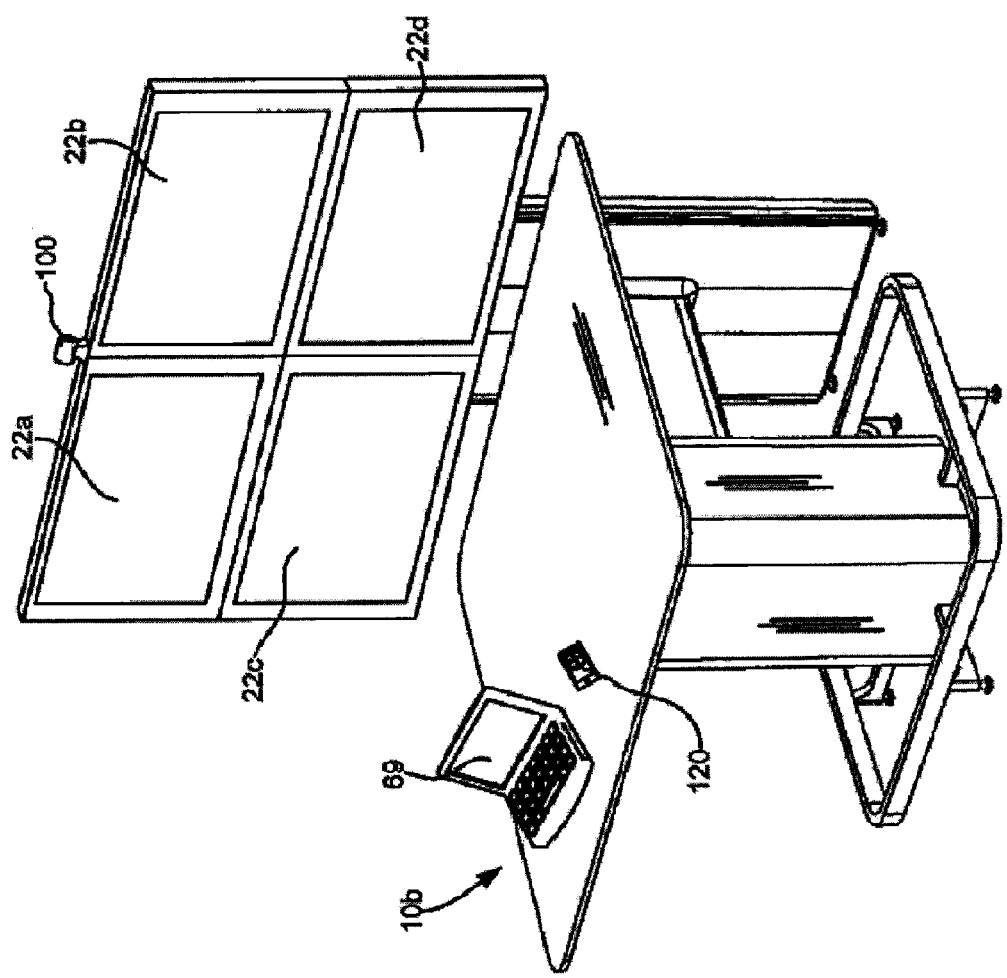
FIG. 15 is similar to FIG. 1, albeit illustrating a system that includes a wireless access device so that laptops and other video/audio sources can link provide data to the displays wirelessly.
Figure 16:
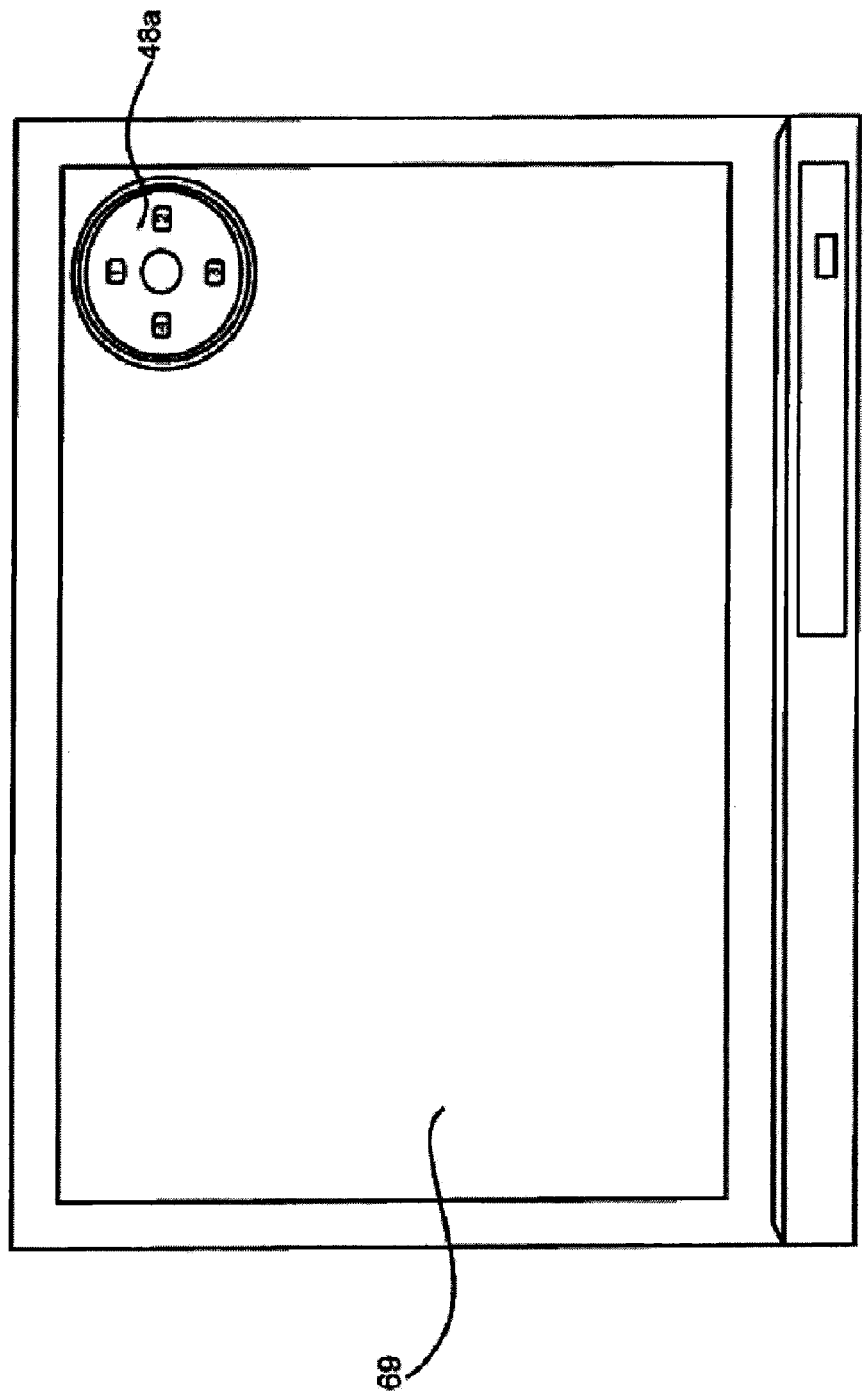
FIG. 16 shows a puck "widget" that may be presented via a laptop display screen.

Referring now to FIG. 15, in at least some embodiments it is contemplated that laptops 69 and other visual/audio sources may be able to wirelessly link up to a configuration 10 *b* processor via a wireless access device 100 or the like. In this case the configuration 10 *b* may not need a utility bay and will not require cable hookups or physical pucks. Here, where a source 69 is associated with the configuration for control purposes, referring also to FIG. 16, a software "widget" puck representation or control interface representation (hereafter a "widget") 48 *a* may be provided on screen. In this case it is contemplated that the widget 48 *a* will have an appearance similar to the appearance of interface 60 and button 58 where different widget areas corresponding to buttons 60 *a*-60 *d* and 58 will be selectable via a mouse controlled cursor or touch (in the case of a touch sensitive display) for selection. In this case it is contemplated that when a virtual button on the widget is selected, the functionality and illumination described above with respect to puck 48 would occur. When the widget ring 56 is illuminated, the laptop could beep or buzz (i.e., create an audible signal of some type) to indicate which laptop has taken control.

Figure 17:
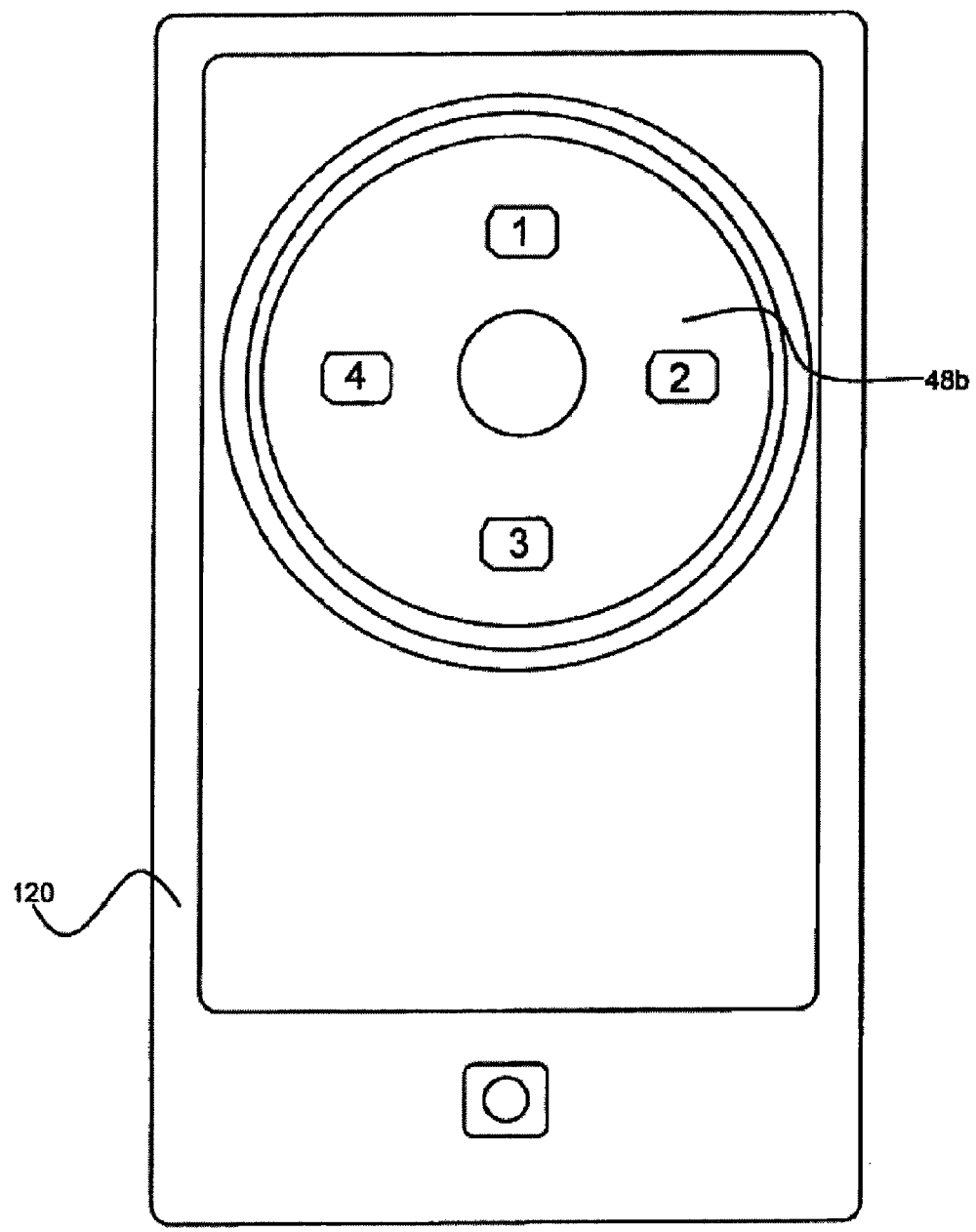
FIG. 17 shows a puck "widget" provided on a touch sensitive palm type computing device.

In yet another embodiment where a laptop source user has a touch screen phone or other palm type computing device in addition to the laptop/source, a widget may be provided via the palm type device where the widget size can be enlarged to include much of the display. To this end see FIG. 17 that shows a palm type device 120 that includes a large touch screen where a virtual puck palm device 120 and laptop 69 would have to be associated in some way so that palm device control would cause the correct/associated laptop information to drive appropriate displays 22 *a*-22 *d*.

Figure 18:
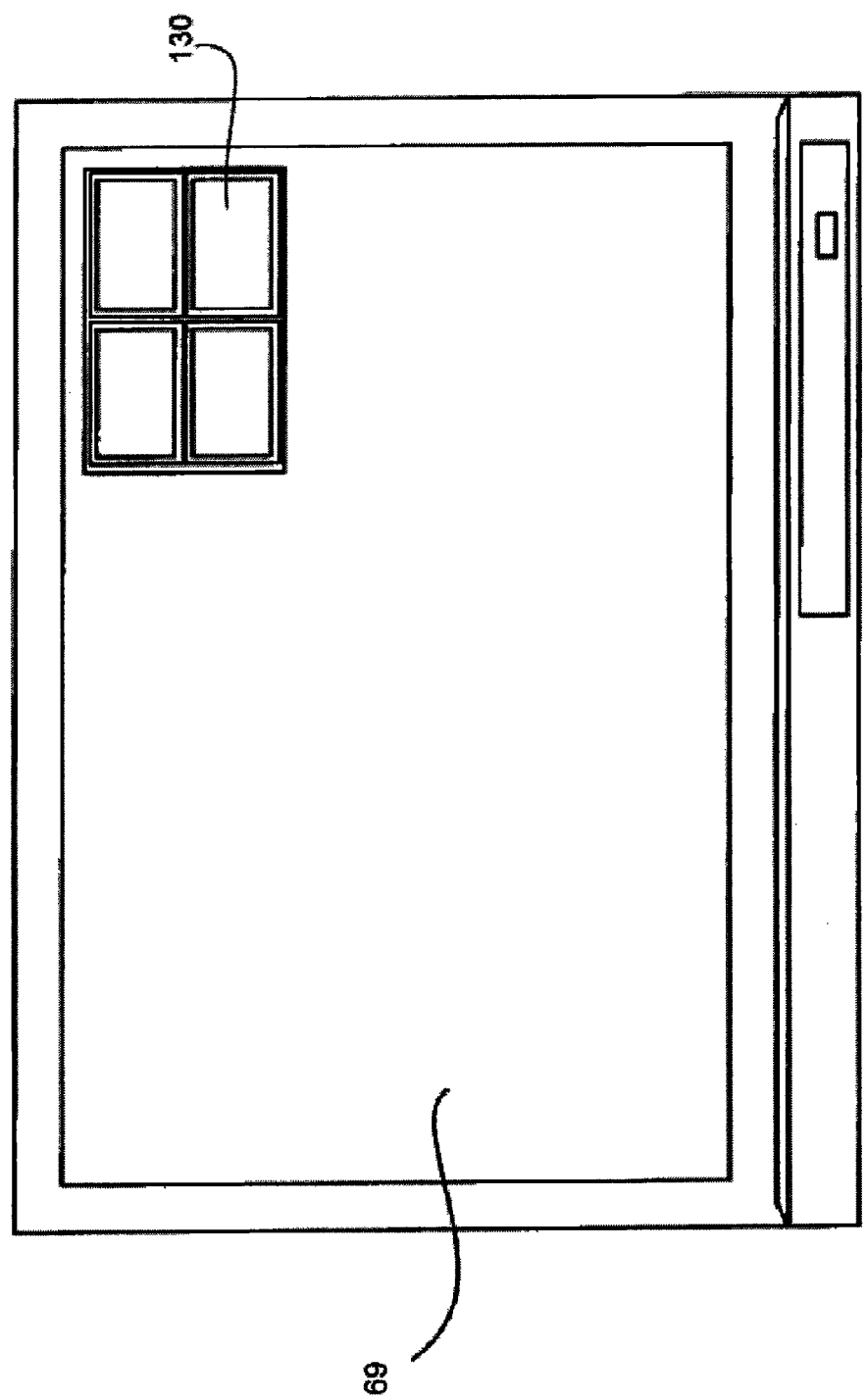
FIG. 18 is similar to FIG. 16, albeit showing a different appearing virtual control interface.

In a wireless system where a widget or virtual control interface is presented via a display screen, the control interface may take any of several different forms. For instance, where a configuration includes four common displays (see FIG. 1), the control interface 130 may have an appearance as in FIG. 18 that shows screen selections in a pattern that mimics the pattern of the four display screens 22 *a*-22 *d*. Where a system includes only two displays (see FIG. 13), the virtual control interface may only include an image of two selectable displays, and so on.

Figure 19:
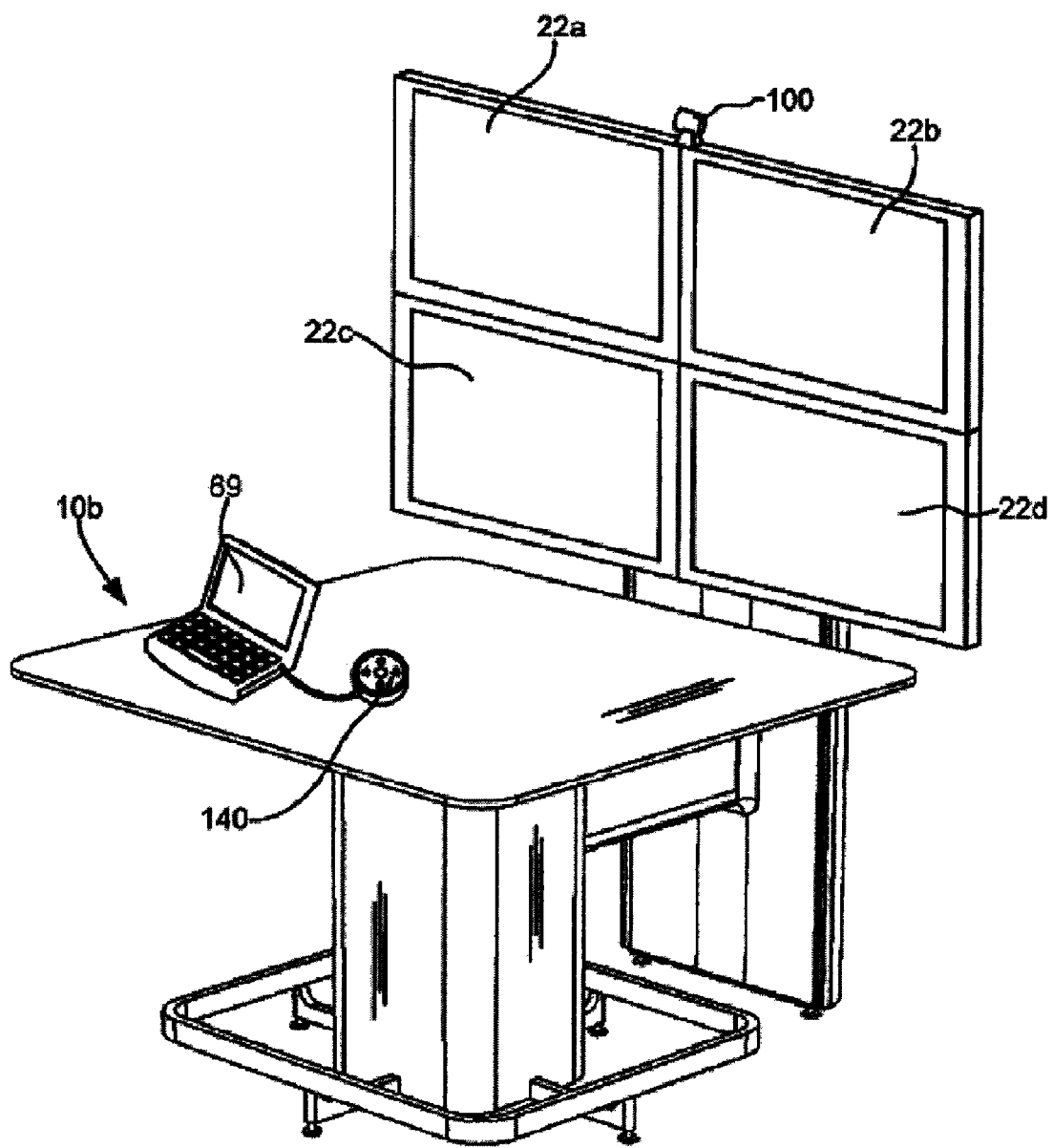
FIG. 19 is similar to FIG. 15, albeit where a mechanical interface is included for use with a source.

Referring to FIG. 19, in wireless embodiments, a mechanical control interface 140 akin to puck 48 described above may be provided where the interface 140 links to a USB port or the like on a laptop 69. Here, interface 140 operates in the same fashion as puck 48 described above except that control signals from interface 140 are provided to a switching device wirelessly through the laptop. In this case interface 140 still provides a visual queue to conference participants using configuration 10 *b* indicating which laptop(s)/source(s) is being used to drive the displays.

In some embodiments one or more projectors (not illustrated) may replace the displays 22*a*-22*d*. Where a system includes a single projector, the projected image may be divided into two, four, etc., separate presentation spaces where each switching device output 44 drives a different one of the presentation spaces so that multiple sources can be used to display in different spaces simultaneously.

Above the specification of U.S. Pat. No. 8,074,571 was incorporated by reference in its entirety. Here, we present the U.S. Pat. No. 8,074,571 specification in full in the interest of providing a single document that includes a complete specification.

Small group (e.g., 4 to 8 attendees) conference tables have been designed that include one or more large display screens adjacent a table top edge or wall mounted or ceiling hung display or projection screens offset a distance from a table top edge. Here, the idea has been to provide information at or near a table edge for attendees to refer to during discussions and presentations. In many cases attendees use laptops or other digital information sources to drive the information presented via the display. To enable laptops to be powered and to access network data, power and data receptacles are often provided within conference tables (e.g., below grommet doors or covers that are flush with the top surface of a table top). A laptop user typically uses her own power and data cables to link to the receptacles. In addition, conference rooms are often equipped with audio and video cables to link a laptop to a display or to a projector for controlling presented information.

In many cases it is desirable to allow several attendees to control displayed information at different times during a conference. One way to allow several attendees to present information via a display is to sequentially have each presenter link to the display or projector via the audio and video cables. Here, transitions between presenters take time and are extremely disruptive.

One other way to allow several attendees to present is to provide separate audio and video cables for each presenter and a switcher device that enables each of the attendees to take control of the display screen via selection of a button associated with the presenters audio and video cables. One such switcher/cable/button assembly of this type is the DTS-TS8 switcher assembly by Elecom that provides eight separate audio/video cable assemblies and eight associated buttons along with a switcher that has eight input ports and one screen output port.

While a switcher and associated cables enable relatively quick transitions between presenters, these solutions typically require a large number of cables to be strewn across the top surface of a conference table. To this end, in addition to audio and video cables, power and data cables are often disposed on the top surface of the conference table and the garble of cables is unsightly and impedes use of the table top for other purposes (e.g., laying out of papers, etc.).

In addition, because the source selection buttons and associated audio and video cables are needed to interface with the switcher, these cables are typically kept with the switcher. For instance, where a switcher is to be used in a specific conference room, the audio/video/control cables (e.g., eight) are typically kept in the specific conference room and usually will be left linked to the switcher device for subsequent use. Thus, when audio/video/control cables are not being used (e.g., after a conference has been completed), the cables often remain strewn across a table top and the overall scene is unsightly.

Some conference table power and data/communication cable management solutions have been developed. To this end, cable systems have been developed that include spring loaded cable dispensers for dispensing network communication types cables (e.g., CAT-5 cables) for use at a conference table. Here, a dispenser housing is provided that mounts to the top surface of a table top or the like and a plurality (e.g., 8) of cable dispensers are mounted within the housing. One end of each cable can be pulled against the force or the spring out of each dispenser and plugged into a laptop. When a cable is not in use, the cable can be retracted via the spring force back into the dispenser and housing. While this solution works well for relatively thin communication type cables, this solution has several shortcomings. First, because the dispenser housing is located on top of the table top, the housing is always observable and reduces the elegance of an associated conference table and space. Second, where larger diameter cables such as audio and video cables are used, a simple spring loaded dispenser may need to be relatively large and the spring force would have to be relatively high to accomplish the retracting activity and therefore the overall size of the dispensing system would have to be increased appreciably. Thus, a spring loaded table top mounted dispensing system is not practical for many applications and, at best, solves the data cable management problem in a relatively unsightly manner.

In addition, conference tables are known that include power and data receptacles mounted below a table top member where the top member forms openings for passing cables for receptacle hookup and where cable receiving and retaining cavities have been formed adjacent the receptacles for receiving and storing excess power and data cable lengths. Thus, for instance, where a data cable is ten feet long but a laptop is positioned on a table top surface three feet from a data port/receptacle, the seven additional feet of cable can be tucked away in the cable receiving cavity under the top member.

After a conference has been completed, power and data cables often are removed from the conference space. To this end, currently most laptop computers come with their own power and data cables and therefore attendees plug in to receptacles using their own power and data cables which are removed after use. Thus, in most cases power and data cables do not pose an aesthetic problem when a conference is not being conducted within a conference space.

Thus, while solutions for managing power and data cables have been developed, similar solutions have not been developed for audio/video/control cables that form part of a switcher system and that typically remain within a conference space along with a switcher device after a conference has been completed.

It has been recognized that a storage space can be provided below a table top opening for receiving control cables when the cables are not in use or to receive portions of control cables that are not in use. It has also been recognized that a weight of some type can be linked to each of the control cables below the top surface where the weight tends to pull the cable into the space below the table top to aid a cable user in moving the cable back into the space when not in use. Moreover, it has been recognized that the weight can substantially automatically take up any slack in a control cable between a handset that includes a control button and the table top opening so that excess cable is removed from the table top surface.

The handset can be constructed to be relatively heavy so that the handset can be placed on the table top surface and remain in its disposed position despite the weight tending to pull the handset and cable back into the storage space. Also, to this end, the handset may include rubber or tacky plastic strips or foot members on an undersurface to help maintain the position of the handset after placement on a work surface or the like. Moreover, the handset may include rubber strips or the like on a side or circumferential surface to help retain the handset in a receiving cavity during storage. The handset may, in some cases, include audio and/or video jacks that can be linked to a laptop computer or the like. Here, the handset weight serves the additional purpose of reducing force applied to laptop audio and video jacks. In at least some cases a deck member may be provided in the space below the table top member and on which the handsets can be placed and supported when not in use and door members may be provided to substantially cover (e.g., leave a slot open along one or more edges for cables to pass through) the opening when desired.

Consistent with the above, at least some at least some embodiments of the invention include a conferencing assembly for use with at least one computer, the assembly comprising a table top member having top and bottom surfaces and forming a table top opening, a leg support structure supporting the top member is a substantially horizontal orientation, a display screen associated with the top member and supported adjacent the top surface, a switcher for controlling input to the display screen, a plurality of handsets, each hand set including a selector button usable to send a signal to the switcher thereby causing the switcher to link a computer associated with the selector button to the display, a plurality of handset cables, each handset cable having first and second ends linked to the switcher and an associated selector button, respectively, for passing signals from the selector buttons to the switcher, a take up assembly including a separate weight for each of the handset cables, the take up assembly disposed below the top member and aligned with the table top opening, each handset cable linked to an associated weight, each weight applying a force tending to pull the second end of the associated handset cable into the opening.

In at least some cases each weight includes a pulley wheel, each handset cable passing around an associated pulley wheel. In at least some cases each weight further includes first and second plates mounted on opposite sides of the pulley wheel. In at least some cases the plates are mounted to the pulley wheel axis via a pin.

In at least some cases the assembly further includes a guide structure, the guide structure forming a separate substantially vertical channel for each of the pulley wheels, each pulley wheel moving up and down within a channel as the second end of an associated cable is pulled away from and allowed to move toward the opening, respectively. In at least some cases the assembly includes at least four separate handsets. In at least some cases the take up assembly further includes a deck member having a top deck surface below the top surface of the table top member, the deck member forming a separate opening for each of the handsets, each cable passing through a separate one of the openings formed by the deck member, the handsets received on the deck surface of the deck member thereby limiting downward movement through the opening formed by the deck member.

In at least some cases the deck surface forms a recess proximate each of the openings formed by the deck member, each recess formed to receive an associated one of the handsets. In at least some cases the deck surface is substantially parallel to the top surface of the table top member. In at least some cases the assembly further includes at least one utility wall member extending upward from the deck surface below the table top member and at least one of a power and a data receptacle mounted in the wall member for access through the table top opening.

In at least some cases the assembly further includes a utility island extending upward from the deck surface, the utility wall forming a circumferential wall about the island, the island further including a top mounting surface that is substantially parallel to the top surface of the table top member. In at least some cases the island includes at least first, second, third and fourth receptacles, the first and second receptacles facing in substantially opposite directions and the third and fourth receptacles facing in substantially opposite directions. In at least some cases the assembly further includes first and second door members hingedly mounted to the mounting surface for movement between open and closed positions, each door member including a top door surface, when the door members are in the closed positions, the door members substantially closing the table top opening and the door surfaces substantially flush with the top surface of the table top member. In at least some cases an opening edge defines the shape of the table top opening, the door members forming a gap with the opening edge when in the closed positions.

In at least some cases the deck member has a circumferential edge, the assembly further including a well wall member extending upward from the circumferential edge of the deck member to the bottom of the table top member so that the deck and the well wall member form a cavity below the table top member for receiving cables and the like. In at least some cases each handset cable further includes a video cable and each handset further includes a video jack proximate the button for linking to an associated computer.

In at least some cases each handset cable further includes an audio cable and each handset further includes an audio jack proximate the button for linking to an associated computer. In at least some cases each handset weighs at least one pound.

Some embodiments include a conferencing assembly for use with at least one computer, the assembly comprising a table top member having top and bottom surfaces and forming a table top opening, a leg support structure supporting the top member is a substantially horizontal orientation, a display screen associated with the top member and supported adjacent the top surface, a switcher for controlling input to the display screen, a plurality of handsets, each hand set including a selector button usable to send a signal to the switcher thereby causing the switcher to link a computer associated with the selector button to the display, a plurality of handset cables, each handset cable having first and second ends linked to the switcher and an associated selector button, respectively, for passing signals from the selector buttons to the switcher, a deck member having a top deck surface below the top surface of the table top member and aligned with the table top opening, the deck member forming a separate opening for each of the handsets, each handset cable passing through a separate one of the openings formed by the deck member, the handsets received on the deck surface of the deck member thereby limiting downward movement through the openings formed by the deck member and a take up assembly including a separate pulley wheel for each of the handset cables, the take up assembly disposed below the deck member, each handset cable linked to an associated pulley wheel, each pulley wheel applying a force tending to pull the second end of the associated handset cable toward the deck top.

In some embodiments the leg support structure form a leg cavity, the deck member and take up assembly disposed within the leg cavity. In some embodiments the switcher is also disposed within the leg cavity. Some embodiments further include a totem assembly and a bridge member, the totem assembly having top and bottom ends and a mounting surface, the totem disposed adjacent the top member with the mounting surface above the top surface of the table top member, the bridge member having first and second ends secured to the leg support structure and the totem assembly, respectively, the display screen mounted to the mounting surface adjacent the top surface of the table top member.

Other embodiments include a conferencing assembly for use with at least one computer, the assembly comprising a table top member having top and bottom surfaces and forming a table top opening, a leg support structure supporting the top member is a substantially horizontal orientation, a display screen associated with the top member and supported adjacent the top surface, a switcher for controlling input to the display screen, a plurality of handsets, each hand set including a selector button usable to send a signal to the switcher thereby causing the switcher to link a computer associated with the selector button to the display, a plurality of handset cables, each handset cable having first and second ends linked to the switcher and an associated selector button, respectively, for passing signals from the selector buttons to the switcher and a deck member having a top deck surface below the top surface of the table top member and aligned with the table top opening, the deck member forming a separate opening for each of the handsets, each handset cable passing through a separate one of the openings formed by the deck member, the handsets received on the deck surface of the deck member thereby limiting downward movement through the openings formed by the deck member.

Some cases further include a take up assembly including a separate weight for each of the handset cables, the take up assembly disposed below the deck member, each handset cable linked to an associated weight, each weight applying a force tending to pull the second end of the associated handset cable toward the deck top.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

Figure 33:
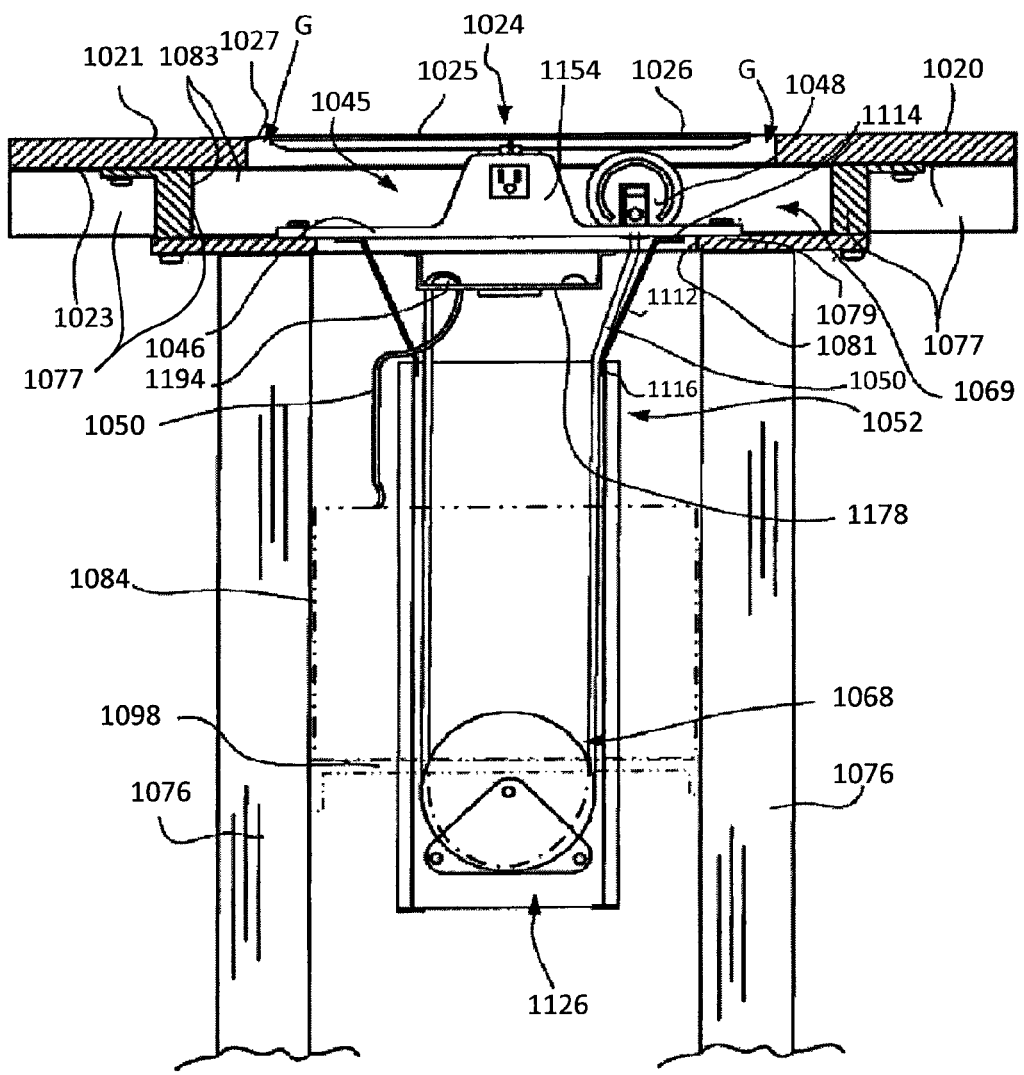
FIG. 33 is a partial cross sectional view showing the wire management assembly installed in a leg cavity with a single handset in a stowed position.

Referring now to the drawings wherein like reference numerals correspond to similar elements throughout the several views and, more specifically, referring to FIGS. 20-25, the present invention will be described in the context of an exemplary conferencing table configuration or assembly 1010 including a table assembly 1012, a totem/display assembly 1014 and a bridge assembly 1016. Table assembly 1012 includes a leg support structure 1018, a table top member 1020 and wire management assembly 1024. Referring also to FIGS. 25 and 33, leg support structure 1018 includes vertical leg members 1076, horizontal foot members 1080, a foot rail 1022, horizontal shoulder members 1077 and a top plate 1079. In at least some embodiments, four vertical leg members 1076 are provided (only two illustrated) and the leg members are spaced apart to form a rectilinear leg cavity 1082. Four foot members 1080 extend from the vertical leg members 1076 or other leg structural components (e.g., horizontal members that extend between bottom ends of the vertical leg members 1076) in four opposite directions that provide stability to the leg members 1076 and other assembly components thereabove. Foot rail 1022 is mounted to the top ends of vertical standoffs (not labeled) that extend up from distal ends of the foot members 1080 and, in the illustrated embodiment, forms a generally square shaped foot rest that circumscribes and is spaced apart from the vertical leg members 1076.

The top plate 1079 is a rigid rectilinear member that forms a square plate opening 1081 (see FIG. 33 specifically). Top plate 1079 is mounted via welding or mechanical fasteners to the top ends of vertical leg member 1076 opposite foot members 1080 with the plate opening 1081 aligned with leg cavity 1082 there below. Although not illustrated or separately labeled, top plate 1079 forms a plurality of screw holes for passing screws used to mount other assembly components thereto. Screws are used to secure shoulder members 1077 to a top surface 1085 of top plate 1079. Once shoulder members 1077 are secured to top plate 1079, internal surfaces 1083 of shoulder members 1077 and the top surface 1085 of top plate 1079 form a separate well or cavity 1069 (see FIG. 33) that resides generally above leg cavity 1082.

In at least some embodiments, leg housing member 1030 is a three-sided leg structure that can be slid over and mechanically fasten to the vertical leg members 1076 to enclose the leg channel 1082.

Referring once again to FIGS. 20-24, table top member 1020 is a rectilinear, planar and rigid member having top and bottom surfaces 1021 and 1023, respectively. Referring also to FIG. 33, top member 1020 forms a central substantially rectilinear opening 1027.

Figure 24:
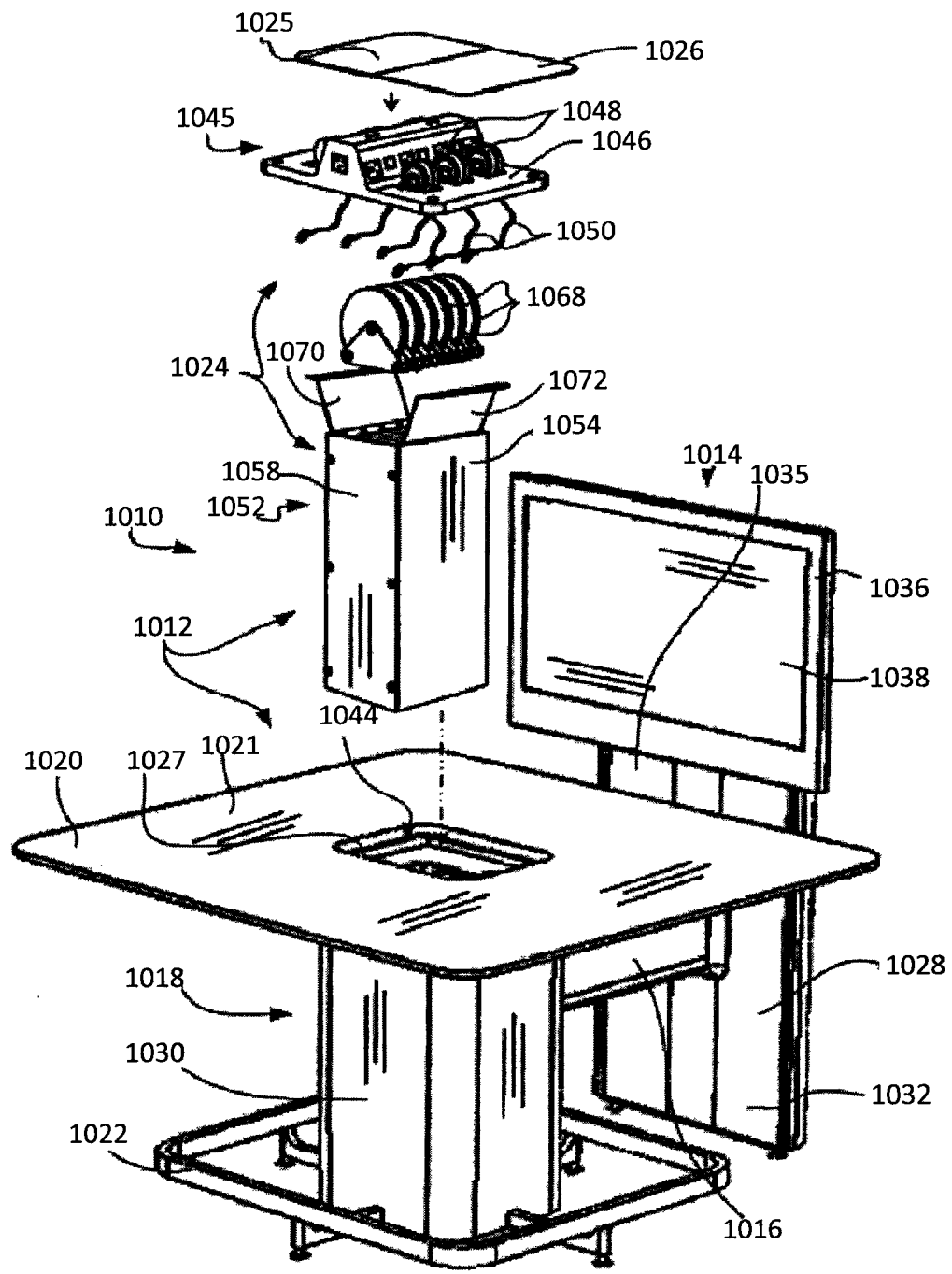
FIG. 24 is a partially exploded perspective view of the conference table assembly of FIG. 20.
Figure 25:
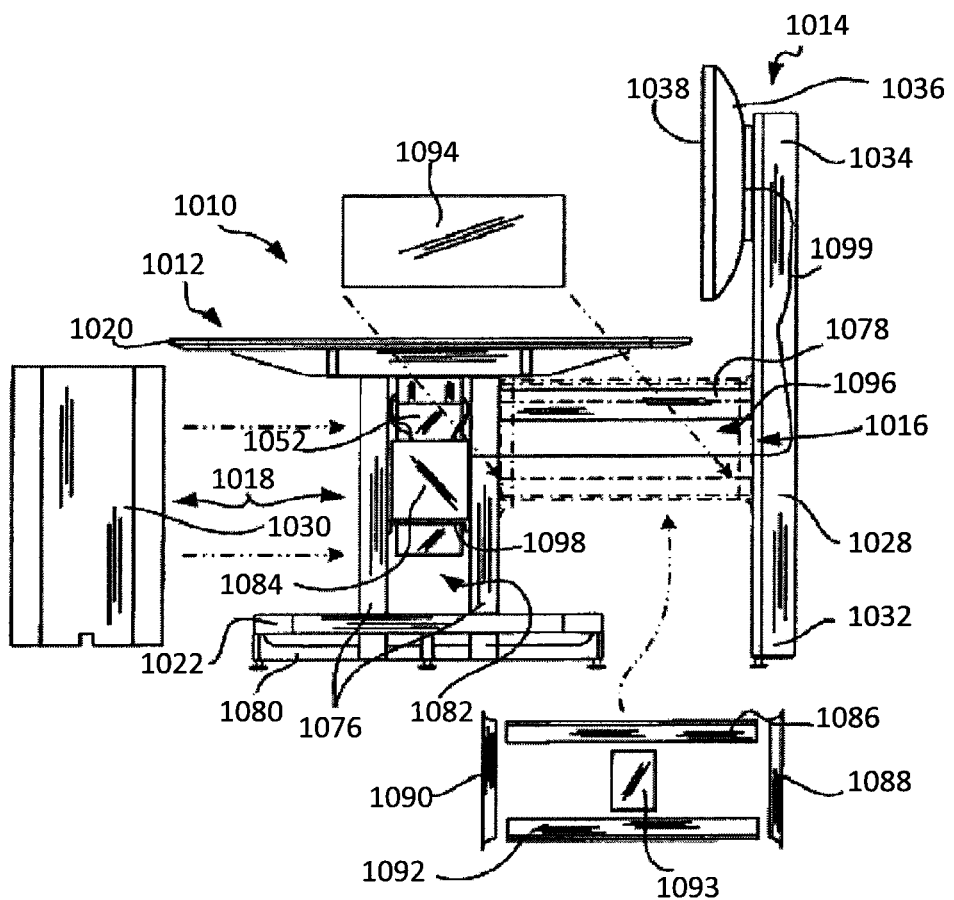
FIG. 25 is a partially exploded side plan view of the conferencing table of FIG. 20.
Figure 26:
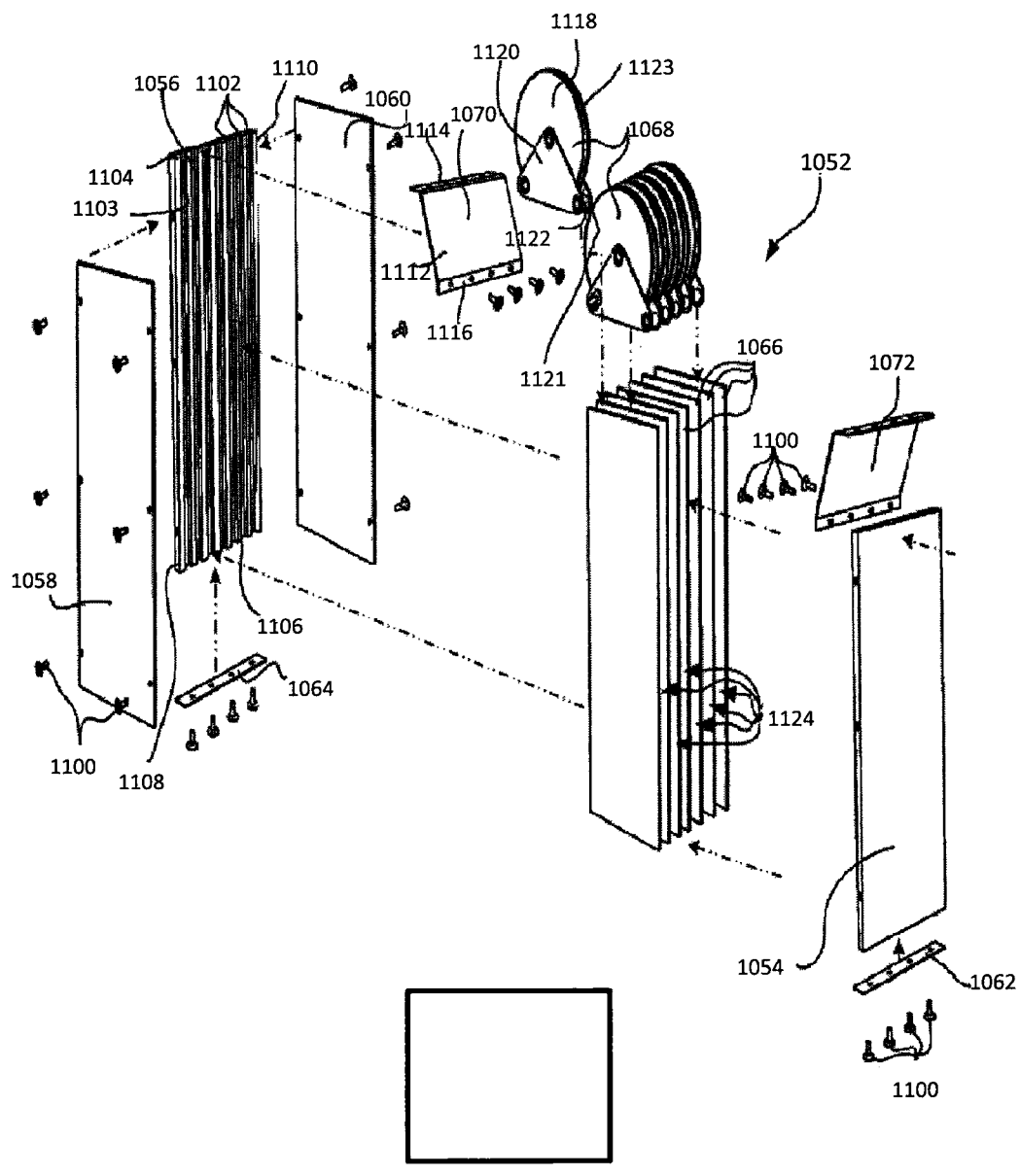
FIG. 26 is an exploded view of the retractor assembly shown in FIG. 24.
Figure 27:
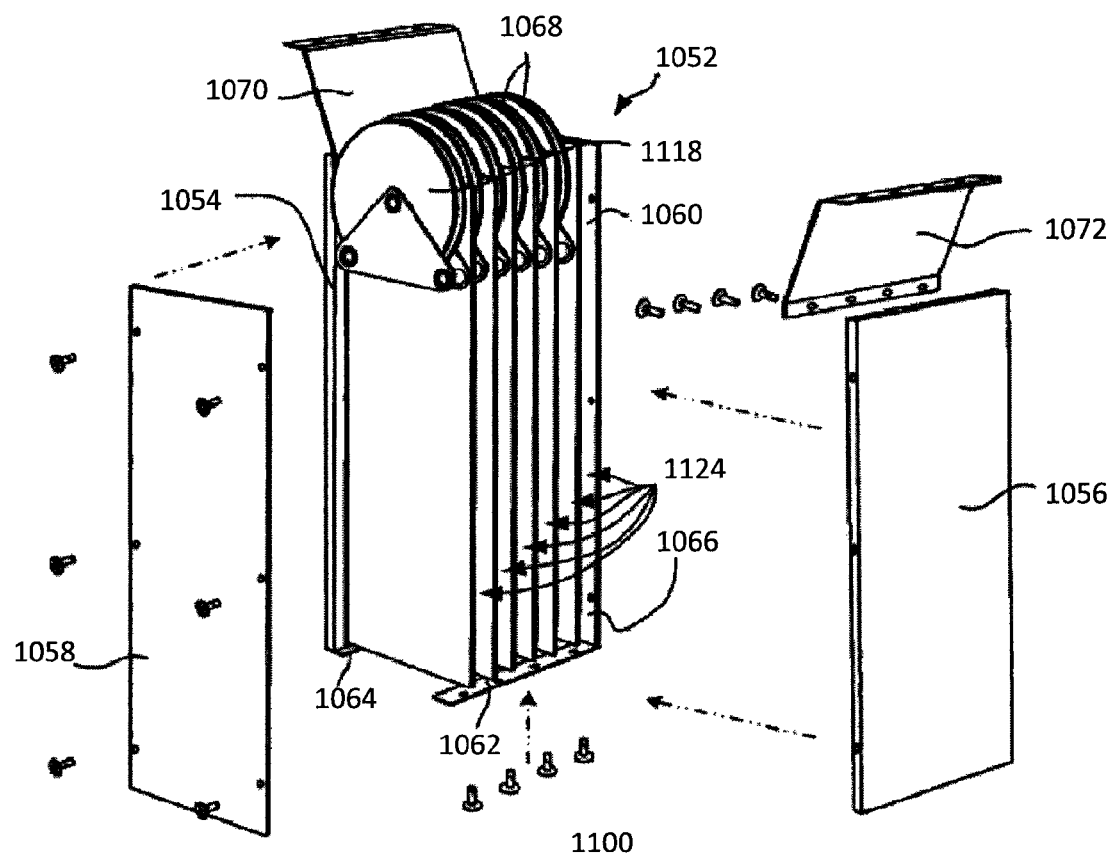
FIG. 27 is a partially exploded view of the retractor assembly of FIG. 26.

Referring now to FIG. 24, wire management assembly 1024 includes first and second door or cover members 1025 and 1026, respectively, a deck assembly 1045 and a retractor assembly 1052. Referring also to FIGS. 26, 27 and 33, retractor assembly 1052 includes a first slotted wall member 1054, a second slotted wall member 1056, a first end wall member 1058, a second end wall member 1060, a first bottom plate or bracket 1062, a second bottom plate or bracket 1064, seven separate divider members collectively identified by numeral 1066, six separate pulley/weight assembly collectively identified by numeral 1068, a first sloped mounting bracket 1070, a second sloped mounting bracket 1072 and a plurality of screws for securing the retractor assembly components together, at least a subset of the screws collectively identified by numeral 1100. The first and second slotted wall members 1054 and 1056 are similarly constructed and operate in a similar fashion and therefore, in the interest of simplifying this explanation, only the second slotted wall member 1056 which is best shown in FIG. 26 will be shown here in detail. Slotted wall member 1056 is generally a rigid rectilinear member including an external surface (not labeled) and an oppositely facing internal surface 1103 as well as top and bottom ends 1104 and 1106, respectively, and first and second lateral edges 1108 and 1110, respectively. As the label implies, member 1056 forms a plurality of slots collectively identified by numeral 1102 in internal surface 1103. Each slot 1102 is a straight slot that extends from the top end 1104 to the bottom end 1106 of member 1056 and all of the slots 1102 are parallel to a length dimension of member 1056. In addition, member 1056 forms threaded openings along each of the top, bottom, first lateral and second lateral edges for receiving shafts of screws to facilitate fastening of other retractor assembly components.

Referring still to FIGS. 26 and 27, each of the first and second end wall members 1058 and 1060 is similarly constructed and operates in a similar fashion and therefore, only end wall 1058 will be described in any detail. Wall member 1058 is a flat, rigid and rectilinear member that forms mounting openings (not labeled) along first and second lateral edges. The mounting openings formed by member 1058 align with the threaded shaft receiving openings formed in first lateral edge 1108 of member 1056 when wall member 1058 is placed adjacent edge 1108.

Referring yet again to FIGS. 26 and 27, first bottom plate or bracket 1062 is an elongated flat and rigid bracket that has a length dimension substantially equal to a width dimension of slotted wall member 1056 between the lateral edges 1108 and 1110 of member 1056 and forms openings for passing screws for attaching member 1064 to bottom edge 1106 of member 1056. Similarly, second bracket 1062 is a rectilinear rigid bracket having a length dimension equal to a width dimension of first slotted wall member 1054.

Divider members 1066 are rigid rectilinear members that each have thickness dimension substantially equal to a width dimension of one of the slots 1102 formed by member 1056 so that a lateral edge of each divider member 1066 is receivable within one of the slots 1102. Divider members 1066 have length dimensions substantially equal to a length dimension of slotted wall member 1056 and have a width dimension such that, when retractor assembly 1052 is assembled, each divider member 1066 traverses the distance between slotted wall member 1054 and 1056 with lateral edges of each of members 1066 received in oppositely facing slots formed by slotted wall members 1054 and 1056. Each divider member, in at least some embodiments, may be formed as a thin Plexiglas member.

Referring once again to FIGS. 26 and 27, each of the pulley/weight assemblies 1068 is similarly constructed and operates in a similar fashion and therefore, in the interest of simplifying this explanation, only one of the weight assemblies 1068 will be described in some detail. Referring specifically to FIG. 26, an exemplary weight assembly 1068 includes a pulley wheel 1118, first and second weight plates 1120 and 1122, respectively, and three post members, one of which is identified by numeral 1121. Pulley wheel 1118 forms an annular cable receiving channel 1123 and a central hole (not labeled). Each of plates 1120 and 1122 is a generally triangular rigid plate and forms three openings, one at each of the corners of the plate. In at least some embodiments, plates 1120 and 1122 are formed of thick sheet metal so that they are relatively heavy. One corner of each plate is mounted to pulley wheel 1118 via one of the posts 1121 that passes through each of the plates 1120 and 1122 and through the central pulley wheel opening. The other two corners of the plates 1120 and 1122 are mounted via the other two posts 1121 below the circumferential edge of pulley wheel 1118. The plates 1120 and 1122 are mounted to wheel 1118 in a loose fit manner so that as the wheel 1118 turns, the plates 1120 and 1122 together hang down therefrom.

Each of the sloped mounting brackets 1070 and 1072 is similarly constructed and operate in a similar fashion and therefore, in the interest of simplifying this explanation, only mounting bracket 1070 will be described here in detail. Bracket 1070 includes an intermediate guide plate 1112, a first mounting plate 1114, and a second mounting plate 1116, where the plates 1112, 1114 and 1116 is integrally formed, preferably from bent sheet metal. First mounting plate 1114 is an elongated plate that forms openings for passing fastening screws. Similarly, second mounting plate 1116 is an elongated plate member forming openings for passing fastening screws. Intermediate plate 1112 is a flat planar member that traverses the distance between one of the elongated edges of plate member 1114 and one of the elongated edges of plate member 1116. As best seen in FIG. 33, plates 1114 and 1116 are substantially perpendicular while plate 1112 forms an angle with each of plates 1114 and 1116.

Referring once again to FIGS. 26, 27 and 33, to assemble retractor assembly 1052, bottom plate/bracket 1064 is secured to the bottom edge 1106 of slotted wall member 1056. Similarly, bottom plate/bracket 1064 is secured to a bottom edge of slotted wall member 1054. The first and second sloped mounting brackets 1070 and 1072 are secured, via screws or other mechanical fasteners, to the internal surfaces (e.g., see 1103 in FIG. 26) of slotted wall members 1056 and 1054, respectively, near the top edges (e.g., see 1104 in FIG. 26) thereof. First end wall 1058 and second end wall 1060 are secured via screws 1100 to the first and second lateral edges 1108 and 1110 of wall member 1056 and so that end wall members 1058 and 1060 extend in the same direction. The subassembly including sloped mounting bracket 1072, slotted wall member 1054 and bracket 1062 are next positioned between the distal elongated edges of wall members 1058 and 1060 and the subassembly is fastened at that location via screws 1100.

Referring still to FIGS. 26 and 27, divider members 1066 are next slid into the oppositely facing slots 1102 formed by slotted wall members 1056 and 1054. Here, it should be appreciated that the bottom plates/brackets 1062 and 1064 stop the divider members 1066 from sliding completely through the other assembled components. At this point the retractor assembly components already assembled form six separate pulley wheel/weight receiving channels collectively identified by numeral 1124 (see FIG. 27).

Figure 28:
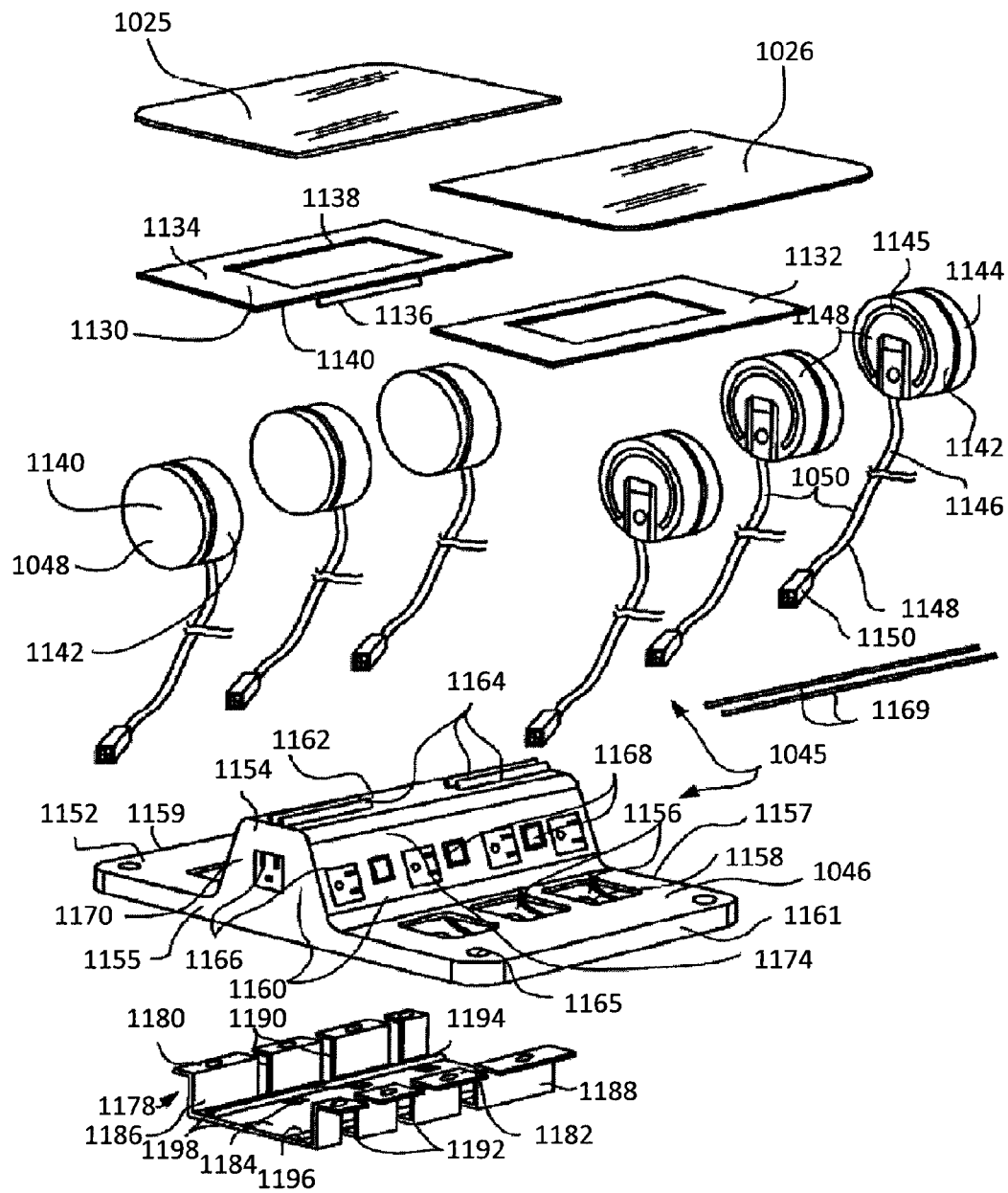
FIG. 28 is a partially exploded view of the deck assembly of FIG. 24.
Figure 29:
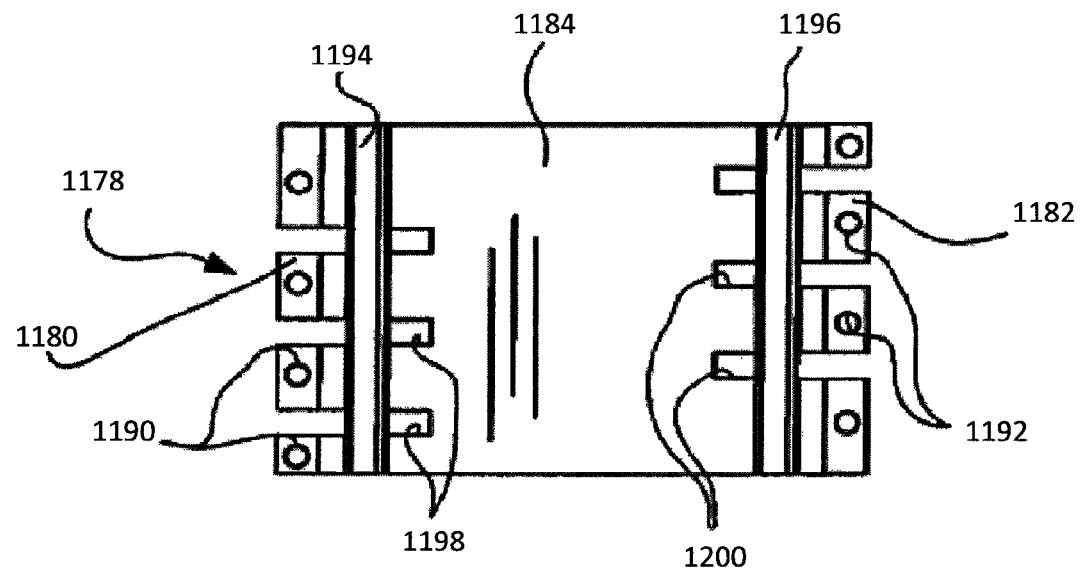
FIG. 29 is a top plan view of the cable tie bracket shown in FIG. 28.
Figure 30:
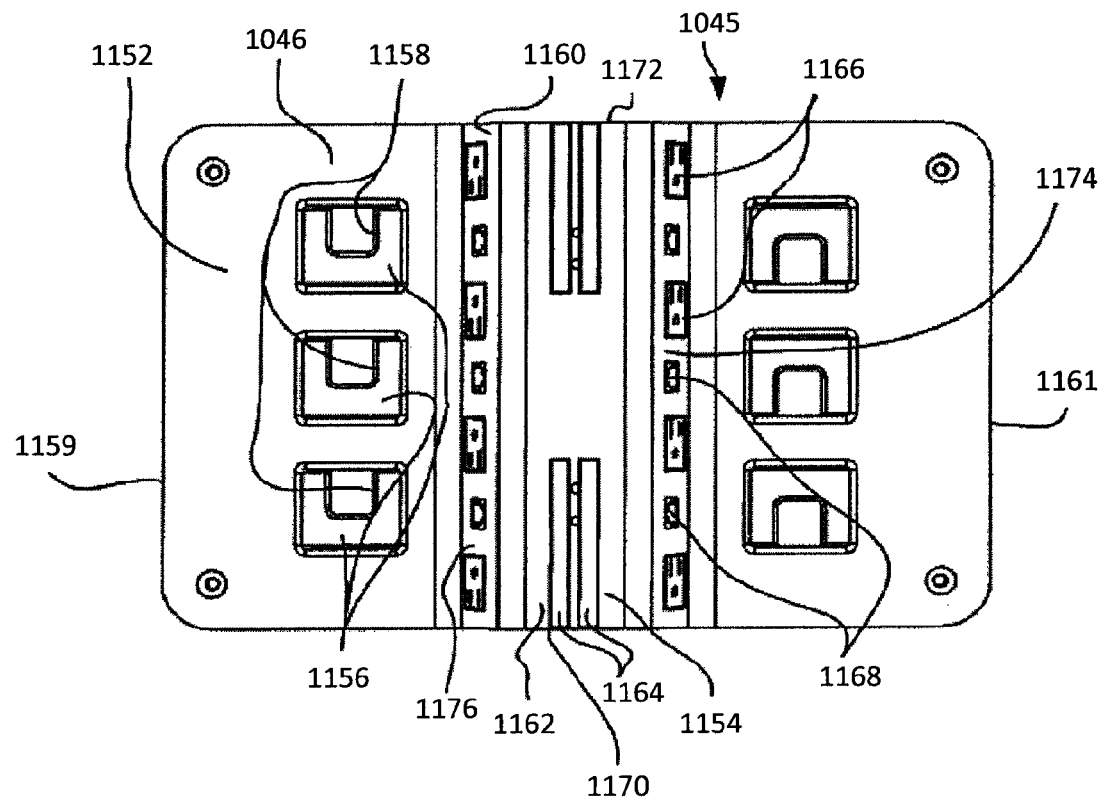
FIG. 30 is a top plan view of the deck member of FIG. 28.

Referring now to FIGS. 28, 29 and 30, deck assembly 1045 includes a deck member 1046, six separate hand sets collectively identified by numeral 1048, control cables collectively identified by numeral 1050 and a cable tie bracket 1178. Deck member 1046 is a generally rectilinear rigid member including first and second end edges 1155 and 1157, respectively, and first and second lateral edges 1159 and 1161, respectively. Deck member 1046 forms a top deck surface 1152. A deck island 1154 extends upward from top surface 1152. In the illustrated embodiment, island 1154 is an elongated island that extends between first and second end edges 1155 and 1157 and that is centrally spaced between lateral edges 1159 and 1161. Island 1154 is formed by a circumferential wall 1160 including, generally, first, second, third and fourth substantially upright wall members 1170, 1172, 1174 and 1176 (see specifically FIG. 30) and a top wall that forms a top mounting surface 1162. First and second island wall members 1170 and 1172 are substantially flush with deck edges 1155 and 1157, respectively, and face in opposite directions. Wall members 1174 and 1176 slant slightly toward each other from top deck surface 1152 toward the top mounting surface 1162 and generally face in opposite directions. Mounting surface 1162 is substantially parallel to deck top surface 1152. The island walls 1170, 1172, 1174 and 1176 together form an internal cavity (not illustrated or labeled) in which power and data receptacle boxes or hardware may be mounted. Each wall member 1170, 1172, 1174 and 1176 forms at least one opening for receiving a power and/or data outlet connector. In the illustrated embodiment, each of walls 1170 and 1172 forms a single opening for a power outlet (see 1166 in FIG. 28) while each of walls 1174 and 1176 forms four substantially equi-spaced power outlets 1166 and three data outlets, two of which are collectively identified by numeral 1168. Island hinge members 1164 are formed or fastened to the top mounting surface 1162 for connecting the door members 1025 and 1026 in a manner to be described in more detail below.

Referring now to FIGS. 28 and 30, the top surface 1152 of deck 1046 forms six separate deck handset cavities collectively identified by numeral 1156. Three of the handset cavities 1156 are provided between island 1154 and lateral edge 1161 while the other three handset cavities 1156 are provided between island 1154 and other lateral edge 1159. Each of cavities 1156 is dimension and, in at least some embodiments, shaped, to snuggly receive one of the handsets 1048 when the handset is in a stowed position. Deck member 1046 also forms a cable passing opening 1158 in each of the handset cavities 1156 for, as the label implies, passing one of the handset cables 1050.

Referring specifically to FIG. 30, the cable passing openings between island 1154 and edge 1159 are offset from or staggered between the openings between island 1154 and edge 1161. Thus, in FIG. 30 observe that openings 1158 adjacent edge 1159 are formed in the top portion of associated cavities 1156 as illustrated while the openings 1158 adjacent edge 1161 are formed in the bottom portion of associated cavities 1156. In addition, at each of its four corners, deck member 1046 forms a screw passing opening, one of which is identified by numeral 1165 in FIG. 28. In at least some embodiments deck member 1046 is formed of molded plastic material.

Referring still to FIG. 28 and also to FIG. 29, cable tie bracket 1178 is a rigid bracket, preferably formed of bent sheet metal, that includes a first mounting flange plate 1180, a second mounting flange plate 1182, an intermediate floor member 1184, a first wall member 1186 and a second wall member 1188. The mounting flange plates 1180 and 1812 are each elongated rectilinear members that form screw passing openings and are arranged to be co-planar and substantially parallel to each other and spaced apart from each other. Wall member 1186 is a rectilinear elongated member and is integrally formed along one of its long edges with one of the long edges of the first flange plate 1180. Wall member 1186 forms a right angle with flange plate 1180. Similarly, wall member 1188 is an elongated rectilinear member that is mounted along one of its long edges to one of the long edges of flange plate 1182 and forms a right angle with plate 1182.

Intermediate floor member 1184 is a rigid rectilinear member having opposite edges linked to edges of wall member 1186 and 1188 opposite plates 1180 and 1182. Thus, facing surfaces of wall members 1186 and 1188 and a top surface of intermediate wall member 1184 form a cavity or channel. Three slots (two of which are identified by numeral 1190) are formed in flange plate 1180, first wall member 1186 and an adjacent portion of intermediate floor member 1184 where each of the three slots is continuous through members 1180 and 1186 and passes into a portion of intermediate wall member 1184. Similarly, three slots 1192 are formed continuously through flange plate 1184, wall member 1188 and a portion of intermediate floor member 1184. The slots 1190 and 1192 are interleaved with each other so that, when bracket 1178 is mounted to an undersurface of deck member 1046, slots 1192 align with deck openings 1158 thereabove that are formed between island 1154 and lateral edge 1159 and slots 1190 align the deck openings 1158 thereabove that are between island 1154 and lateral edge 1161. In other words, slots 1190 align with deck openings 1158 formed on an opposite side of island 1154 and slots 1192 align with deck openings 1158 formed on an opposite side of island 1154.

Referring to FIGS. 28 and 29, half dome bars 1194 and 1196 are secured to a top surface of floor member 1184 approximately midway along the lengths of the portions of slots 1190 and 1192 formed in floor member 1184 so that distal ends of the slots 1190 and 1192 are open and form exit ports 1198 and 1200. As the label implies, each half dome bar 1194 and 1196 forms a smooth half dome surface and has a half dome cross sectional shape.

Referring again to FIG. 28, each of the handsets 1048 is similarly constructed and operates in a similar fashion and therefore, in the interest of simplifying this explanation, the handsets 1048 will only be generally described. An exemplary hand set 1048 includes an annular handset housing member 1142 and a button 1144 mounted to the housing 1142. The button 1144 can be pressed to provide a signal to a switcher box (see 1084 in FIG. 33). Referring still to FIG. 28, on an undersurface of the housing 1142 opposite the button 1144, a slip-resistant pad 1145 is adhered to, as the label implies, impede sliding of the handset 1048 when the undersurface 1145 is placed on a supporting work surface or the like. The slip resistant pad 1145 may be formed of plastic or rubber type material. In at least some embodiments each handset 1048 is constructed to be relatively heavy (e.g., on the order of one-half to two pounds and generally around one to one and one-half pounds) so that when the handset is pulled into a use position, the handset weight will generally retain the handset in the use position until affirmatively replaced in the well 1069. Each of the cables 1050 has first and second ends 1146 and 1148, respectively. The first end 1146 is linked to an associated handset 1048 while a connector jack 1150 is secured at the second end 1148.

Figure 31:
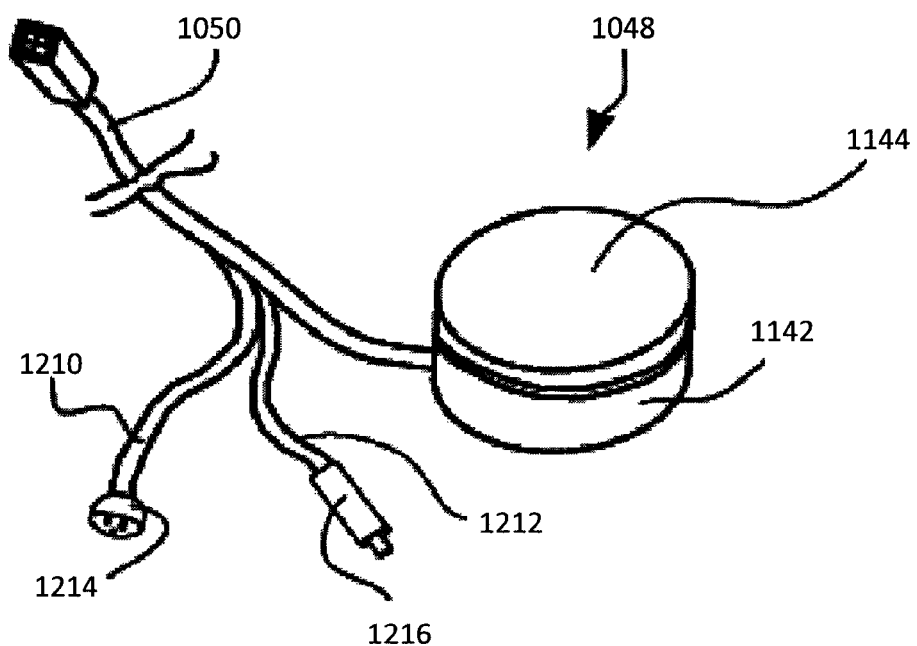
FIG. 31 is a perspective view of an exemplary handset and cable assembly including video and audio cables and jacks.

In at least some embodiments, referring also to FIG. 31, in addition to including wires for transmitting select type signals from the handset 1142, the cable 1050 will include a video cable 1210 and an audio cable 1212 that split off from other portions of the cable 1050 proximate the handset end thereof. As shown in FIG. 31, a video jack 1214 and an audio jack 1216 are provided at distal ends of the cables 1210 and 1212, respectively, for linkage to a laptop computer or the like. Although not shown, in at least some cases, video and audio cables will split off from the control cable at the end of cable 1050 opposite handset 1048 and jacks will be provided at that other end for linking to the switcher box 1084. In still other embodiments, the audio and video cables may be replaced by digital transfer data cables such as USB cables or the like that can carry audio, video and other data types such as control signals from the handsets to the switcher device 1084.

Referring yet again to FIG. 28, door members 1025 and 1026 are substantially rectilinear, rigid and flat members, each of which includes a top surface and an oppositely facing bottom surface. Together, the door members 1035 and 1026 form a shape that is substantially similar to the shape of table top opening 1027, albeit having slightly smaller width and length dimensions than opening 1027 to that, when the door members 1025 and 1026 are in a closed position as shown in FIG. 33, gaps G exist between adjacent edges of the door members 1025 and 1026 and the edge that forms opening 1027. The gaps G are sized such that cables 1050 can pass therethrough while the doors 1025 and 1026 are closed (see also FIG. 35 in this regard).

Referring yet again to FIG. 28, the assembly also includes first and second hinge plates 1130 and 1132. Each of the hinge plates 1130 and 1132 is similarly constructed and operates in a similar fashion and therefore, in the interest of simplifying this explanation, only hinge plate 1130 will be described here in detail. Plate 1130 is a rigid rectilinear and flat member that forms a top surface 1134, a rear edge 1140 and a central rectilinear opening 1138. A hinge member 1136 is integrally formed or attached to an undersurface of member 1130 adjacent rear edge 1140. The hinge member 1136 is designed to cooperate with hinge members 1164 and hinge pins 1169 to secure plate 1130 to the top mounting surface 1162 of island 1154.

To assemble deck assembly 1045, screws (not illustrated) are used to mount bracket 1178 to an undersurface of deck member 1046 with the slots 1190 and 1192 aligned with openings 1158 formed by deck member 1046. Next, door members 1025 and 1026 are secured to the top surfaces (e.g., 1134) of hinge plates 1130 and 1132 via adhesive or some type of mechanical fastener. Pins 1069 are used to secure hinge members 1136 on plates 1130 and 1132 to hinge members 1164 on the top mounting surface 1162 so that door members 1025 and 1026 extend above separate halves of the deck top surface 1152.

Referring now to FIGS. 27, 28 and 33, assembly continues as follows. One of the handsets/cable subassemblies is aligned with one of the handset cavities 1156 and the distal end 1148 of the handsets/cable subassembly is passed through the aligned cable passing opening 1158.

Referring still to FIGS. 27, 28 and 33, the distal end 1148 of the cable 1050 is next looped around the pulley wheel (see 1118 in FIG. 26) of one of the pulley/weight assemblies 1068 and is fed back to toward bracket 1178 and through an aligned one of the slots (e.g., 1190) and into the cavity formed by bracket 1178. The distal end 1148 of the cable 1050 is looped over the half-dome bar 1194 and is passed through and aligned exit port (e.g., 1198). The distal end 1148 is pulled through the exit port until a portion (e.g., one foot) thereof extends down below bracket 1178. Continuing, a zip strip or other mechanical fastener is used to fasten the portion of cable 1050 adjacent half-dome bar 1194 to bracket 1178 so that at least that portion of the cable 1050 is securely attached to the bracket 1178. When the handset 1048 is received within the deck handset cavity 1156, pulley/weight assembly 1068 hangs down below bracket 1178 as shown in FIG. 33.

Continuing, referring still to FIGS. 27, 28 and 33, each of the handset/cable subassemblies 1048 and 1050 is aligned with a separate one of the handset cavities 1156, the distal ends of the cables are passed through the deck openings 1158 and looped around separate ones of the pulley wheels 1118 and back up through one of the slots 1190 or 1192 into the bracket 1178 cavity and down through an associated one of the exit ports 1198 or 1200. Again, zip strips or other mechanical fasteners are used to secure intermediate portions of each of the cables 1050 to bracket 1178. Once each of the handsets/cable subassemblies has been secured to the deck 1046 and bracket 1178, all of the pulley/weight assemblies 1068 should hang down below the bracket 1178 such that adjacent pulley/weight assemblies 1068 are arranged in a substantially parallel fashion.

Continuing, referring specifically to FIG. 24, the subassembly including the deck assembly 1045, door members 1025 and 1026 and pulley/weight assemblies 1068 can be aligned above the already assembled components of the retractor assembly 1052 with each of the pulley/weight assemblies 1068 aligned above a separate one of the channels 1124 (see also FIG. 27). The deck assembly 1045 and other connecting components can be moved down toward assembly 1052 so that each of the pulley/weight assemblies 1068 slides down into one of the channels 1124 until an undersurface of deck member 1046 contacts mounting plates 1114 of the first and second sloped mounting brackets 1070 and 1072, respectively (see also FIG. 26). Screws or other mechanical fasteners are used to secure the mounting plates 1114 to the undersurface of deck member 1046. At this point, the entire wire management assembly 1024 has been assembled.

Referring now to FIGS. 24 and 33, to secure the wire management assembly 1024 to the leg support structure 1018, wire management assembly 1024 is aligned above the table top opening 1027 and is slid down into channel 1082 until an undersurface of deck member 1046 contacts the top surface 1085 of top plate 1079. Screws passing through deck member openings 1165 (see also FIG. 28) are used to secure deck member 1046 to top surface 1085. At this point, when door members 1025 and 1026 are in their closed positions as shown in FIG. 33, top surfaces thereof should be substantially flush with the top surface 1021 of table top member 1020 and gaps G should exist between adjacent edges of door members 1025 and 1026 and the edge forming opening 1027. Switcher device or control box 1084 is mounted via a bracket 1098 (see FIG. 25) between two of the vertical leg members 1076. Distal ends 1148 of the cables 1050 are linked to separate ports of the switcher device 1084. Here, where one of the cables 1050 includes a control line in addition to audio and video cables, each of the control line and audio and video cables may be linked to separate ports on the switcher device 1084, albeit the video and audio and control ports being associated by the switcher device 1084.

Referring to FIG. 25, an output audio/video cable 1099 is linked to an output port of the switcher device 1084 at one end and to display 1036 and, possibly, speakers or the like, at an opposite end.

Figure 20:
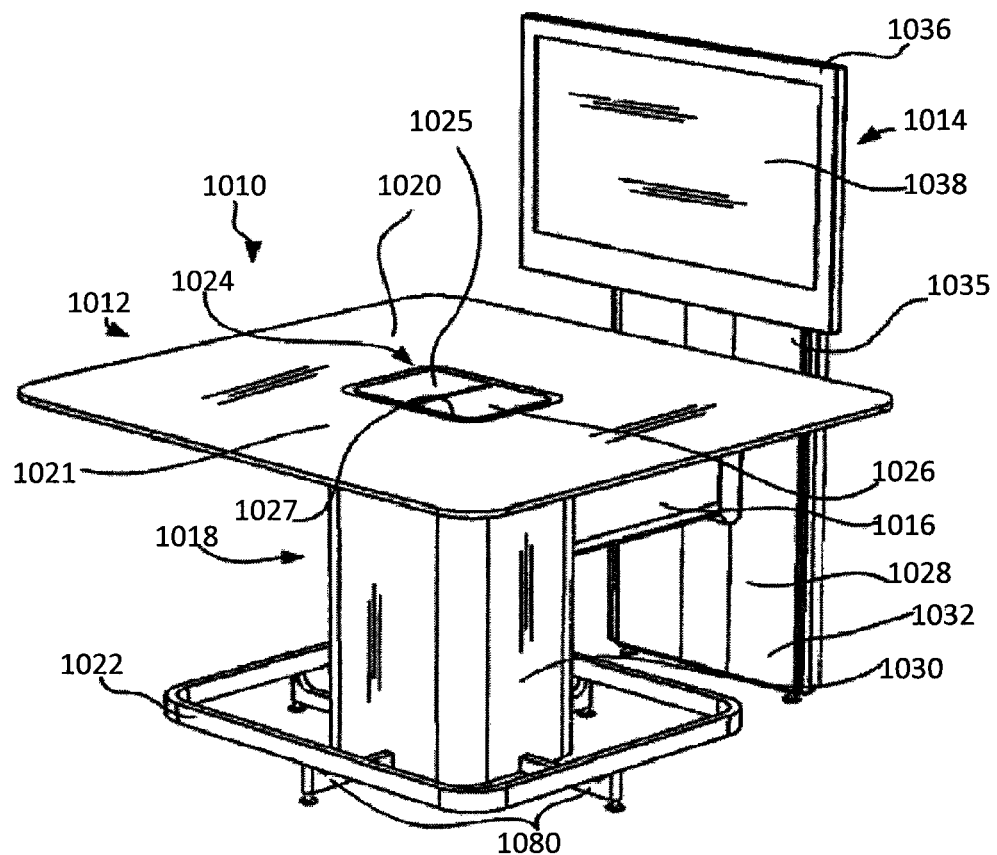
FIG. 20 is a perspective view of a conferencing table assembly that is consistent with at least some aspects of the present invention.
Figure 21:
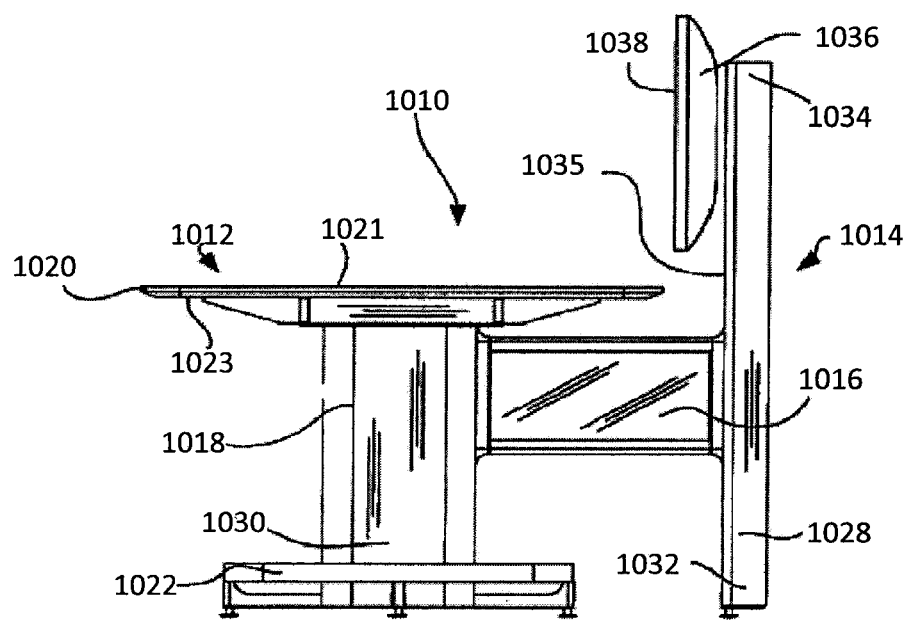
FIG. 21 is a side of plan view of the conferencing table assembly of FIG. 20.
Figure 22:
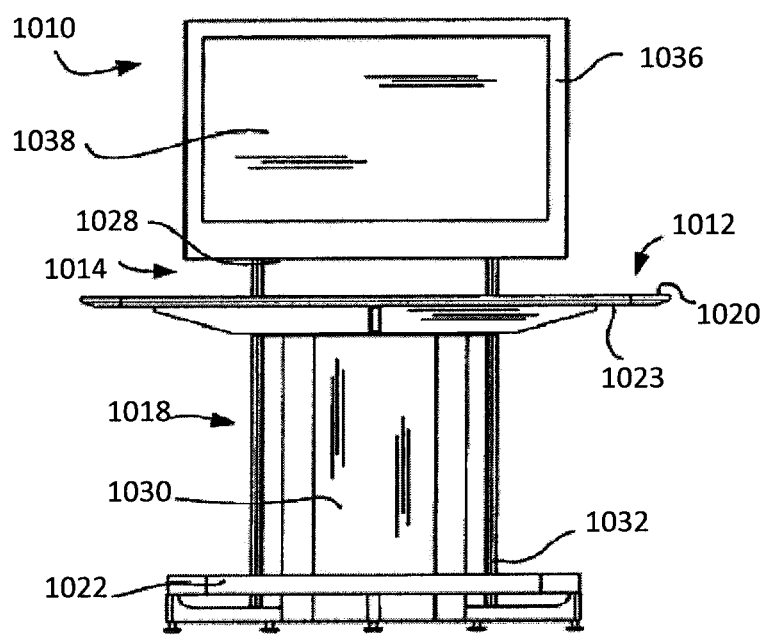
FIG. 22 is a front plan view of the conferencing table assembly of FIG. 20.
Figure 23:
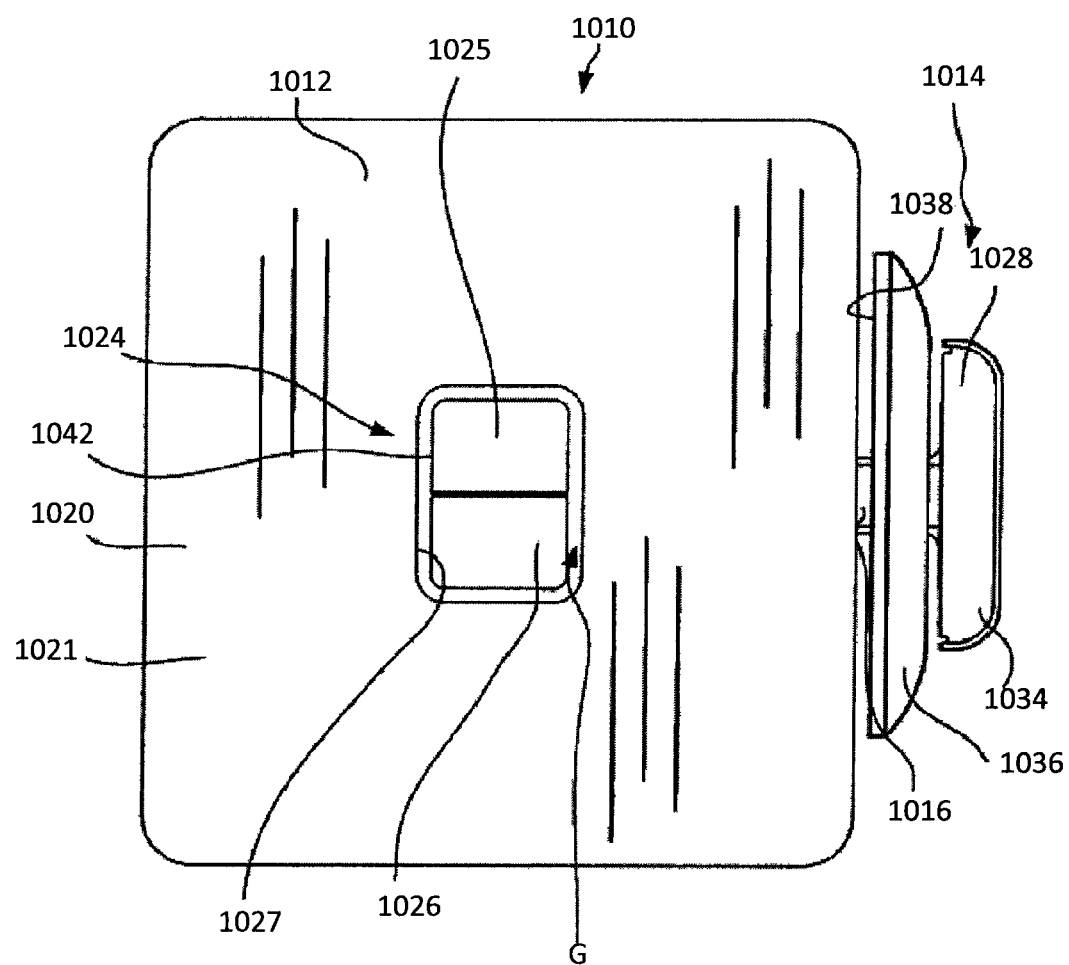
FIG. 23 is a top plan view of the conferencing table assembly of FIG. 20.
Figure 36:
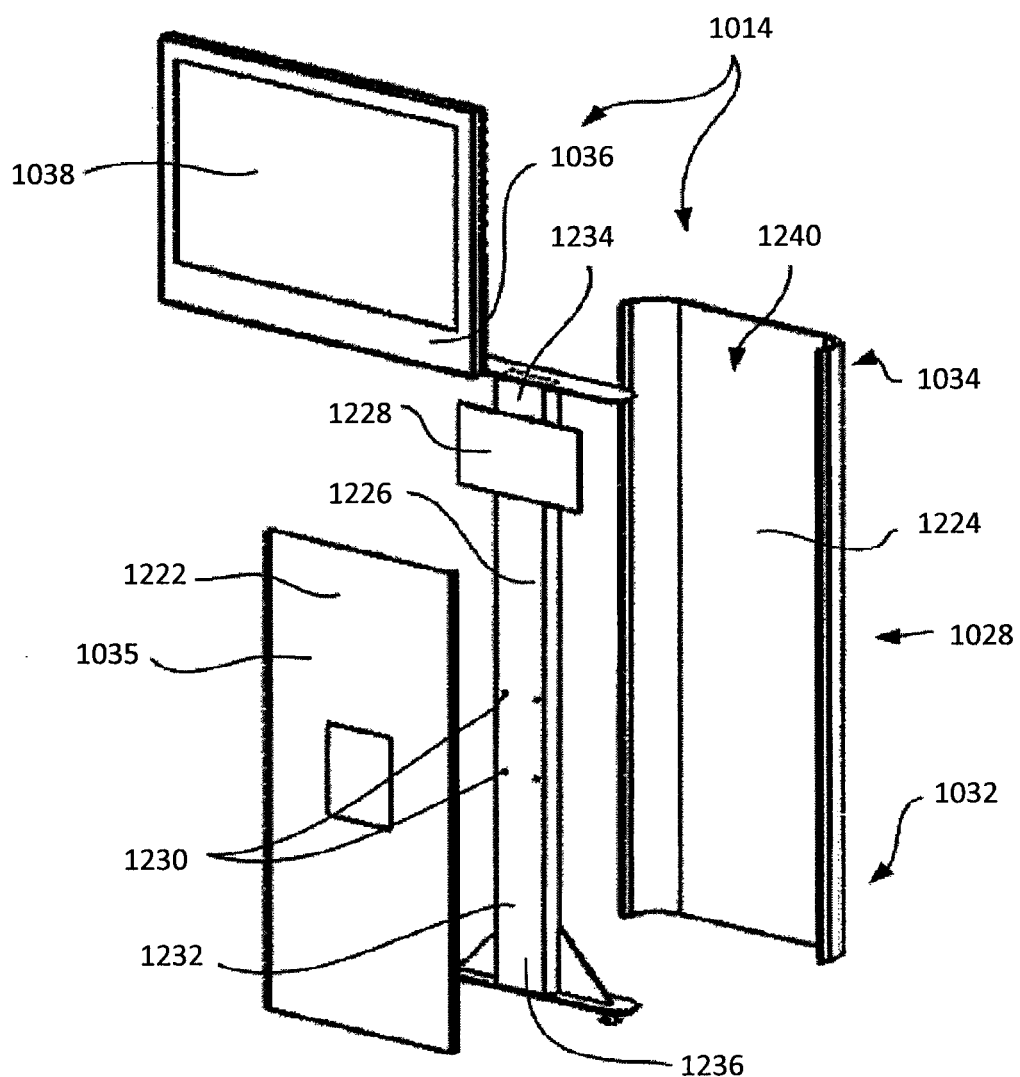
FIG. 36 is an exploded view of the totem/display assembly shown in FIG. 20.

Referring now to FIGS. 20, 25 and 36, the totem/display assembly 1014 includes a totem 1028 and a display screen 1036. Totem 1035 includes structural and exterior housing members, as the label implies, form an elongated vertical or upright totem having a bottom end 1032 and a top end 1034 that forms a front surface 1035. More specifically, totem assembly 1028 includes a vertical internal structural beam 1226, a front housing cover 1222, a rear housing cover 1224 and a display mounting plate 1228. Beam 1226 is an elongated rigid beam having top and bottom ends 1234 and 1236, respectively, and forms a front surface 1232. Surface 1232 forms four apertures 1230 used to secure a structural bridge member (see 1078 in FIG. 37) to beam 1226.

Plate 1228 is a rigid flat and rectilinear member mounted to front surface 1232 via welding or mechanical fasteners proximate top end 1234.

Cover 1226 is a flat, rigid and substantially rectilinear member that forms an opening 1238 for passing one end of bridge structural member 1278. Cover 1224 is generally an elongated C-shape in cross-section and includes flanges along long edges thereof for securing front cover 1222. Covers 1222 and 1224 mount to beam 1228 via mechanical fasteners (not shown) to form the totem 1028 and form an internal cavity 1240 when assembled. Display 1036 mounts to plate 1234. Display screen 1036 includes a housing structure and a display front surface 1038. In at least some embodiments, the totem/display assembly 1014 cannot stand in an upright position alone.

Figure 37:
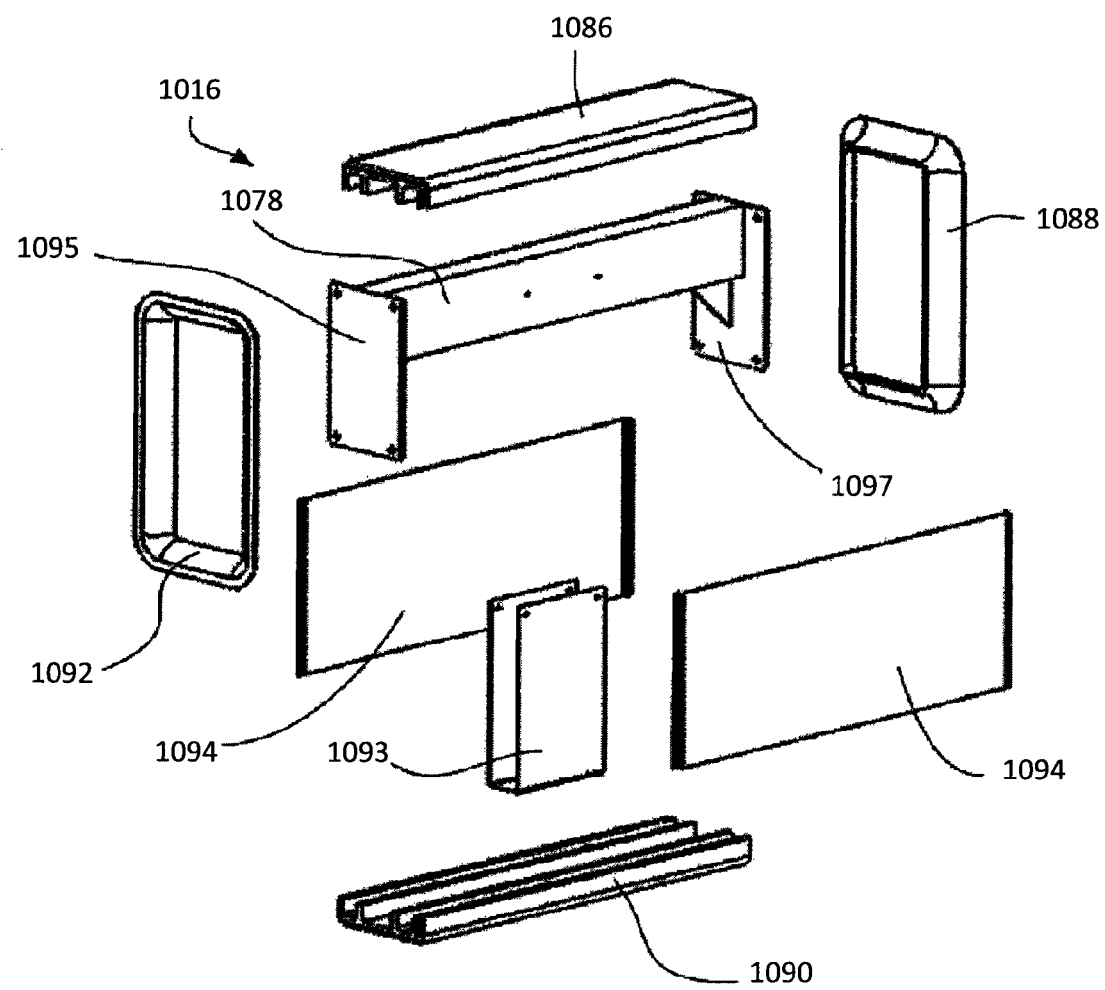
FIG. 37 is an exploded view of the bridge assembly of FIG. 20.

Referring still to FIG. 25 and also to FIG. 37, bridge assembly 1016 includes a rigid elongated support member 1078 that is mechanically fastened via screws or the like or is welded to the vertical leg members 1076 of leg support structure 1018 at one end and to the internal vertical structure beam 1226 of totem assembly 1028 at the opposite end. In the illustrated embodiment, beam 1078 includes first and second mounting plates 1095 at opposite ends for securing to the leg assembly 1018 and the totem structural beam 1226. In at least some embodiments, member 1078 is a metallic beam type member. Through member 1078, the table leg structure 1018 provides additional support to totem assembly 1028.

A cable trough forming bridge housing includes a top housing member 1086, a bottom housing member 1092, first and second end shoes 1088 and 1090, respectively, two side plates 1094 and a U-shaped bracket 1093. The top and bottom housing members 1086 and 1092 extend between the leg structure 1018 and totem assembly 1028 above and below beam member 1078 and form a bridge channel 1096 there between (see phantom in FIG. 25). The end shoes 1090 and 1088 abut against the leg structure 1018 and the front surface 1035 of totem assembly 1028 and provide a finished look. U-shaped bracket 1093 mounts to bridge beam 1078 via screws or other mechanical fasteners and extends down therefrom. Bracket 1093 operates as a cable manager and also as a structure to which housing member 1092 can be connected. The bridge cover member 1094 can be mechanically or otherwise fastened to the top and bottom housing members 1086 and 1092 to close off the bridge channel 1096. In at least some embodiments, the cover members 1094 can easily be removed to access channel 1096 for laying cables therein or routing cable when appropriate.

Figure 32:
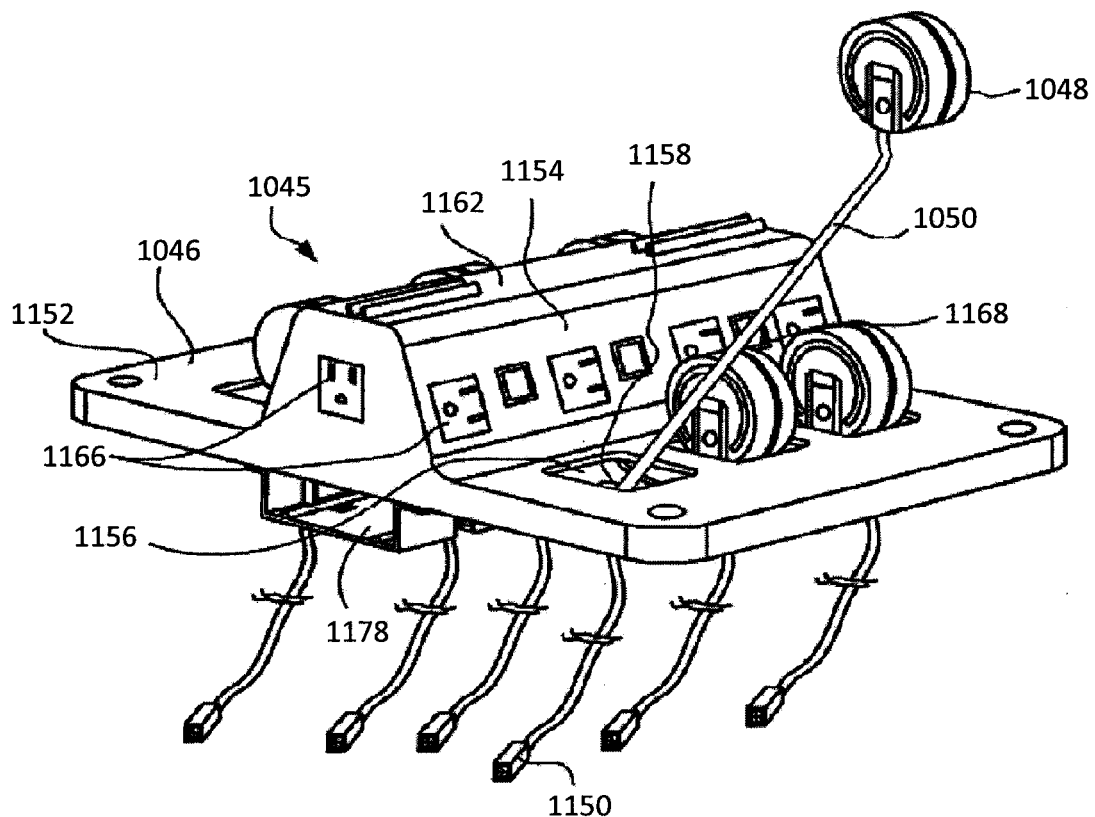
FIG. 32 is a perspective view of the deck assembly shown in FIG. 28.
Figure 34:
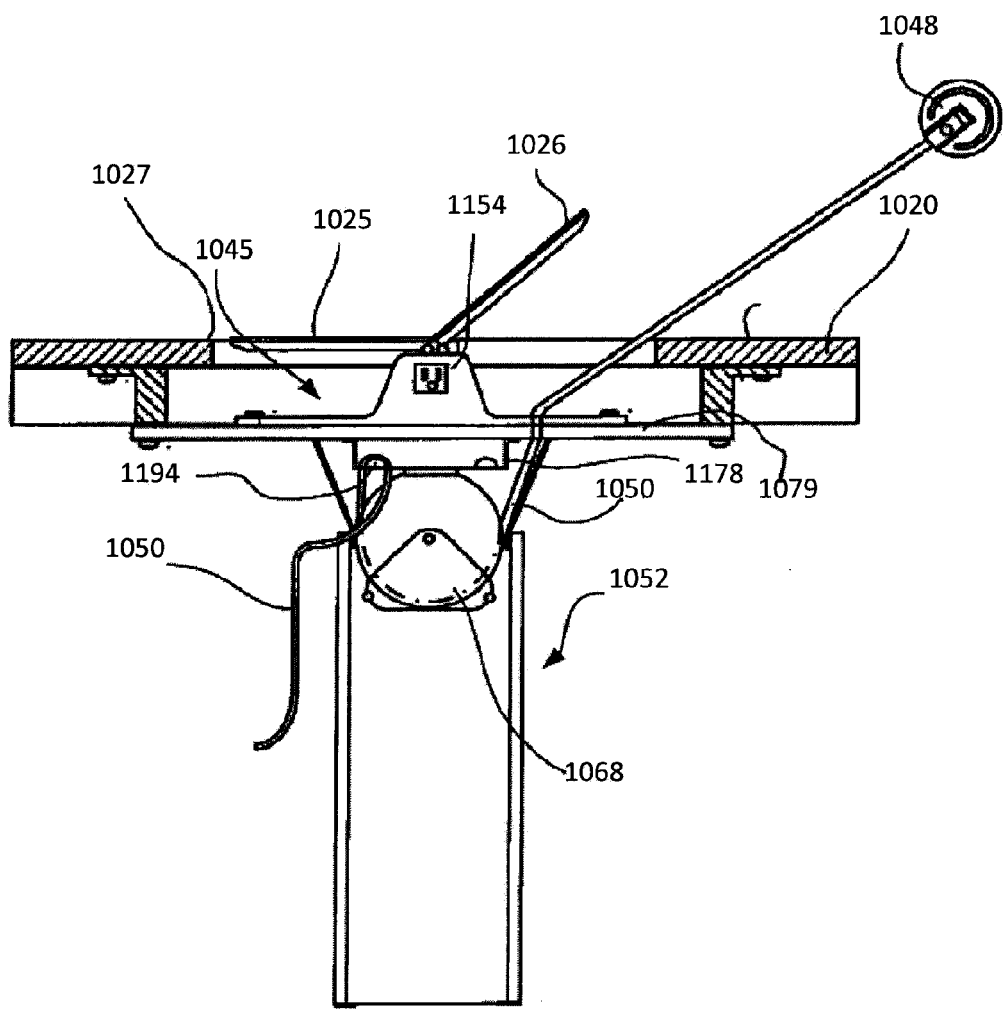
FIG. 34 is similar to FIG. 33, albeit showing the single handset pulled out of a cavity.

Referring now to FIG. 33, operation of the retractor assembly 1052 will be described in the context of the illustrated system that includes only a single handset/cable subassembly in the interest of simplifying this explanation. When handset 1048 is not in use, handset 1048 can be received within an associated handset cavity 1156 (see also FIG. 32) which allows the pulley/weight assembly 1068 to slide down in its associated channel 1124 toward the bottom end of the retractor assembly 1052. When a conference attendee wishes to use one of the handsets 1048, referring also to FIG. 34, the attendee can rotate door member 1026 on its hinge to an open position, grasp the handset 1048 and pull the handset out from within the cavity formed below the door member 1026. As the handset 1048 is pulled up and out of the cavity, pulley/weight assembly 1068 slides upward within the channel 1124.

Figure 35:
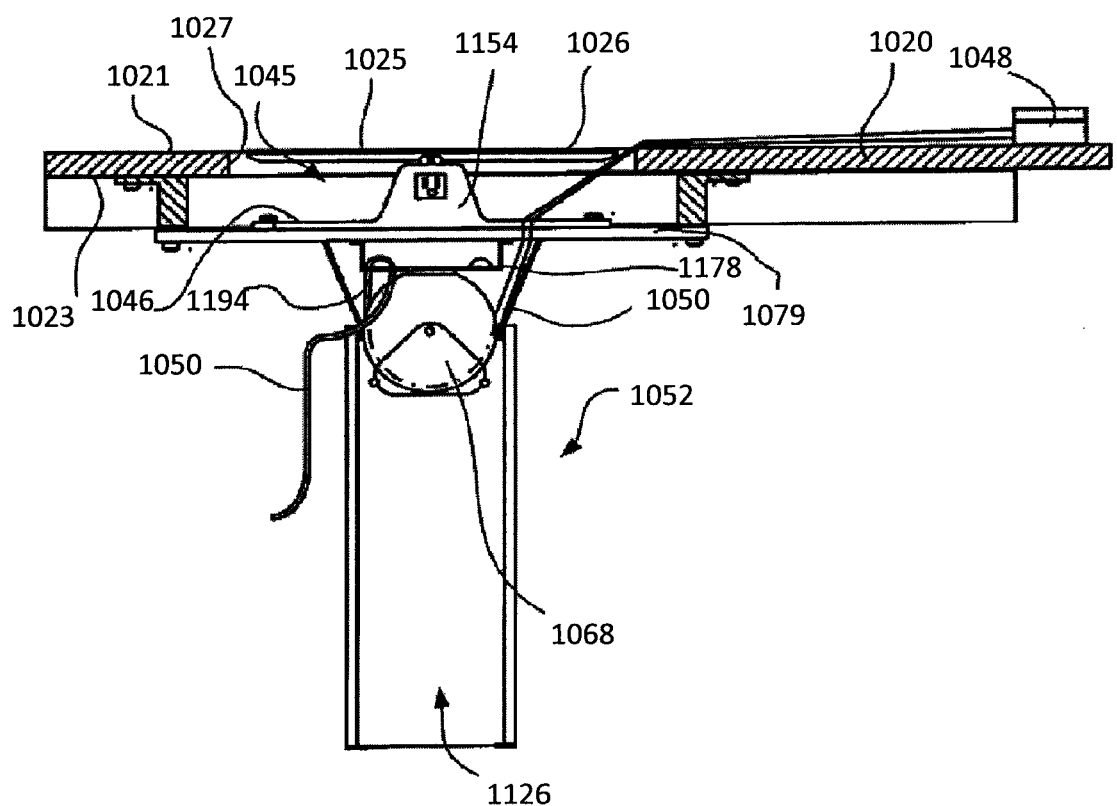
FIG. 35 is similar to FIG. 33, albeit showing the handset in a use position with a cavity door member in a closed position.

Referring now to FIG. 35, the attendee can place the handset 1048 with its undersurface on top surface 1021 of tabletop member 1020. The attendee can close door 1026. The nonslip undersurface of handset 1048 and the weight of the handset 1048 cooperate to retain the handset 1048 on the top surface 1021 despite the weight of the pulley/weight assembly 1068. Nevertheless, pulley/weight assembly 1068 maintains the portion of the cable 1050 above the top surface 1021 taught. Continuing, where the cable 1050 includes audio and video cables (see FIG. 31), the attendee can link those cables to the attendee's laptop and, when appropriate, select the handset button to take control of information presented via the display screen 1036.

After a conference has been completed, attendees can unlink their laptops from the cables 1050 and replace their handsets 1048 within the cavity or well 1069 below doors 1025 and 1026. To this end, referring once again to FIGS. 34 and 35, an attendee can open door 1026 and lift the attendee's handset 1048 from top surface 1021. As the attendee moves the handset 1048 toward well 1069 below door member 1026, the pulley/weight assembly 1068 moves down within cavity 1124 thereby aiding the attendee in replacing the handset in the stowed position. Referring to FIG. 33, eventually the handset 1048 is placed back in the associated handset cavity 1156 in its stowed position.

While one embodiment has been described above, it should be appreciated that the concepts described above may be applicable in many different embodiments. For example, the exemplary wire management assembly and totem and bridge concepts may be used with tabletop members that have other shapes such as, for instance, oval, round, etc. In addition, all of the concepts described above may be used with table assemblies that do not include a footrail or additional supporting foot members or with leg support structures that have different height dimensions than those illustrated. Moreover, while the embodiment that is described above includes six separate handsets, it should be appreciated that other embodiments are contemplated that may include more or less handsets such as, for instance, embodiments that include four handsets, eight handsets, etc.

Moreover, other embodiments are contemplated that may include two or more wire management assemblies 1024 and associated leg support structures 1018 for supporting larger tabletop members. Furthermore, other embodiments are contemplated that may include a switcher device linked to two or more display screens or that include wall mounted or cart mounted display screens that can be positioned independent of other table assembly components. To this end, see FIG. 37 that shows a two leg table assembly including first and second totem/display assemblies 1014 and 1014b, respectively, two leg structures 1018a and 1018b, respectively, a single table top 1020', a single foot rail 1022', first and second wire management assemblies 1024a and 1024b, respectively, and first and second bridge assemblies 1016a and 1016b, respectively. Here, it may be that only one switcher device is provided or, in some cases where two devices are provided, the devices may be linked so that simultaneous control of the display screens results. In some cases one attendee may control one display while another attendee controls the second display screen.

Figure 38:
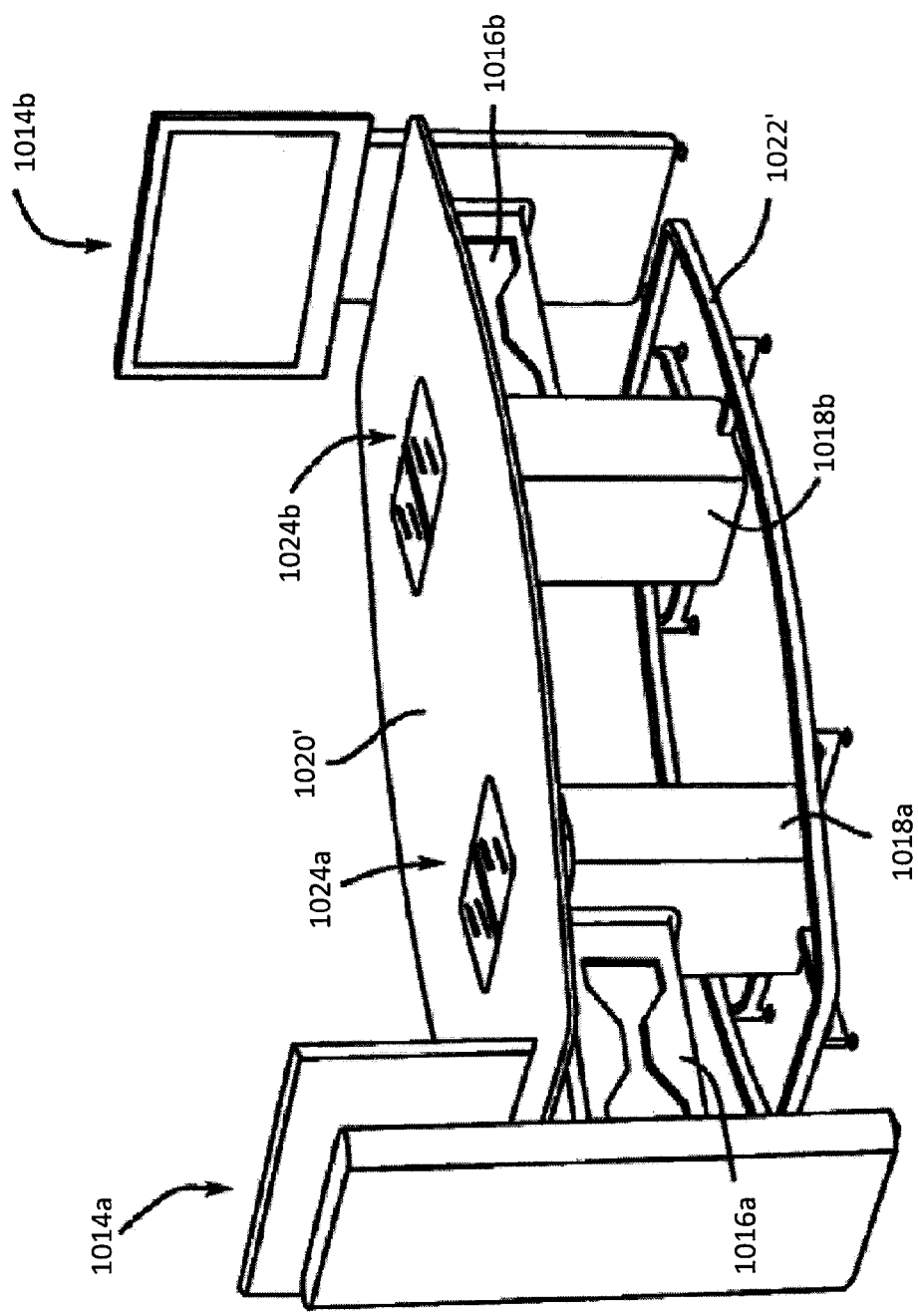
FIG. 38 is a perspective view of a two display conferencing table.
Figure 39:
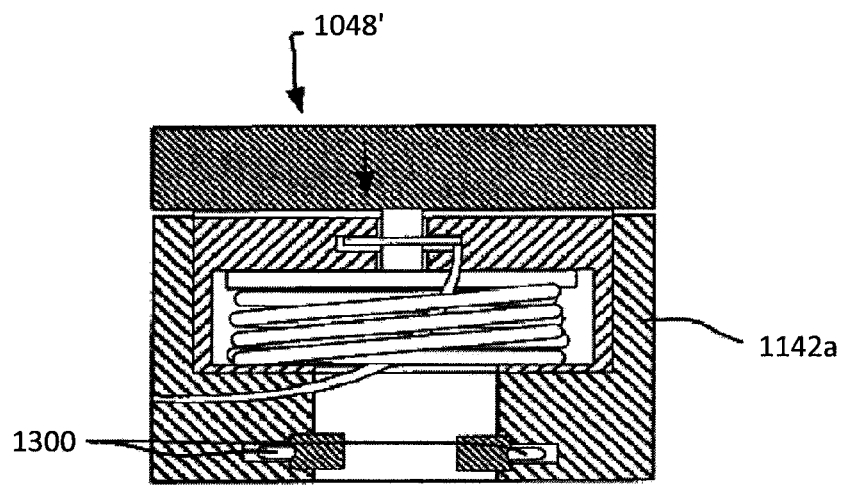
FIG. 39 is a cross sectional view of a handset that includes LEDs for signaling different conditions.

Referring to FIG. 38, in some cases a handset 1048' may include a housing 1142a, 1 button 1144a and one or more LEDs 1300. In the illustrated embodiment, the housing 1142a may be formed of a transparent or semitransparent material (e.g., Plexiglas) so that when the LEDs are illuminated, light shines through the housing. In at least some cases LEDs may be illuminated when a laptop associated with a specific handset is selected to control the displays. In some cases a handset may have several different colors of LEDs to indicate different statuses. For instance, when no laptop is linked and associated with a handset, no LEDs may be illuminated in the handset. Once a handset is linked to a laptop and when the linked laptop is not driving the display, a red LED may be illuminated. When a laptop is currently driving the display, a green LED may be illuminated.

In addition, while the illustrated embodiment shows a retractor assembly 1052 for use with switcher control cables and audio/video cables, it should be appreciated that such a retractor assembly may be used for other types of cable such as power, data and communication cables. Moreover, referring to FIG. 33, in at least some embodiments, intermediate connectors (not illustrated) may be provided on bracket 1178 and cable 1050 may terminate at the intermediate connectors. Here, separate cables would link the intermediate connectors to selector 1084.

Furthermore, other weight types may be employed instead of the pulley/weight assemblies 1068. For instance, a simple weight may be fastened to a portion of cable 1050 to tend to pull the handsets 1048 toward well 1069.

Figure 40:
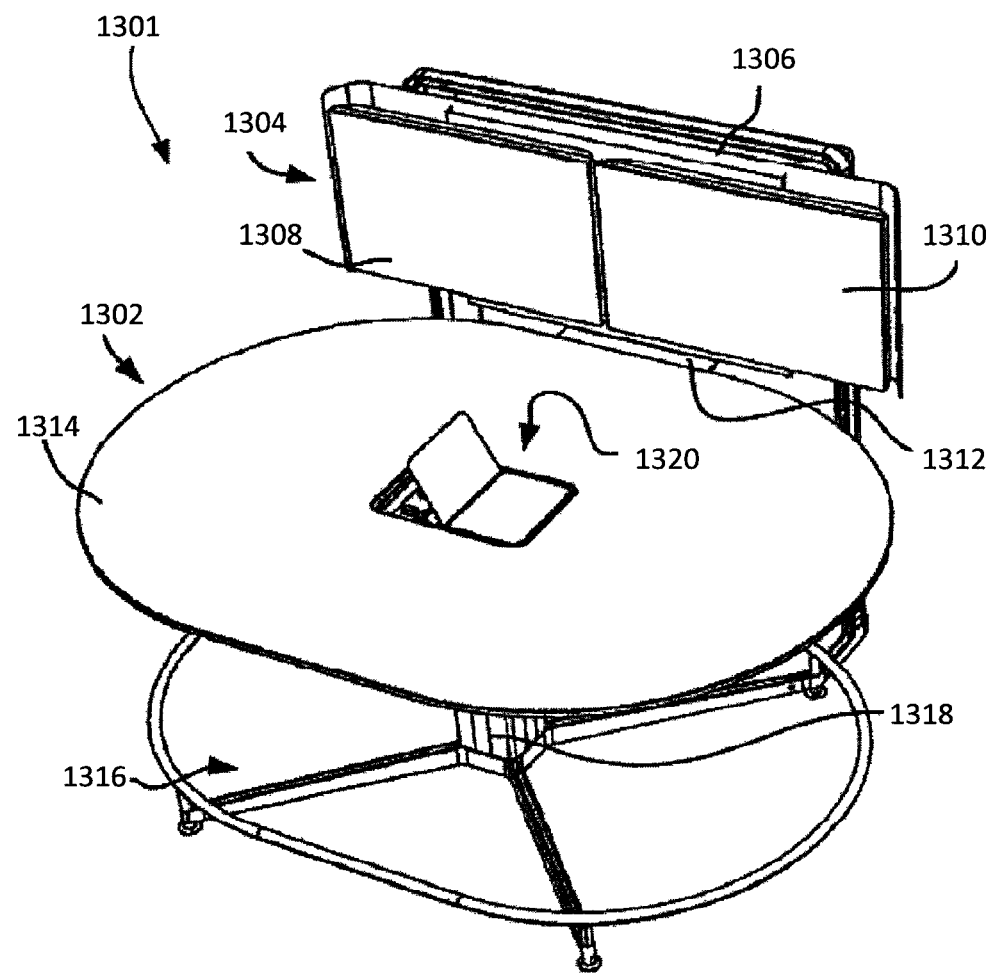
FIG. 40 is a perspective view of yet another table assembly that is consistent with at least some aspects of the present invention.
Figure 41:
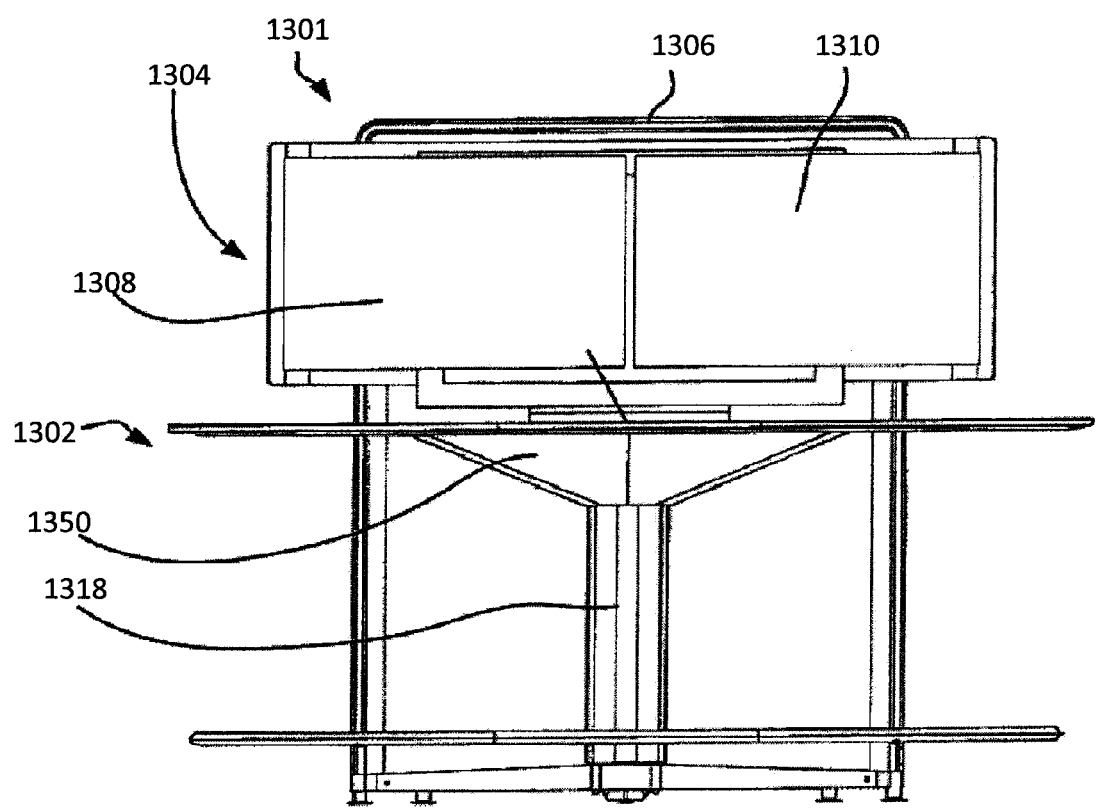
FIG. 41 is a front plan view of the assembly shown in FIG. 40.
Figure 42:
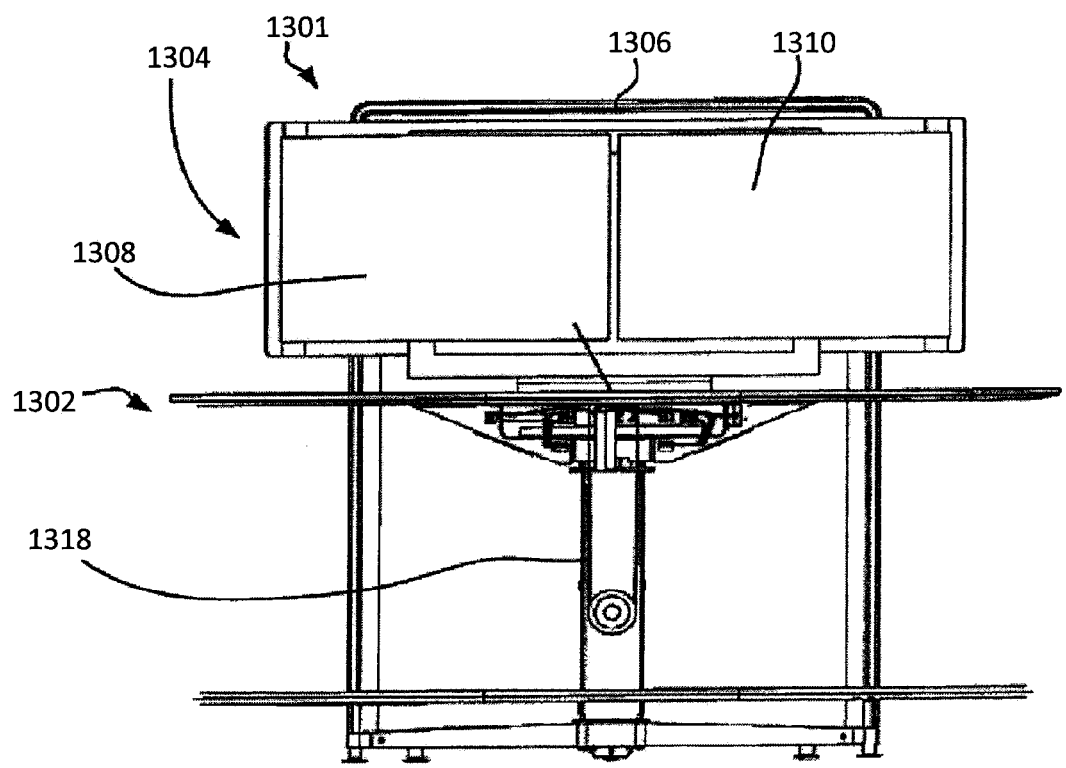
FIG. 42 is similar to FIG. 41, albeit showing the assembly with various housing components removed.
Figure 43:
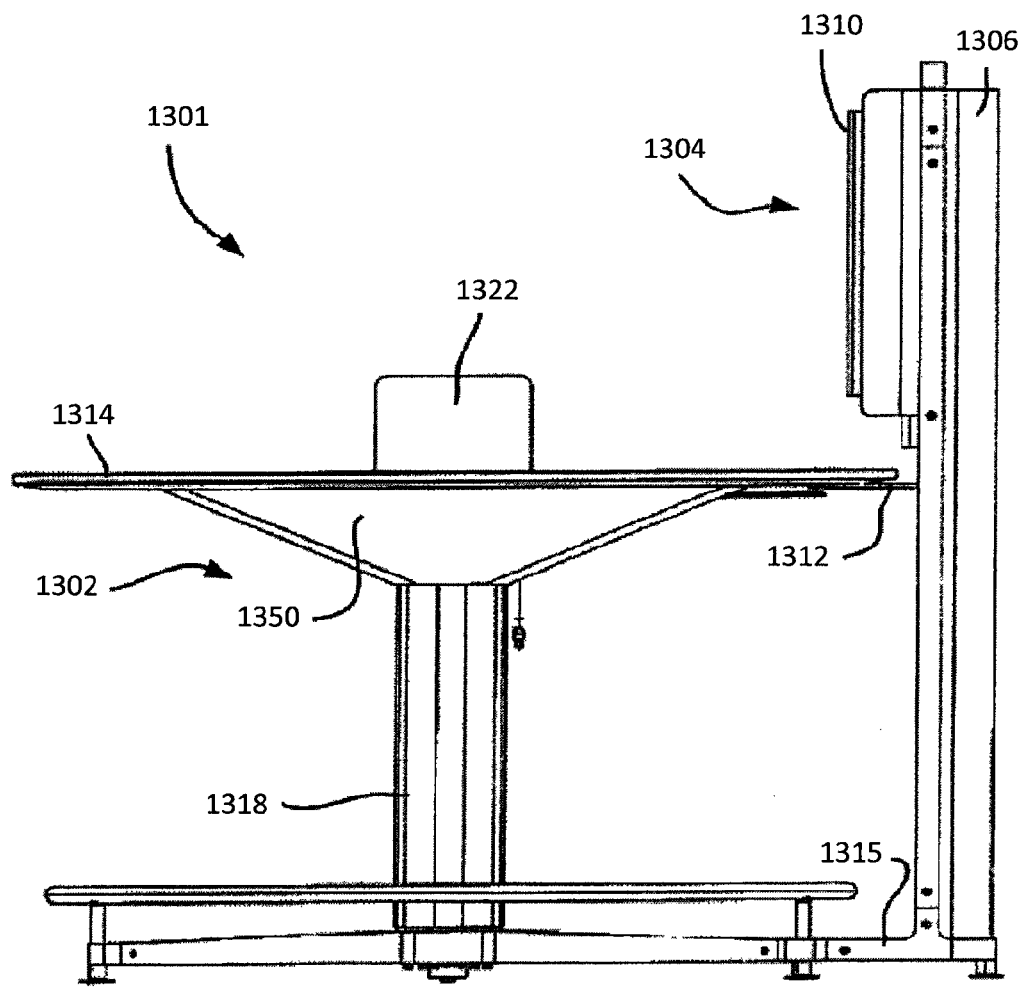
FIG. 43 is a side plan view of the assembly shown in FIG. 40.

Referring now to FIG. 40, yet one other exemplary conferencing table configuration or assembly 1301 is illustrated that includes a table assembly 1302, a totem/display assembly 1304 and a bridge assembly 1312. Table assembly 1302 includes a leg support structure 1316, a table top member 1314 and a wire management assembly 1320. Referring also to FIGS. 41 through 43, leg support structure 1316 includes a vertical leg sub-assembly 1318 and horizontal foot members and a rail member which are not separately labeled. Vertical leg sub-assembly 1318 supports a central portion of table top member 1314 at a top end thereof.

Referring to FIGS. 40 and 41, the wire management assembly 1320 includes a housing structure 1350 at the top end of sub-assembly 1318 that, as the label implies, houses a sub-set of the components that comprise the wire management assembly 1320. In FIG. 42, an outside cover of sub-assembly 1318 has been removed as well as the housing structure 1350 to show that portions of assembly 1320 reside within the housing structure 1350 as well as extend down into a channel formed by sub-assembly 1318.

Referring once again to FIG. 40, table top member 1314 forms a central opening for receiving a sub-set of the wire management assembly components as will be described in greater detail below. Referring to FIG. 43, bridge assembly 1312 in this embodiment includes a simple bracket that secures an undersurface of table top member 1314 to totem 1304. Here, video and, in at least some case, audio cables, may pass from within housing 1350 to totem 1304 adjacent the bridge bracket 1312 for linkage to display screens. In addition, power may be provided to the components within housing 1350 via a cable running up through totem 1306 and adjacent or under the bracket that forms bridge 1312 into the housing 1350. In still other cases, foot members 1315 (only one of two shown) secure a bottom of totem 1306 to foot structure that forms the understructure of table assembly 1302. Here, in at least some embodiments, power and data cables may run through members 1315 to components within housing 1350.

Referring yet again to FIGS. 40 through 43, totem 1304 includes a generally vertical structure 1306 that supports first and second flat panel video display screens 1308 and 1310, respectively. Here, the two screens may enable separate table users to control content simultaneously, a different user controlling each one of display screens 1308 and 1310. In other embodiments, a large single display screen may be provided as described above with respect to other embodiments where the display screen may be split into two or more separate regions where the content in each of the regions can be controlled by a different one of a plurality of table users via a user unique handset.

Figure 44:
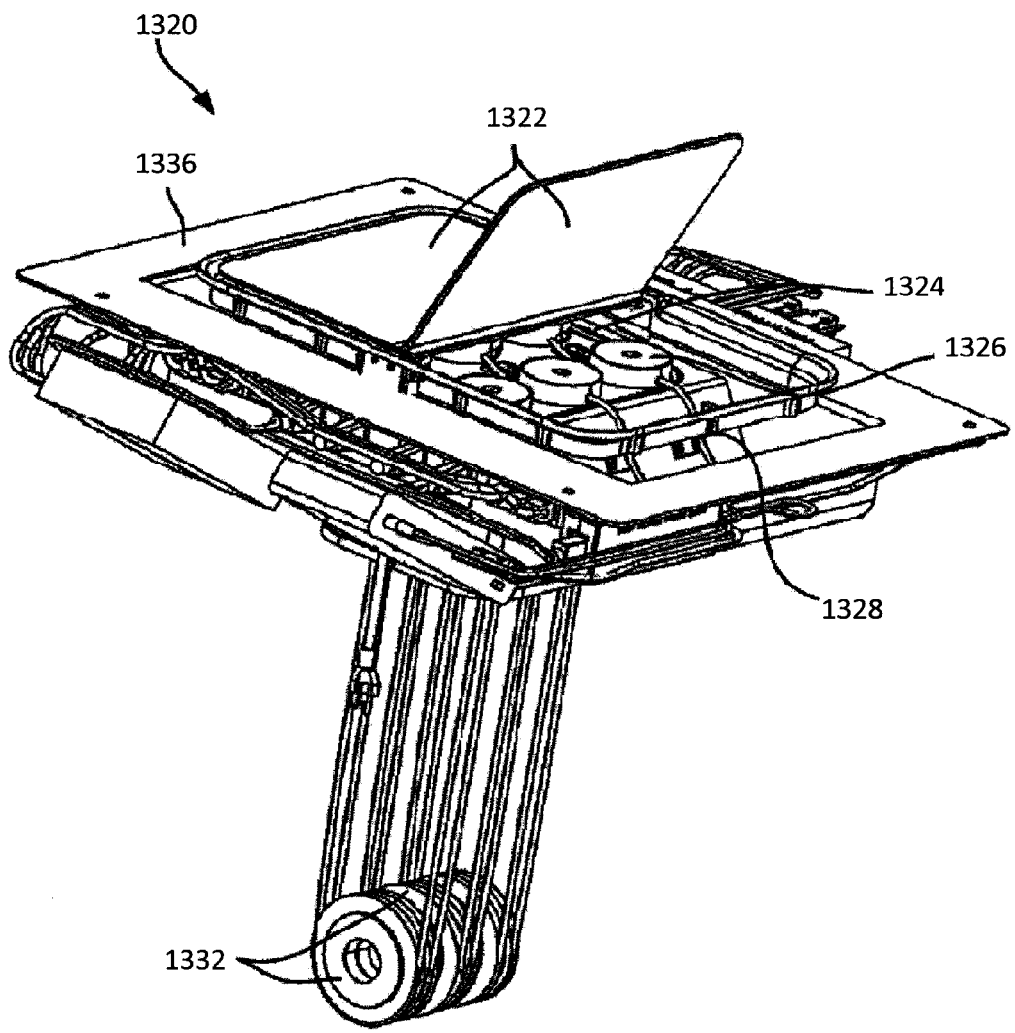
FIG. 44 is a perspective showing a wire management assembly that forms part of the assembly shown in FIG. 40.

Referring now to FIG. 44, an exemplary wire management assembly 1320 is illustrated which includes a plurality of housing component as well as power and data cables, a power brick, an Ethernet switching component, a video player, a plurality of power and data receptacles, six handsets, one identified by numeral 1326, and pulley-type weights, two of which are collectively identified by numeral 1332. Assembly 1320 is similar to assembly 1052 described above with a few differences. With respect to differences between the assemblies, referring to FIGS. 44 through 47, it should be appreciated that a handset receiving housing 1336 that mounts to an undersurface of the table top 1314 (see again FIG. 40) below the central opening forms a recess 1330 in which an island forming member 1324 is centrally mounted (see specifically FIG. 45). Generally vertical or angled surfaces formed by member 1336 and the island forming member 1324 form power and data receptacle receiving openings 1332 and 1334, respectively. Here, a top surface of the island forming member 1324 resides below an undersurface of top member 1314 and forms a space between island forming member 1324 and the plane formed by the table top member 1314 in which the handsets 1326 can generally reside. Thus, in this embodiment, the handsets are positioned relatively higher within the recess 1330 than in the previous embodiment described above.

Figure 45:
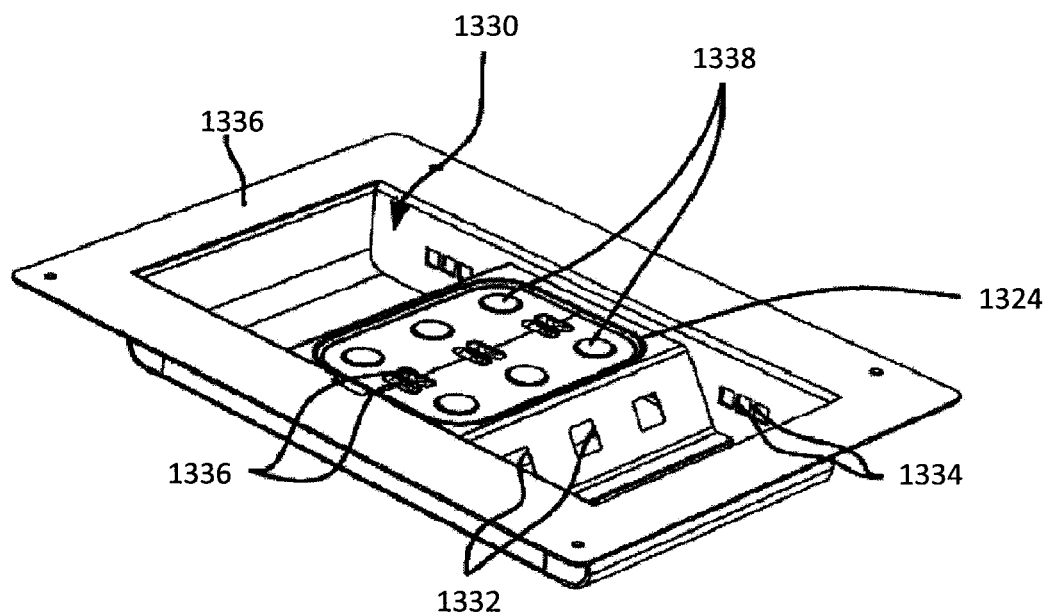
FIG. 45 is a perspective view showing a sub-set of the housing components shown in FIG. 44.
Figure 46:
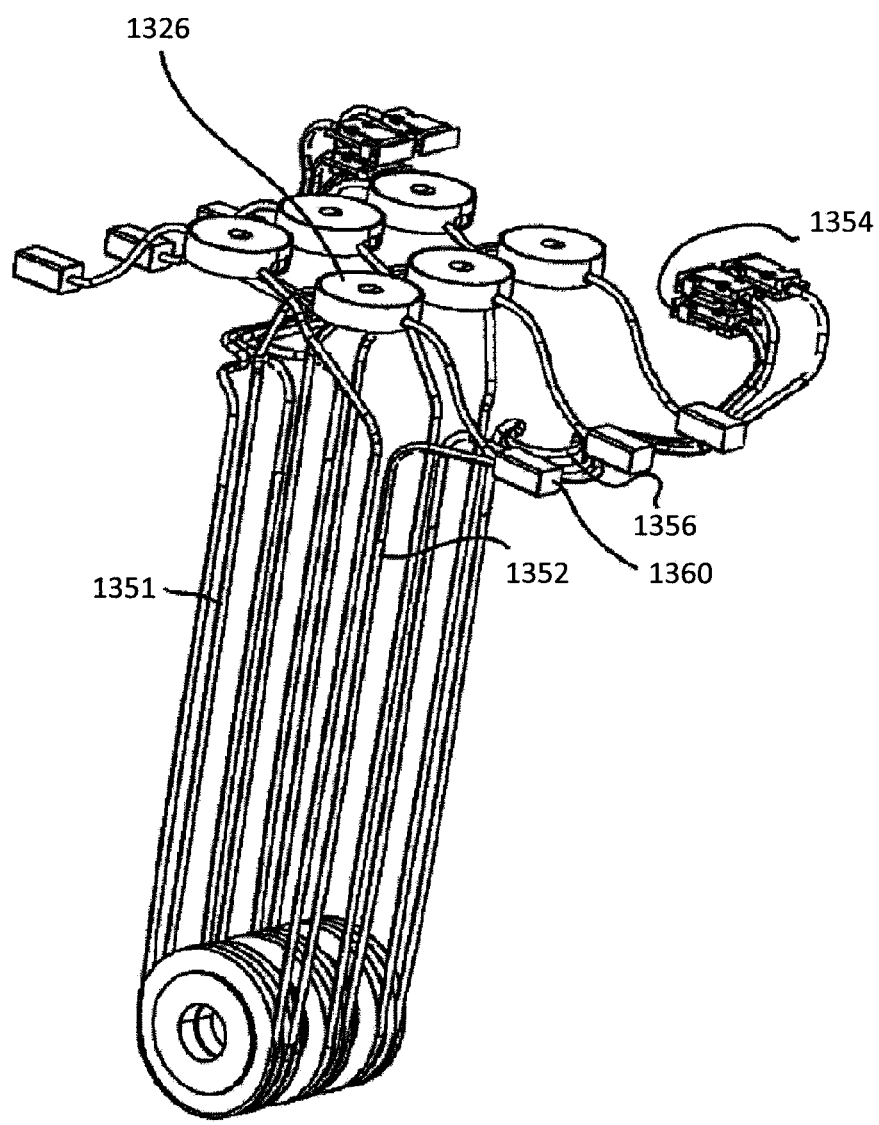
FIG. 46 is a perspective view showing handsets, associated cables and pulleys used to form part of the assembly shown in FIG. 44.

Referring now to FIG. 46, audio/video cable extension modules 1360 are shown with a separate module 1360 connected via a cable 1369 to each one of the handsets 1326. Thus, here, module 1360 can be used to link to a computer used by a user and can thereby be readily associated with one of the handsets 1326 linked thereto. Computers can be linked to the power and data outlets that reside in openings 1332 and 1334, respectively, as shown in FIG. 45. In other contemplated embodiments power, data, audio and video may be supported by each of modules 1360.

Referring still to FIGS. 44 through 46 and also to FIG. 47, another difference between the embodiment shown in FIGS. 40 through 47 and the embodiments described above is that cables from the handsets 1326 extend down through island forming member 1324 (see again FIG. 45), wrap around an associated weight 1332 and then extend back up toward an undersurface of member 1336 so that the weight 1332 associated with a handset resides below the handset when the handset is in the stored position. Here, see openings 1336 formed in the top surface of island member 1324 for passing handset cable. See specifically FIG. 47 where a cable 1351 extends down from handset 1326, wrap around an associated weight 1332 and then extends back up as indicated at 1351 to under the associated handset 1326 and terminates at 1354. This design results in a more compact wire management structure, operates better than the designs described above and locates the handsets 1326 in a more easily accessible position.

Figure 47:
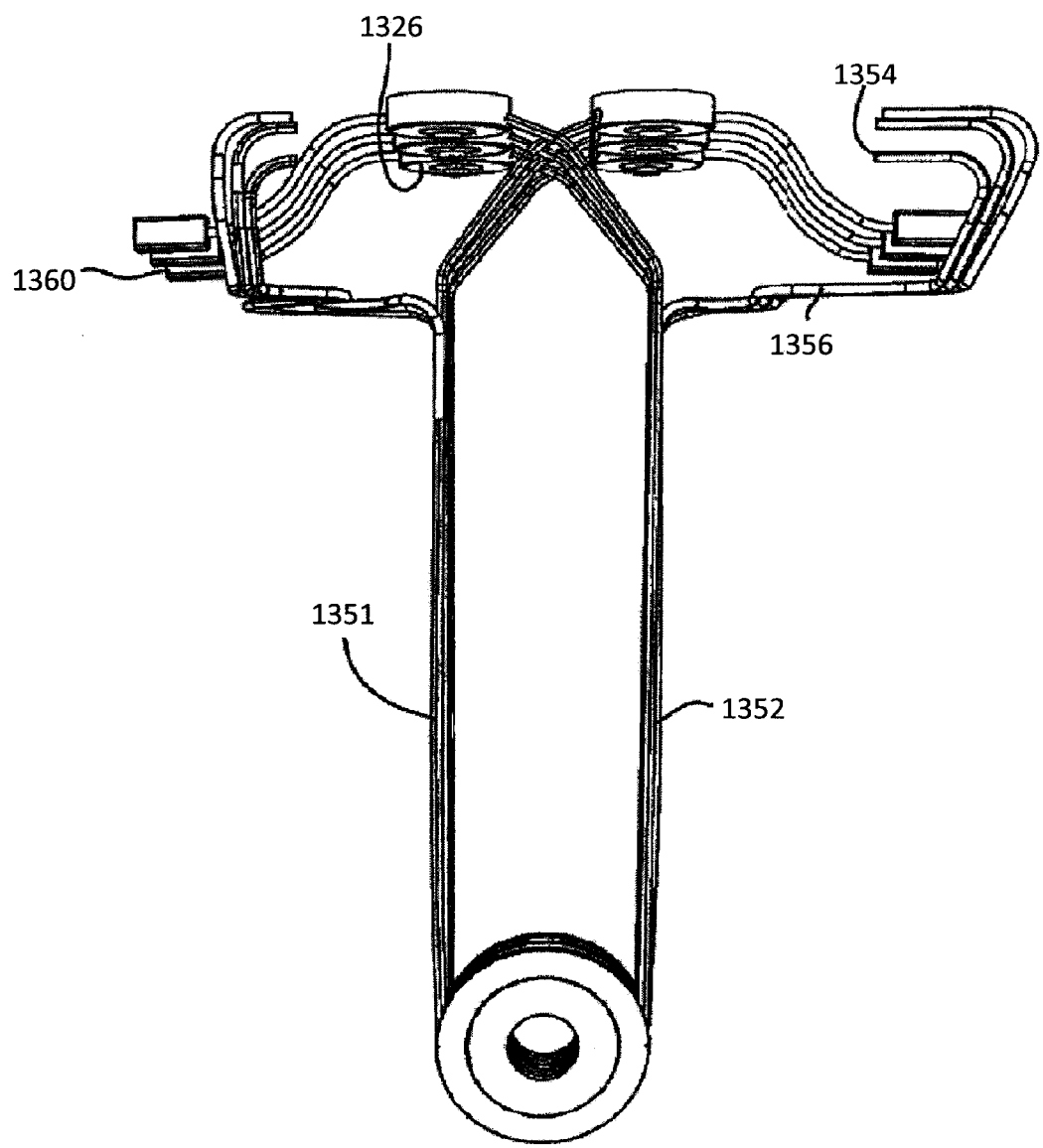
FIG. 47 is a front perspective view of the sub-assembly of FIG. 46, albeit without data jacks.
Figure 48:
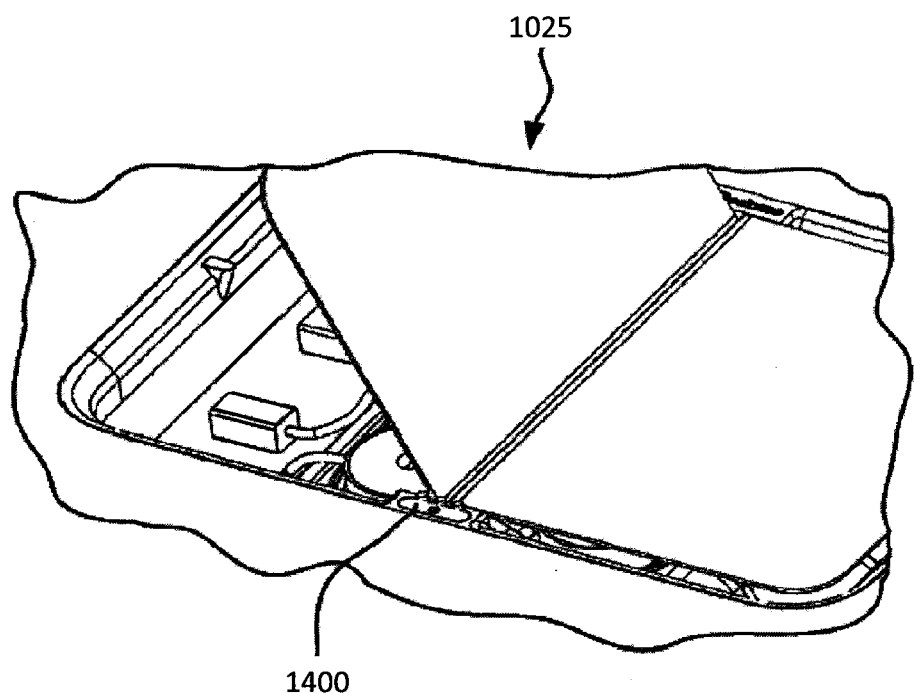
FIG. 48 is a perspective view of a wire management system including a single on/off button.

Referring now to FIGS. 45 and 47, in at least some embodiments of the present invention it is contemplated that the top surface of the island forming member 1326 may be fitted with flat tacky plastic or magnetic members 1338 where the handsets 1326 have complementary flat surfaces 1362 (see FIG. 47). Here, when a handset 1326 is placed on one of members 1338, the handset 1326 will generally be captured thereby unless affirmatively removed by a table user. When a handset 1326 is in the stored position as shown in FIGS. 44, 46 and 47, the power and data modules 1360 reside within a lower portion of the recess 1330 formed by housing 1336. Thus, both the handset 1326 and the power/data module are located in easily accessible storage positions when stowed. In still other embodiments parts 1338 of the top surface of the island deck 1324 may be raised or recessed and complimentary recesses or raised portions may be provided on the undersurfaces of the hand sets 1326 so that when a handset 1326 is placed on the deck, the raised portion and the recess cooperate to effectively hold the handset in the stored position unless affirmatively removed by a user.

Several specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

For example, while the pucks 48 described above include illumination devices controllable to indicate different states, it should be appreciated that other indicators that can visually distinguish states are contemplated. For instance, each button 60 a-60 d in FIG. 4 may include a liquid crystal display type device where different cross hatching indicates different statuses. As another example, in at least some embodiments it is contemplated that each time a presentation state changes, a puck or other system component may generate an audible signal to indicate a state change (see audio generator 77 in FIG. 5). In addition, while the embodiments illustrated include two or four displays supported by a totem, it should be appreciated that the illustrated embodiments are only exemplary and that other numbers of displays may be supported by a totem or that displays may in some cases be mounted to a wall or other supporting structure proximate a conferencing table.

Thus, the invention is to cover all modifications, equivalents, and alternatives falling within the spirit and scope of the invention as defined by the following appended claims.

What is claimed is:

1. An assembly for sharing content from video source devices, the apparatus comprising:
   a table assembly having a top member and a table support structure for supporting the top member in a substantially horizontal orientation, the top member forming a top surface and an opening in the top surface;
   a display assembly including at least a first display screen generally residing at a height above the height of the top surface of the table top;
   a switching device linked to the display assembly for providing content thereto to be presented via the first display screen;
   a plurality of control interfaces attached to the table assembly and linked to the switching device, each control interface including at least a first selectable control;
   wherein, a video source device is associated with one of the control interfaces by linking the source device to the control interface;
   wherein, when a first source device is linked to a first control interface, selection of the first selectable control on the first control interface causes the switching device to provide video information to replicate the content from the display screen of the first source device on the first display screen; and
   wherein, when a second source device is linked to a second control interface, selection of the first selectable control on the second control interface causes the switching device to provide video information to replicate the content from the display screen of the second source device on the first display screen.

2. The assembly of claim 1 wherein each of the first selectable controls includes an indicator capable of indicating at least first and second states, the first state indicating that no source is linked to a control interface that includes the indicator and the second state indicating that a source is linked to the control interface that includes the indicator.

3. The assembly of claim 2 wherein the indicator is a light device.

4. The assembly of claim 3 wherein each control interface indicates the second state by illuminating the light device and indicates the first state by turning off the light device.

5. The assembly of claim 4 wherein each interface also includes a speaker.

6. The assembly of claim 2 wherein the second state indicates that a source is linked to the control interface that includes the indicator but that the source content is not replicated on the first display screen, each indicator also capable of indicating a third state when a source is linked to the control interface that includes the indicator and the source content is replicated on the first display screen.

7. The assembly of claim 1 wherein the plurality of control interfaces includes at least four control interfaces.

8. The assembly of claim 1 wherein each control interface is connected to the switching device via a control cable.

9. A method for use with source devices that include display screens and that present content on the display screens, the method for selecting displayed content from source devices to be replicated on at least a first common display screen in a collaborative workspace, the method comprising the steps of:
   providing a control assembly that includes:
   (i) a first control interface including at least a first interface first control button associated with the at least a first common display screen, the first interface first control button including a first interface first indicator capable of indicating first and second different states;
   (ii) a second control interface including at least a second interface first control button associated with the at least a first common display screen, the second interface first control button including a second interface first indicator capable of indicating first and second different states;
   upon linking a first source device to the first control interface and while the content on the display screen of the first source device is not replicated on the first common display screen, causing the first interface first indicator to indicate the first state;
   when the first interface first control button is selected, replicating the content from the first source device linked to the first control interface on the at least a first common display screen;
   upon linking a second source device to the second control interface and while the content on the display screen of the second source device is not replicated on the first common display screen, causing the second interface first indicator to indicate the first state; and
   when the second interface first control button is selected, replicating the content from the second source device linked to the second control interface on the at least a first common display screen.

10. The method of claim 9 further including the steps of, prior to linking the first source device to the first control interface, causing the first interface first indicator to indicate the second state and prior to linking the second source device to the second control interface, causing the second interface first indicator to indicate the second state.

11. The method of claim 10 wherein each of the indicators is further capable of indicating a third state, the method further including the steps of, with the first source device linked to the first control interface and while the content on the display screen of the first source device is replicated on the first common display screen, causing the first interface first indicator to indicate the third state and, with the second source device linked to the second control interface and while the content on the display screen of the second source device is replicated on the first common display screen, causing the second interface first indicator to indicate the third state.

12. The method of claim 9 further including the steps of, with the first source device linked to the first control interface and while the content on the display screen of the first source device is replicated on the first common display screen, causing the first interface first indicator to indicate the second state and, with the second source device linked to the second control interface and while the content on the display screen of the second source device is replicated on the first common display screen, causing the second interface first indicator to indicate the second state.

13. The method of claim 10 wherein each indicator includes a light device.

14. The method of claim 12 wherein each indicator includes a light device.

15. The method of claim 9 further including providing a table structure wherein each of the control interfaces is secured to the table structure.

16. The method of claim 9 wherein, when a control button is selected on any of the control interfaces while the control interface is linked to a source device, the content from the display screen of the linked source device is used to replace current content on the common display screen irrespective of whether or not content from another source device is being presented via the common display screen when the control button is selected.

17. The method of claim 9 wherein the first control interface is separate from the second control interface.

18. The method of claim 17 wherein each control interface also includes an audible sound generator device.

19. An assembly for sharing content from video source devices on at least a first common display screen, the apparatus comprising:
a switching device linked to the display assembly for providing content thereto to be presented via the first common display screen;
a plurality of control interfaces attached to the table assembly and linked to the switching device, each control interface including at least a first selectable control, a connector for connecting to a video source device and at least one indicator;
wherein, a video source device is associated with one of the control interfaces by linking the source device to the control interface;
wherein, when a first source device is linked to a first control interface, selection of the first selectable control on the first control interface causes the switching device to provide video information to replicate the content from the display screen of the first source device on the first display screen and causes the indicator on the first control interface to indicate that the content from the display screen of the first source device is replicated on the first common display screen; and
wherein, when a second source device is linked to a second control interface, selection of the first selectable control on the second control interface causes the switching device to provide video information to replicate the content from the display screen of the second source device on the first display screen and causes the indicator on the second control interface to indicate that the content from the display screen of the second source device is replicated on the first common display screen.

20. The assembly of claim 19 wherein each indicator includes a light device.

21. The assembly of claim 19 wherein each indicator includes a sound generating device.

22. The assembly of claim 1 further including a separate control cable for each of the control interfaces, each control cable including first and second ends, the first end of each cable linked to the switching device and the second end of each cable connectable to a source device to link the source device to an associated control interface, each control interface linked to an associated control cable somewhere along a length of the control cable between the first and second ends.

23. The assembly of claim 22 wherein each first selectable control includes a first control button.

24. The assembly of claim 23 wherein the first display screen includes at least first and second different presentation spaces and wherein selection of a first control button causes replication of content from a source device linked to an associated control interface within the first presentation space and, wherein, each control interface further includes at least a second control button selectable to cause replication of content from a source device linked to an associated control interface within the second presentation space.

25. The assembly of claim 24 wherein the first display screen includes at least third and fourth different presentation spaces and wherein, each control interface further includes third and fourth control buttons selectable to cause replication of content from a source device linked to an associated control interface within the third and fourth presentation spaces, respectively.

26. The assembly of claim 22 wherein each control cable is moveable though the table top opening into a storage position in which the entire control cable and associated control interface are located at a height below the table top and into a use position in which the second end of the cable and the associated control interface are pulled up through the table top opening so that the control interface is accessible above the table top surface.

27. The assembly of claim 26 wherein each control interface further includes an illumination device that lights up to indicate when content from a source device linked to the control interface is replicated on the first common display screen.

28. The assembly of claim 27 further including a retractor assembly for each of the control cables, each retractor assembly supported below the table top member and engaging one of the control cables and at least periodically applying a force to the engaged control cable tending to pull the cable through the table top opening and into the storage position.

29. The assembly of claim 28 wherein each control interface is closer to the second end of an associated control cable than to the first end of the associated control cable.

30. The assembly of claim 29 wherein the each illumination device is visible above the top surface of the table top when an associated cable is pulled into the use position.

31. The assembly of claim 28 further including a deck member mounted to the table top below the table top opening wherein the deck member restricts downward movement of the control cables so that the second ends of the control cables remain proximate and below the table top opening when the control cables are in the storage positions.

32. The assembly of claim 31 wherein the deck member restricts downward movement of the control cables so that the control interfaces also remain proximate and below the table top opening when the control cables are in the storage positions.

33. The assembly of claim 32 wherein the deck member forms at least one opening and wherein a section of at least one of the control cables between the control interface and the first end passes through the at least one opening in the deck member.

34. The assembly of claim 33 wherein the sections of each of the control cables between the control interfaces and the first ends pass through the at least one opening in the deck member.

35. The assembly of claim 34 wherein the deck member forms a separate opening for each of the control cables and wherein the section of each control cable between the control interface and the first end passes through a separate one of the openings formed by the deck member.

36. The assembly of claim 35 wherein the retractor assemblies are supported below the deck member.

37. The assembly of claim 36 wherein each retractor assembly includes a pulley that engages an associated control cable.

38. The method of claim 9 for use with a switching device that includes at least a first output linked to the first display screen and first and second inputs associated with the first and second control interfaces, respectively, a source device linked to the first control interface by linking the source device to the first input and a source device linked to the second control interface by linking the source device to the second input.

* * * * *